US010242019B1

(12) United States Patent
Shan et al.

(10) Patent No.: US 10,242,019 B1
(45) Date of Patent: Mar. 26, 2019

(54) USER BEHAVIOR SEGMENTATION USING LATENT TOPIC DETECTION

(71) Applicant: Experian Information Solutions, Inc., Costa Mesa, CA (US)

(72) Inventors: Honghao Shan, San Diego, CA (US); Mason L. Carpenter, Richmond, VA (US); Gregor Bonin, Wimberley, TX (US); Shanji Xiong, San Diego, CA (US); Christer DiChiara, Carlsbad, CA (US)

(*) Notice: Subject to any disclaimer, the term of this patent is extended or adjusted under 35 U.S.C. 154(b) by 521 days.

(21) Appl. No.: 14/975,654

(22) Filed: Dec. 18, 2015

Related U.S. Application Data

(60) Provisional application No. 62/094,819, filed on Dec. 19, 2014.

(51) Int. Cl.
*G06F 17/30* (2006.01)
*G06F 17/27* (2006.01)
*G06Q 20/38* (2012.01)

(52) U.S. Cl.
CPC .... *G06F 17/30153* (2013.01); *G06F 17/2715* (2013.01); *G06F 17/30598* (2013.01); *G06Q 20/38* (2013.01)

(58) Field of Classification Search
CPC .......... G06F 17/30153; G06F 17/2715; G06F 17/30598; G06Q 20/38
See application file for complete search history.

(56) References Cited

U.S. PATENT DOCUMENTS

| 3,316,395 | A | 4/1967 | Lavin et al. |
|---|---|---|---|
| 4,305,059 | A | 12/1981 | Benton |
| 4,371,739 | A | 2/1983 | Lewis et al. |
| 4,398,055 | A | 8/1983 | Ijaz et al. |
| 4,578,530 | A | 3/1986 | Zeidler |
| 4,617,195 | A | 10/1986 | Mental |
| 4,672,149 | A | 6/1987 | Yoshikawa et al. |
| 4,736,294 | A | 4/1988 | Gill |
| 4,754,544 | A | 7/1988 | Hanak |

(Continued)

FOREIGN PATENT DOCUMENTS

| DE | 91 08 341 | 10/1991 |
|---|---|---|
| EP | 0 350 907 | 1/1990 |

(Continued)

OTHER PUBLICATIONS

U.S. Appl. No. 12/705,489, filed Feb. 12, 2010, Bargoli et al.

(Continued)

*Primary Examiner* — Mark D Featherstone
*Assistant Examiner* — Diedra McQuitery
(74) *Attorney, Agent, or Firm* — Knobbe Martens Olson & Bear LLP

(57) ABSTRACT

The features relate to artificial intelligence directed compression of user event data based on complex analysis of user event data including latent feature detection and clustering. Further features are described for reducing the size of data transmitted during event processing data flows and devices such as card readers or point of sale systems. Machine learning features for dynamically determining an optimal compression as well as identifying targeted users and providing content to the targeted users based on the compressed data are also included.

20 Claims, 15 Drawing Sheets

(56) References Cited

U.S. PATENT DOCUMENTS

| | | |
|---|---|---|
| 4,774,664 A | 9/1988 | Campbell et al. |
| 4,775,935 A | 10/1988 | Yourick |
| 4,827,508 A | 5/1989 | Shear |
| 4,868,570 A | 9/1989 | Davis |
| 4,872,113 A | 10/1989 | Dinerstein |
| 4,876,592 A | 10/1989 | Von Kohorn |
| 4,895,518 A | 1/1990 | Arnold |
| 4,935,870 A | 6/1990 | Burk, Jr. et al. |
| 4,947,028 A | 8/1990 | Gorog |
| 5,025,138 A | 6/1991 | Cuervo |
| 5,025,373 A | 6/1991 | Keyser, Jr. et al. |
| 5,034,807 A | 7/1991 | Von Kohorn |
| 5,056,019 A | 10/1991 | Schultz et al. |
| 5,060,153 A | 10/1991 | Nakagawa |
| 5,148,365 A | 9/1992 | Dembo |
| 5,201,010 A | 4/1993 | Deaton et al. |
| 5,220,501 A | 6/1993 | Lawlor et al. |
| 5,247,575 A | 9/1993 | Sprague et al. |
| 5,259,766 A | 11/1993 | Sack |
| 5,262,941 A | 11/1993 | Saladin |
| 5,274,547 A | 12/1993 | Zoffel et al. |
| 5,297,031 A | 3/1994 | Gutterman et al. |
| 5,325,509 A | 6/1994 | Lautzenheiser |
| 5,336,870 A | 8/1994 | Hughes et al. |
| 5,341,429 A | 8/1994 | Stringer et al. |
| 5,454,030 A | 9/1995 | de Oliveira et al. |
| 5,468,988 A | 11/1995 | Glatfelter et al. |
| 5,504,675 A | 4/1996 | Cragun et al. |
| 5,528,701 A | 6/1996 | Aref |
| 5,555,409 A | 9/1996 | Leenstra, Sr. et al. |
| 5,563,783 A | 10/1996 | Stolfo et al. |
| 5,583,763 A | 12/1996 | Atcheson et al. |
| 5,590,038 A | 12/1996 | Pitroda |
| 5,592,560 A | 1/1997 | Deaton et al. |
| 5,611,052 A | 3/1997 | Dykstra et al. |
| 5,615,408 A | 3/1997 | Johnson |
| 5,621,201 A | 4/1997 | Langhans et al. |
| 5,629,982 A | 5/1997 | Micali |
| 5,630,127 A | 5/1997 | Moore et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,679,176 A | 10/1997 | Tsuzuki et al. |
| 5,689,651 A | 11/1997 | Lozman |
| 5,696,907 A | 12/1997 | Tom |
| 5,704,029 A | 12/1997 | Wright, Jr. |
| 5,732,400 A | 3/1998 | Mandler |
| 5,737,732 A | 4/1998 | Gibson et al. |
| 5,739,512 A | 4/1998 | Tognazzini |
| 5,745,654 A | 4/1998 | Titan |
| 5,748,098 A | 5/1998 | Grace |
| 5,754,938 A | 5/1998 | Herz et al. |
| 5,768,423 A | 6/1998 | Aref et al. |
| 5,771,562 A | 6/1998 | Harvey et al. |
| 5,774,692 A | 6/1998 | Boyer et al. |
| 5,774,868 A | 6/1998 | Cragun et al. |
| 5,774,883 A | 6/1998 | Andersen |
| 5,778,405 A | 7/1998 | Ogawa |
| 5,793,972 A | 8/1998 | Shane |
| 5,797,136 A | 8/1998 | Boyer et al. |
| 5,802,142 A | 9/1998 | Browne |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,822,751 A | 10/1998 | Gray et al. |
| 5,825,884 A | 10/1998 | Zdepski et al. |
| 5,828,833 A | 10/1998 | Belville et al. |
| 5,835,915 A | 11/1998 | Carr et al. |
| 5,844,218 A | 12/1998 | Kawan et al. |
| 5,848,396 A | 12/1998 | Gerace |
| 5,864,830 A | 2/1999 | Armetta et al. |
| 5,870,721 A | 2/1999 | Norris |
| 5,875,108 A | 2/1999 | Hoffberg et al. |
| 5,875,236 A | 2/1999 | Jankowitz |
| 5,878,403 A | 3/1999 | DeFrancesco |
| 5,881,131 A | 3/1999 | Farris et al. |
| 5,884,287 A | 3/1999 | Edesess |
| 5,884,289 A | 3/1999 | Anderson et al. |
| 5,893,090 A | 4/1999 | Friedman et al. |
| 5,905,985 A | 5/1999 | Malloy et al. |
| 5,912,839 A | 6/1999 | Ovshinsky et al. |
| 5,915,243 A | 6/1999 | Smolen |
| 5,924,082 A | 7/1999 | Silverman et al. |
| 5,926,800 A | 7/1999 | Baronowski et al. |
| 5,930,764 A | 7/1999 | Melchione et al. |
| 5,930,774 A | 7/1999 | Chennault |
| 5,930,776 A | 7/1999 | Dykstra et al. |
| 5,940,812 A | 8/1999 | Tengel et al. |
| 5,950,172 A | 9/1999 | Klingman |
| 5,950,179 A | 9/1999 | Buchanan et al. |
| 5,956,693 A | 9/1999 | Geerlings |
| 5,963,932 A | 10/1999 | Jakobsson et al. |
| 5,966,695 A | 10/1999 | Melchione et al. |
| 5,974,396 A | 10/1999 | Anderson et al. |
| 5,978,780 A | 11/1999 | Watson |
| 5,995,947 A | 11/1999 | Fraser et al. |
| 6,009,415 A | 12/1999 | Shurling et al. |
| 6,014,688 A | 1/2000 | Venkatraman et al. |
| 6,018,723 A | 1/2000 | Siegel et al. |
| 6,021,362 A | 2/2000 | Maggard et al. |
| 6,026,368 A | 2/2000 | Brown et al. |
| 6,029,139 A | 2/2000 | Cunningham et al. |
| 6,029,149 A | 2/2000 | Dykstra et al. |
| 6,029,154 A | 2/2000 | Pettitt |
| 6,038,551 A | 3/2000 | Barlow et al. |
| 6,044,357 A | 3/2000 | Garg |
| 6,058,375 A | 5/2000 | Park |
| 6,061,658 A | 5/2000 | Chou et al. |
| 6,061,691 A | 5/2000 | Fox |
| 6,064,973 A | 5/2000 | Smith et al. |
| 6,064,987 A | 5/2000 | Walker |
| 6,064,990 A | 5/2000 | Goldsmith |
| 6,070,141 A | 5/2000 | Houvener |
| 6,070,142 A | 5/2000 | McDonough et al. |
| 6,073,140 A | 6/2000 | Morgan et al. |
| 6,073,241 A | 6/2000 | Rosenberg et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,115,690 A | 9/2000 | Wong |
| 6,115,693 A | 9/2000 | McDonough et al. |
| 6,119,103 A | 9/2000 | Basch et al. |
| 6,121,901 A | 9/2000 | Welch et al. |
| 6,128,599 A | 10/2000 | Walker |
| 6,128,602 A | 10/2000 | Northington et al. |
| 6,128,603 A | 10/2000 | Dent |
| 6,128,624 A | 10/2000 | Papierniak et al. |
| 6,134,548 A | 10/2000 | Gottsman et al. |
| 6,144,957 A | 11/2000 | Cohen et al. |
| 6,151,601 A | 11/2000 | Papierniak et al. |
| 6,154,729 A | 11/2000 | Cannon et al. |
| 6,178,442 B1 | 1/2001 | Yamazaki |
| 6,182,060 B1 | 1/2001 | Hedgcock et al. |
| 6,198,217 B1 | 3/2001 | Suzuki et al. |
| 6,202,053 B1 | 3/2001 | Christiansen et al. |
| 6,208,979 B1 | 3/2001 | Sinclair |
| 6,223,171 B1 | 4/2001 | Chaudhuri et al. |
| 6,226,408 B1 | 5/2001 | Sirosh |
| 6,233,566 B1 | 5/2001 | Levine et al. |
| 6,236,977 B1 | 5/2001 | Verba et al. |
| 6,239,352 B1 | 5/2001 | Luch |
| 6,249,770 B1 | 6/2001 | Erwin et al. |
| 6,254,000 B1 | 7/2001 | Degen et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,266,649 B1 | 7/2001 | Linden et al. |
| 6,278,055 B1 | 8/2001 | Forrest et al. |
| 6,285,983 B1 | 9/2001 | Jenkins |
| 6,285,987 B1 | 9/2001 | Roth et al. |

(56) References Cited

U.S. PATENT DOCUMENTS

| | | |
|---|---|---|
| 6,289,252 B1 | 9/2001 | Wilson et al. |
| 6,304,860 B1 | 10/2001 | Martin et al. |
| 6,304,869 B1 | 10/2001 | Moore et al. |
| 6,307,958 B1 | 10/2001 | Deaton et al. |
| 6,311,169 B2 | 10/2001 | Duhon |
| 6,324,524 B1 | 11/2001 | Lent et al. |
| 6,330,546 B1 | 12/2001 | Gopinathan et al. |
| 6,330,575 B1 | 12/2001 | Moore |
| 6,334,110 B1 | 12/2001 | Walter et al. |
| 6,339,769 B1 | 1/2002 | Cochrane et al. |
| 6,345,300 B1 | 2/2002 | Bakshi et al. |
| 6,366,903 B1 | 4/2002 | Agrawal et al. |
| 6,385,594 B1 | 5/2002 | Lebda et al. |
| 6,393,406 B1 | 5/2002 | Eder |
| 6,397,197 B1 | 5/2002 | Gindlesperger |
| 6,405,173 B1 | 6/2002 | Honarvar |
| 6,405,181 B2 | 6/2002 | Lent et al. |
| 6,412,012 B1 | 6/2002 | Bieganski et al. |
| 6,418,436 B1 | 7/2002 | Degen et al. |
| 6,424,956 B1 | 7/2002 | Werbos |
| 6,430,539 B1 | 8/2002 | Lazarus et al. |
| 6,442,577 B1 | 8/2002 | Britton et al. |
| 6,456,979 B1 | 9/2002 | Flagg |
| 6,457,012 B1 | 9/2002 | Jatkowski |
| 6,460,036 B1 | 10/2002 | Herz |
| 6,496,819 B1 | 12/2002 | Bello et al. |
| 6,505,176 B2 | 1/2003 | DeFrancesco, Jr. et al. |
| 6,513,018 B1 | 1/2003 | Culhane |
| 6,523,022 B1 | 2/2003 | Hobbs |
| 6,523,041 B1 | 2/2003 | Morgan et al. |
| 6,532,450 B1 | 3/2003 | Brown et al. |
| 6,542,894 B1 | 4/2003 | Lee et al. |
| 6,543,683 B2 | 4/2003 | Hoffman |
| 6,567,791 B2 | 5/2003 | Lent et al. |
| 6,574,623 B1 | 6/2003 | Laung et al. |
| 6,597,775 B2 | 7/2003 | Lawyer et al. |
| 6,598,030 B1 | 7/2003 | Siegel et al. |
| 6,601,234 B1 | 7/2003 | Bowman-Amuah |
| 6,611,816 B2 | 8/2003 | Lebda et al. |
| 6,615,193 B1 | 9/2003 | Kingdon et al. |
| 6,615,247 B1 | 9/2003 | Murphy |
| 6,622,266 B1 | 9/2003 | Goddard et al. |
| 6,623,529 B1 | 9/2003 | Lakritz |
| 6,631,496 B1 | 10/2003 | Li et al. |
| 6,640,215 B1 | 10/2003 | Galperin et al. |
| 6,651,220 B1 | 11/2003 | Penteroudakis et al. |
| 6,654,727 B2 | 11/2003 | Tilton |
| 6,658,393 B1 | 12/2003 | Basch et al. |
| 6,665,715 B1 | 12/2003 | Houri |
| 6,687,713 B2 | 2/2004 | Mattson et al. |
| 6,708,166 B1 | 3/2004 | Dysart et al. |
| 6,714,918 B2 | 3/2004 | Hillmer et al. |
| 6,735,572 B2 | 5/2004 | Landesmann |
| 6,748,426 B1 | 6/2004 | Shaffer et al. |
| 6,757,740 B1 | 6/2004 | Parekh et al. |
| 6,766,327 B2 | 7/2004 | Morgan, Jr. et al. |
| 6,801,909 B2 | 10/2004 | Delgado et al. |
| 6,804,346 B1 | 10/2004 | Mewhinney |
| 6,804,701 B2 | 10/2004 | Muret et al. |
| 6,807,533 B1 | 10/2004 | Land et al. |
| 6,823,319 B1 | 11/2004 | Lynch et al. |
| 6,836,764 B1 | 12/2004 | Hucal |
| 6,839,682 B1 | 1/2005 | Blume et al. |
| 6,839,690 B1 | 1/2005 | Foth et al. |
| 6,850,606 B2 | 2/2005 | Lawyer et al. |
| 6,859,785 B2 | 2/2005 | Case |
| 6,865,566 B2 | 3/2005 | Serrano-Morales et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,915,269 B1 | 7/2005 | Shapiro et al. |
| 6,925,441 B1 | 8/2005 | Jones, III et al. |
| 6,959,281 B1 | 10/2005 | Freeling et al. |
| 6,965,889 B2 | 11/2005 | Serrano-Morales et al. |
| 6,970,830 B1 | 11/2005 | Samra et al. |
| 6,983,379 B1 | 1/2006 | Spalink et al. |
| 6,983,478 B1 | 1/2006 | Grauch et al. |
| 6,985,882 B1 | 1/2006 | Del Sesto |
| 6,985,887 B1 | 1/2006 | Sunstein et al. |
| 6,991,159 B2 | 1/2006 | Zenou |
| 6,993,493 B1 | 1/2006 | Galperin et al. |
| 6,999,941 B1 | 2/2006 | Agarwal |
| 7,003,504 B1 | 2/2006 | Angus et al. |
| 7,003,792 B1 | 2/2006 | Yuen |
| 7,028,052 B2 | 4/2006 | Chapman et al. |
| 7,031,945 B1 | 4/2006 | Donner |
| 7,039,176 B2 | 5/2006 | Borodow et al. |
| 7,039,607 B2 | 5/2006 | Watarai et al. |
| 7,047,251 B2 | 5/2006 | Reed et al. |
| 7,050,982 B2 | 5/2006 | Sheinson et al. |
| 7,050,986 B1 | 5/2006 | Vance et al. |
| 7,050,989 B1 | 5/2006 | Hurt et al. |
| 7,054,828 B2 | 5/2006 | Heching et al. |
| 7,069,240 B2 | 6/2006 | Spero et al. |
| 7,072,963 B2 | 7/2006 | Anderson et al. |
| 7,076,462 B1 | 7/2006 | Nelson et al. |
| 7,076,475 B2 | 7/2006 | Honarvar et al. |
| 7,082,435 B1 | 7/2006 | Guzman et al. |
| 7,092,898 B1 | 8/2006 | Mattick et al. |
| 7,117,172 B1 | 10/2006 | Black |
| 7,133,935 B2 | 11/2006 | Hedy |
| 7,136,448 B1 | 11/2006 | Venkataperumal et al. |
| 7,139,734 B2 | 11/2006 | Nathans et al. |
| 7,143,063 B2 | 11/2006 | Lent |
| 7,152,053 B2 | 12/2006 | Serrano-Morales et al. |
| 7,165,036 B2 | 1/2007 | Kruk et al. |
| 7,165,037 B2 | 1/2007 | Lazarus et al. |
| 7,184,974 B2 | 2/2007 | Shishido |
| 7,185,016 B1 | 2/2007 | Rasmussen |
| 7,191,144 B2 | 3/2007 | White |
| 7,200,602 B2 | 4/2007 | Jonas |
| 7,206,768 B1 | 4/2007 | deGroeve et al. |
| 7,212,995 B2 | 5/2007 | Schulkins |
| 7,234,156 B2 | 6/2007 | French et al. |
| 7,236,950 B2 | 6/2007 | Savage et al. |
| 7,240,059 B2 | 7/2007 | Bayliss et al. |
| 7,249,048 B1 | 7/2007 | O'Flaherty |
| 7,249,114 B2 | 7/2007 | Burchetta et al. |
| 7,263,506 B2 | 8/2007 | Lee et al. |
| 7,275,083 B1 | 9/2007 | Seibel et al. |
| 7,277,869 B2 | 10/2007 | Starkman |
| 7,277,875 B2 | 10/2007 | Serrano-Morales et al. |
| 7,277,900 B1 | 10/2007 | Ganesh et al. |
| 7,283,974 B2 | 10/2007 | Katz et al. |
| 7,296,734 B2 | 11/2007 | Pliha |
| 7,308,418 B2 | 12/2007 | Malek et al. |
| 7,313,538 B2 | 12/2007 | Wilmes et al. |
| 7,313,618 B2 | 12/2007 | Braemer et al. |
| 7,314,166 B2 | 1/2008 | Anderson et al. |
| 7,314,167 B1 | 1/2008 | Kiliccote |
| 7,324,962 B1 | 1/2008 | Valliani et al. |
| 7,328,169 B2 | 2/2008 | Temares et al. |
| 7,337,133 B1 | 2/2008 | Bezos et al. |
| 7,343,149 B2 | 3/2008 | Benco |
| 7,346,551 B2 | 3/2008 | Pe Jimenez et al. |
| 7,346,573 B1 | 3/2008 | Cobrinik et al. |
| 7,360,251 B2 | 4/2008 | Spalink et al. |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,324 B1 | 5/2008 | Engin et al. |
| 7,376,603 B1 | 5/2008 | Mayr et al. |
| 7,376,618 B1 | 5/2008 | Anderson et al. |
| 7,376,714 B1 | 5/2008 | Gerken |
| 7,379,880 B1 | 5/2008 | Pathria et al. |
| 7,383,227 B2 | 6/2008 | Weinflash et al. |
| 7,386,786 B2 | 6/2008 | Davis et al. |
| 7,392,203 B2 | 6/2008 | Edison et al. |
| 7,392,216 B1 | 6/2008 | Palmgren et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,362 B2 | 8/2008 | Calabria |

(56) References Cited

U.S. PATENT DOCUMENTS

| | | |
|---|---|---|
| 7,418,431 B1 | 8/2008 | Nies et al. |
| 7,421,322 B1 | 9/2008 | Silversmith et al. |
| 7,424,439 B1 | 9/2008 | Fayyad et al. |
| 7,428,509 B2 | 9/2008 | Klebanoff |
| 7,428,526 B2 | 9/2008 | Miller et al. |
| 7,433,855 B2 | 10/2008 | Gavan et al. |
| 7,444,302 B2 | 10/2008 | Hu et al. |
| 7,458,508 B1 | 12/2008 | Shao et al. |
| 7,467,127 B1 | 12/2008 | Baccash et al. |
| 7,467,401 B2 | 12/2008 | Cicchitto |
| 7,472,088 B2 | 12/2008 | Taylor et al. |
| 7,499,868 B2 | 3/2009 | Galperin et al. |
| 7,505,938 B2 | 3/2009 | Lang et al. |
| 7,509,117 B2 | 3/2009 | Yum |
| 7,512,221 B2 | 3/2009 | Toms |
| 7,516,149 B2 | 4/2009 | Motwani et al. |
| 7,529,698 B2 | 5/2009 | Joao |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,993 B2 | 6/2009 | Satterfield et al. |
| 7,546,266 B2 | 6/2009 | Beirne et al. |
| 7,548,886 B2 | 6/2009 | Kirkland et al. |
| 7,552,089 B2 | 6/2009 | Bruer et al. |
| 7,556,192 B2 | 7/2009 | Wokaty, Jr. |
| 7,562,184 B2 | 7/2009 | Henmi et al. |
| 7,571,139 B1 | 8/2009 | Giordano et al. |
| 7,575,157 B2 | 8/2009 | Barnhardt et al. |
| 7,580,856 B1 | 8/2009 | Pliha |
| 7,581,112 B2 | 8/2009 | Brown et al. |
| 7,584,126 B1 | 9/2009 | White |
| 7,584,146 B1 | 9/2009 | Duhon |
| 7,590,589 B2 | 9/2009 | Hoffberg |
| 7,593,893 B1 | 9/2009 | Ladd et al. |
| 7,596,512 B1 | 9/2009 | Raines et al. |
| 7,596,716 B2 | 9/2009 | Frost et al. |
| 7,606,778 B2 | 10/2009 | Dewar |
| 7,610,216 B1 | 10/2009 | May et al. |
| 7,610,243 B2 | 10/2009 | Haggerty et al. |
| 7,610,257 B1 | 10/2009 | Abrahams |
| 7,613,671 B2 | 11/2009 | Serrano-Morales et al. |
| 7,620,592 B2 | 11/2009 | O'Mara et al. |
| 7,620,596 B2 | 11/2009 | Knudson et al. |
| 7,623,844 B2 | 11/2009 | Herrmann et al. |
| 7,624,068 B1 | 11/2009 | Heasley et al. |
| 7,653,592 B1 | 1/2010 | Flaxman et al. |
| 7,653,593 B2 | 1/2010 | Zarikian et al. |
| 7,657,471 B1 | 2/2010 | Sankaran et al. |
| 7,657,540 B1 | 2/2010 | Bayliss |
| 7,668,769 B2 | 2/2010 | Baker et al. |
| 7,668,840 B2 | 2/2010 | Bayliss et al. |
| 7,672,865 B2 | 3/2010 | Kumar et al. |
| 7,676,410 B2 | 3/2010 | Petralia |
| 7,676,418 B1 | 3/2010 | Chung et al. |
| 7,676,751 B2 | 3/2010 | Allen et al. |
| 7,686,214 B1 | 3/2010 | Shao et al. |
| 7,689,494 B2 | 3/2010 | Torre et al. |
| 7,689,504 B2 | 3/2010 | Warren et al. |
| 7,689,505 B2 | 3/2010 | Kasower |
| 7,690,032 B1 | 3/2010 | Peirce |
| 7,693,787 B2 | 4/2010 | Provinse |
| 7,698,163 B2 | 4/2010 | Reed et al. |
| 7,702,550 B2 | 4/2010 | Perg et al. |
| 7,707,059 B2 | 4/2010 | Reed et al. |
| 7,707,102 B2 | 4/2010 | Rothstein |
| 7,708,190 B2 | 5/2010 | Brandt et al. |
| 7,711,635 B2 | 5/2010 | Steele et al. |
| 7,711,636 B2 | 5/2010 | Robida et al. |
| 7,720,846 B1 | 5/2010 | Bayliss |
| 7,725,300 B2 | 5/2010 | Pinto et al. |
| 7,734,523 B1 | 6/2010 | Cui et al. |
| 7,734,539 B2 | 6/2010 | Ghosh et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,761,379 B2 | 7/2010 | Zoldi et al. |
| 7,761,384 B2 | 7/2010 | Madhogarhia |
| 7,769,998 B2 | 8/2010 | Lynch et al. |
| 7,778,885 B1 | 8/2010 | Semprevivo et al. |
| 7,783,515 B1 | 8/2010 | Kumar et al. |
| 7,783,562 B1 | 8/2010 | Ellis |
| 7,788,147 B2 | 8/2010 | Haggerty et al. |
| 7,788,152 B2 | 8/2010 | Haggerty et al. |
| 7,792,732 B2 | 9/2010 | Haggerty et al. |
| 7,793,835 B1 | 9/2010 | Coggeshall et al. |
| 7,797,252 B2 | 9/2010 | Rosskamm et al. |
| 7,801,811 B1 | 9/2010 | Merrell et al. |
| 7,802,104 B2 | 9/2010 | Dickinson |
| 7,805,345 B2 | 9/2010 | Abrahams et al. |
| 7,805,362 B1 | 9/2010 | Merrell et al. |
| 7,814,004 B2 | 10/2010 | Haggerty et al. |
| 7,818,231 B2 | 10/2010 | Rajan |
| 7,822,665 B2 | 10/2010 | Haggerty et al. |
| 7,827,115 B2 | 11/2010 | Weller et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,844,534 B2 | 11/2010 | Haggerty et al. |
| 7,848,972 B1 | 12/2010 | Sharma |
| 7,848,978 B2 | 12/2010 | Imrey et al. |
| 7,848,987 B2 | 12/2010 | Haig |
| 7,849,004 B2 | 12/2010 | Choudhuri et al. |
| 7,853,518 B2 | 12/2010 | Cagan |
| 7,853,998 B2 | 12/2010 | Blaisdell et al. |
| 7,856,386 B2 | 12/2010 | Hazlehurst et al. |
| 7,856,397 B2 | 12/2010 | Whipple et al. |
| 7,856,494 B2 | 12/2010 | Kulkarni |
| 7,860,786 B2 | 12/2010 | Blackburn et al. |
| 7,870,078 B2 | 1/2011 | Clark et al. |
| 7,877,320 B1 | 1/2011 | Downey |
| 7,877,322 B2 | 1/2011 | Nathans et al. |
| 7,890,420 B2 | 2/2011 | Haggerty et al. |
| 7,899,750 B1 | 3/2011 | Klieman et al. |
| 7,904,366 B2 | 3/2011 | Pogust |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,549 B2 | 4/2011 | Looney et al. |
| 7,925,582 B1 | 4/2011 | Kornegay et al. |
| 7,930,242 B2 | 4/2011 | Morris et al. |
| 7,930,285 B2 | 4/2011 | Abraham et al. |
| 7,941,363 B2 | 5/2011 | Tanaka et al. |
| 7,954,698 B1 | 6/2011 | Pliha |
| 7,958,126 B2 | 6/2011 | Schachter |
| 7,962,404 B1 | 6/2011 | Metzger, II et al. |
| 7,966,255 B2 | 6/2011 | Wong et al. |
| 7,970,676 B2 | 6/2011 | Feinstein |
| 7,970,701 B2 | 6/2011 | Lewis et al. |
| 7,974,860 B1 | 7/2011 | Travis |
| 7,983,976 B2 | 7/2011 | Nafeh et al. |
| 7,991,666 B2 | 8/2011 | Haggerty et al. |
| 7,991,677 B2 | 8/2011 | Haggerty et al. |
| 7,991,688 B2 | 8/2011 | Phelan et al. |
| 7,991,689 B1 | 8/2011 | Brunzell et al. |
| 7,996,521 B2 | 8/2011 | Chamberlain et al. |
| 8,001,042 B1 | 8/2011 | Brunzell et al. |
| 8,005,712 B2 | 8/2011 | von Davier et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,019,843 B2 | 9/2011 | Cash et al. |
| 8,024,245 B2 | 9/2011 | Haggerty et al. |
| 8,024,263 B2 | 9/2011 | Zarikian et al. |
| 8,024,264 B2 | 9/2011 | Chaudhuri et al. |
| 8,024,778 B2 | 9/2011 | Cash et al. |
| 8,036,979 B1 | 10/2011 | Torrez et al. |
| 8,046,271 B2 | 10/2011 | Jimenez et al. |
| 8,060,424 B2 | 11/2011 | Kasower |
| 8,064,586 B2 | 11/2011 | Shaffer et al. |
| 8,065,233 B2 | 11/2011 | Lee et al. |
| 8,065,234 B2 | 11/2011 | Liao et al. |
| 8,073,752 B2 | 12/2011 | Haggerty et al. |
| 8,073,768 B2 | 12/2011 | Haggerty et al. |

(56) References Cited

U.S. PATENT DOCUMENTS

| | | |
|---|---|---|
| 8,078,453 B2 | 12/2011 | Shaw |
| 8,078,524 B2 | 12/2011 | Crawford et al. |
| 8,078,528 B1 | 12/2011 | Vicente et al. |
| 8,082,202 B2 | 12/2011 | Weiss |
| 8,086,509 B2 | 12/2011 | Haggerty et al. |
| 8,086,524 B1 | 12/2011 | Craig et al. |
| 8,095,443 B2 | 1/2012 | DeBie |
| 8,099,356 B2 | 1/2012 | Feinstein et al. |
| 8,103,530 B2 | 1/2012 | Quiring et al. |
| 8,104,671 B2 | 1/2012 | Besecker et al. |
| 8,104,679 B2 | 1/2012 | Brown |
| 8,121,918 B2 | 2/2012 | Haggerty et al. |
| 8,126,805 B2 | 2/2012 | Sulkowski et al. |
| 8,127,982 B1 | 3/2012 | Casey et al. |
| 8,131,614 B2 | 3/2012 | Haggerty et al. |
| 8,131,639 B2 | 3/2012 | Haggerty et al. |
| 8,135,642 B1 | 3/2012 | Krause |
| 8,145,754 B2 | 3/2012 | Chamberlain et al. |
| 8,160,960 B1 | 4/2012 | Fei et al. |
| 8,161,104 B2 | 4/2012 | Tomkow |
| 8,170,938 B2 | 5/2012 | Haggerty et al. |
| 8,175,945 B2 | 5/2012 | Haggerty et al. |
| 8,180,654 B2 | 5/2012 | Berkman et al. |
| 8,185,408 B2 | 5/2012 | Baldwin, Jr. et al. |
| 8,195,550 B2 | 6/2012 | Haggerty et al. |
| 8,204,774 B2 | 6/2012 | Chwast et al. |
| 8,209,250 B2 | 6/2012 | Bradway et al. |
| 8,214,238 B1 | 7/2012 | Fairfield et al. |
| 8,214,262 B1 | 7/2012 | Semprevivo et al. |
| 8,219,464 B2 | 7/2012 | Inghelbrecht et al. |
| 8,219,535 B1 | 7/2012 | Kobori et al. |
| 8,234,498 B2 | 7/2012 | Britti et al. |
| 8,239,130 B1 | 8/2012 | Upstill et al. |
| 8,271,378 B2 | 9/2012 | Chaudhuri et al. |
| 8,280,805 B1 | 10/2012 | Abrahams et al. |
| 8,285,577 B1 | 10/2012 | Galperin et al. |
| 8,285,656 B1 | 10/2012 | Chang et al. |
| 8,290,840 B2 | 10/2012 | Kasower |
| 8,296,213 B2 | 10/2012 | Haggerty et al. |
| 8,296,229 B1 | 10/2012 | Yellin et al. |
| 8,301,574 B2 | 10/2012 | Kilger et al. |
| 8,306,890 B2 | 11/2012 | Haggerty et al. |
| 8,315,933 B2 | 11/2012 | Haggerty et al. |
| 8,315,942 B2 | 11/2012 | Haggerty et al. |
| 8,315,943 B2 | 11/2012 | Torrez et al. |
| 8,321,335 B1 | 11/2012 | Bramlage et al. |
| 8,326,671 B2 | 12/2012 | Haggerty et al. |
| 8,326,672 B2 | 12/2012 | Haggerty et al. |
| 8,326,760 B2 | 12/2012 | Ma et al. |
| 8,340,685 B2 | 12/2012 | Cochran et al. |
| 8,341,073 B1 | 12/2012 | Bramlage et al. |
| 8,352,343 B2 | 1/2013 | Haggerty et al. |
| 8,364,518 B1 | 1/2013 | Blake et al. |
| 8,364,582 B2 | 1/2013 | Haggerty et al. |
| 8,364,588 B2 | 1/2013 | Celka et al. |
| 8,386,377 B1 | 2/2013 | Xiong et al. |
| 8,392,334 B2 | 3/2013 | Hirtenstein et al. |
| 8,401,889 B2 | 3/2013 | Chwast et al. |
| 8,417,587 B2 | 4/2013 | Jimenez et al. |
| 8,417,612 B2 | 4/2013 | Chatterji et al. |
| 8,433,512 B1 | 4/2013 | Lopatenko et al. |
| 8,438,105 B2 | 5/2013 | Haggerty et al. |
| 8,458,074 B2 | 6/2013 | Showalter |
| 8,468,198 B2 | 6/2013 | Tomkow |
| 8,473,354 B2 | 6/2013 | Psota et al. |
| 8,478,673 B2 | 7/2013 | Haggerty et al. |
| 8,489,482 B2 | 7/2013 | Haggerty et al. |
| 8,510,184 B2 | 8/2013 | Imrey et al. |
| 8,515,828 B1 | 8/2013 | Wolf et al. |
| 8,515,862 B2 | 8/2013 | Zhang et al. |
| 8,533,322 B2 | 9/2013 | Chamberlain et al. |
| 8,560,434 B2 | 10/2013 | Morris et al. |
| 8,566,029 B1 | 10/2013 | Lopatenko et al. |
| 8,566,167 B2 | 10/2013 | Munjal |
| 8,589,069 B1 | 11/2013 | Lehman |
| 8,589,208 B2 | 11/2013 | Kruger et al. |
| 8,595,101 B1 | 11/2013 | Daukas et al. |
| 8,600,854 B2 | 12/2013 | Mayr et al. |
| 8,606,626 B1 | 12/2013 | DeSoto et al. |
| 8,606,666 B1 | 12/2013 | Courbage et al. |
| 8,620,579 B1 | 12/2013 | Upstill et al. |
| 8,626,560 B1 | 1/2014 | Anderson |
| 8,626,618 B2 | 1/2014 | Psota et al. |
| 8,626,646 B2 | 1/2014 | Torrez et al. |
| 8,630,929 B2 | 1/2014 | Haggerty et al. |
| 8,639,920 B2 | 1/2014 | Stack et al. |
| 8,666,885 B1 | 3/2014 | Bramlage et al. |
| 8,682,770 B2 | 3/2014 | Haggerty et al. |
| 8,694,390 B2 | 4/2014 | Imrey et al. |
| 8,694,403 B2 | 4/2014 | Haggerty et al. |
| 8,706,596 B2 | 4/2014 | Cohen et al. |
| 8,732,004 B1 | 5/2014 | Ramos et al. |
| 8,738,515 B2 | 5/2014 | Chaudhuri et al. |
| 8,744,944 B2 | 6/2014 | Haggerty et al. |
| 8,751,461 B2 * | 6/2014 | Abraham ........... G06Q 10/0637 705/51 |
| 8,762,053 B1 | 6/2014 | Lehman |
| 8,775,290 B2 | 7/2014 | Haggerty et al. |
| 8,775,299 B2 | 7/2014 | Achanta et al. |
| 8,775,301 B2 | 7/2014 | Haggerty et al. |
| 8,781,877 B2 | 7/2014 | Kruger et al. |
| 8,781,933 B2 | 7/2014 | Haggerty et al. |
| 8,781,951 B2 | 7/2014 | Lewis et al. |
| 8,781,953 B2 | 7/2014 | Kasower |
| 8,781,975 B2 | 7/2014 | Bennett et al. |
| 8,788,388 B2 | 7/2014 | Chatterji et al. |
| 8,805,805 B1 | 8/2014 | Kobori et al. |
| 8,825,544 B2 | 9/2014 | Imrey et al. |
| 8,930,251 B2 | 1/2015 | DeBie |
| 8,938,432 B2 | 1/2015 | Rossmark et al. |
| 8,966,649 B2 | 2/2015 | Stack et al. |
| 9,026,088 B1 | 5/2015 | Groenjes |
| 9,057,616 B1 | 6/2015 | Lopatenko et al. |
| 9,057,617 B1 | 6/2015 | Lopatenko et al. |
| 9,058,340 B1 | 6/2015 | Chamberlain et al. |
| 9,063,226 B2 | 6/2015 | Zheng et al. |
| 9,143,541 B1 | 9/2015 | Szamonek et al. |
| 9,147,042 B1 | 9/2015 | Haller et al. |
| 9,152,727 B1 | 10/2015 | Balducci et al. |
| 9,251,541 B2 | 2/2016 | Celka et al. |
| 9,378,500 B2 | 6/2016 | Jimenez et al. |
| 9,483,606 B1 | 11/2016 | Dean et al. |
| 9,508,092 B1 | 11/2016 | De Soto et al. |
| 9,509,711 B1 | 11/2016 | Keanini |
| 9,553,936 B2 | 1/2017 | Dijk et al. |
| 9,563,916 B1 | 2/2017 | Torrez et al. |
| 9,576,030 B1 | 2/2017 | Kapczynski et al. |
| 9,595,051 B2 | 3/2017 | Stack et al. |
| 9,619,579 B1 | 4/2017 | Courbage et al. |
| 9,652,802 B1 | 5/2017 | Kasower |
| 9,870,589 B1 | 1/2018 | Arnold et al. |
| 9,916,596 B1 | 3/2018 | DeSoto et al. |
| 9,916,621 B1 | 3/2018 | Wasser et al. |
| 10,019,508 B1 | 7/2018 | Kapczynski |
| 10,078,868 B1 | 9/2018 | Courbage et al. |
| 2001/0013011 A1 | 8/2001 | Day et al. |
| 2001/0014868 A1 | 8/2001 | Herz et al. |
| 2001/0014878 A1 | 8/2001 | Mitra et al. |
| 2001/0016833 A1 | 8/2001 | Everling et al. |
| 2001/0027413 A1 | 10/2001 | Bhutta |
| 2001/0029470 A1 | 10/2001 | Schultz et al. |
| 2001/0034631 A1 | 10/2001 | Kiselik |
| 2001/0037332 A1 | 11/2001 | Miller et al. |
| 2001/0039523 A1 | 11/2001 | Iwamoto |
| 2001/0049620 A1 | 12/2001 | Blasko |
| 2002/0019804 A1 | 2/2002 | Sutton |
| 2002/0023051 A1 | 2/2002 | Kunzle et al. |
| 2002/0023143 A1 | 2/2002 | Stephenson et al. |
| 2002/0026411 A1 | 2/2002 | Nathans et al. |
| 2002/0029162 A1 | 3/2002 | Mascarenhas |
| 2002/0035511 A1 | 3/2002 | Haji et al. |
| 2002/0046096 A1 | 4/2002 | Srinivasan et al. |
| 2002/0049626 A1 | 4/2002 | Mathis et al. |
| 2002/0049701 A1 | 4/2002 | Nabe et al. |

(56) References Cited

U.S. PATENT DOCUMENTS

| | | |
|---|---|---|
| 2002/0049738 A1 | 4/2002 | Epstein |
| 2002/0052836 A1 | 5/2002 | Galperin et al. |
| 2002/0052841 A1 | 5/2002 | Guthrie et al. |
| 2002/0055869 A1 | 5/2002 | Hegg |
| 2002/0069122 A1 | 6/2002 | Yun et al. |
| 2002/0072927 A1 | 6/2002 | Phelan et al. |
| 2002/0077964 A1 | 6/2002 | Brody et al. |
| 2002/0082892 A1 | 6/2002 | Raffel et al. |
| 2002/0087460 A1 | 7/2002 | Hornung |
| 2002/0091706 A1 | 7/2002 | Anderson et al. |
| 2002/0095360 A1 | 7/2002 | Joao |
| 2002/0099628 A1 | 7/2002 | Takaoka et al. |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0099936 A1 | 7/2002 | Kou et al. |
| 2002/0111845 A1 | 8/2002 | Chong |
| 2002/0119824 A1 | 8/2002 | Allen |
| 2002/0120504 A1 | 8/2002 | Gould et al. |
| 2002/0123928 A1 | 9/2002 | Eldering et al. |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133444 A1 | 9/2002 | Sankaran et al. |
| 2002/0138297 A1 | 9/2002 | Lee |
| 2002/0138331 A1 | 9/2002 | Hosea et al. |
| 2002/0138333 A1 | 9/2002 | DeCotiis et al. |
| 2002/0138334 A1 | 9/2002 | DeCotiis et al. |
| 2002/0138417 A1 | 9/2002 | Lawrence |
| 2002/0143661 A1 | 10/2002 | Tumulty et al. |
| 2002/0147623 A1 | 10/2002 | Rifaat |
| 2002/0147669 A1 | 10/2002 | Taylor et al. |
| 2002/0147695 A1 | 10/2002 | Khedkar et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0161711 A1 | 10/2002 | Sartor et al. |
| 2002/0165757 A1 | 11/2002 | Lisser |
| 2002/0169747 A1 | 11/2002 | Chapman et al. |
| 2002/0173984 A1 | 11/2002 | Robertson et al. |
| 2002/0173994 A1 | 11/2002 | Ferguson, III |
| 2002/0184255 A1 | 12/2002 | Edd et al. |
| 2002/0188544 A1 | 12/2002 | Wizon et al. |
| 2002/0194099 A1 | 12/2002 | Weiss |
| 2002/0194103 A1 | 12/2002 | Nabe |
| 2002/0194140 A1 | 12/2002 | Makuck |
| 2002/0198824 A1 | 12/2002 | Cook |
| 2003/0000568 A1 | 1/2003 | Gonsiorawski |
| 2003/0002639 A1 | 1/2003 | Huie |
| 2003/0004787 A1 | 1/2003 | Tripp et al. |
| 2003/0004855 A1 | 1/2003 | Dutta et al. |
| 2003/0004865 A1 | 1/2003 | Kinoshita |
| 2003/0009368 A1 | 1/2003 | Kitts |
| 2003/0009393 A1 | 1/2003 | Norris et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0018578 A1 | 1/2003 | Schultz |
| 2003/0018769 A1 | 1/2003 | Foulger et al. |
| 2003/0023489 A1 | 1/2003 | McGuire et al. |
| 2003/0033242 A1 | 2/2003 | Lynch et al. |
| 2003/0033261 A1 | 2/2003 | Knegendorf |
| 2003/0041031 A1 | 2/2003 | Hedy |
| 2003/0046222 A1 | 3/2003 | Bard et al. |
| 2003/0060284 A1 | 3/2003 | Hamalainen et al. |
| 2003/0061132 A1 | 3/2003 | Yu et al. |
| 2003/0061163 A1 | 3/2003 | Durfield |
| 2003/0065563 A1 | 4/2003 | Elliott et al. |
| 2003/0069839 A1 | 4/2003 | Whittington et al. |
| 2003/0078877 A1 | 4/2003 | Beirne et al. |
| 2003/0093289 A1 | 5/2003 | Thornley et al. |
| 2003/0093311 A1 | 5/2003 | Knowlson |
| 2003/0093366 A1 | 5/2003 | Halper et al. |
| 2003/0097320 A1 | 5/2003 | Gordon |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0105696 A1 | 6/2003 | Kalotay et al. |
| 2003/0105728 A1 | 6/2003 | Yano et al. |
| 2003/0110111 A1 | 6/2003 | Nalebuff et al. |
| 2003/0110293 A1 | 6/2003 | Friedman et al. |
| 2003/0113727 A1 | 6/2003 | Girn et al. |
| 2003/0115080 A1 | 6/2003 | Kasravi et al. |
| 2003/0115133 A1 | 6/2003 | Bian |
| 2003/0120591 A1 | 6/2003 | Birkhead et al. |
| 2003/0135451 A1 | 7/2003 | O'Brien et al. |
| 2003/0139986 A1 | 7/2003 | Roberts |
| 2003/0144950 A1 | 7/2003 | O'Brien et al. |
| 2003/0149610 A1 | 8/2003 | Rowan et al. |
| 2003/0158751 A1 | 8/2003 | Suresh et al. |
| 2003/0158776 A1 | 8/2003 | Landesmann |
| 2003/0163708 A1 | 8/2003 | Tang |
| 2003/0164497 A1 | 9/2003 | Carcia et al. |
| 2003/0167218 A1 | 9/2003 | Field et al. |
| 2003/0171942 A1 | 9/2003 | Gaito |
| 2003/0182214 A1 | 9/2003 | Taylor |
| 2003/0195830 A1 | 10/2003 | Merkoulovitch et al. |
| 2003/0195859 A1 | 10/2003 | Lawrence |
| 2003/0200151 A1 | 10/2003 | Ellenson et al. |
| 2003/0205845 A1 | 11/2003 | Pichler et al. |
| 2003/0208362 A1 | 11/2003 | Enthoven et al. |
| 2003/0208428 A1 | 11/2003 | Raynes et al. |
| 2003/0212618 A1 | 11/2003 | Keyes et al. |
| 2003/0212654 A1 | 11/2003 | Harper et al. |
| 2003/0216965 A1 | 11/2003 | Libman |
| 2003/0219709 A1 | 11/2003 | Olenick et al. |
| 2003/0225656 A1 | 12/2003 | Aberman et al. |
| 2003/0225692 A1 | 12/2003 | Bosch et al. |
| 2003/0225742 A1 | 12/2003 | Tenner et al. |
| 2003/0229892 A1 | 12/2003 | Sardera |
| 2003/0233278 A1 | 12/2003 | Marshall |
| 2003/0233323 A1 | 12/2003 | Bilski et al. |
| 2003/0233655 A1 | 12/2003 | Gutta et al. |
| 2003/0236738 A1 | 12/2003 | Lange et al. |
| 2004/0002916 A1 | 1/2004 | Timmerman et al. |
| 2004/0006536 A1 | 1/2004 | Kawashima et al. |
| 2004/0010443 A1 | 1/2004 | May et al. |
| 2004/0019518 A1 | 1/2004 | Abraham et al. |
| 2004/0023637 A1 | 2/2004 | Johnson et al. |
| 2004/0024692 A1 | 2/2004 | Turbeville et al. |
| 2004/0029311 A1 | 2/2004 | Snyder et al. |
| 2004/0030649 A1 | 2/2004 | Nelson et al. |
| 2004/0030667 A1 | 2/2004 | Xu et al. |
| 2004/0033375 A1 | 2/2004 | Mori |
| 2004/0034570 A1 | 2/2004 | Davis et al. |
| 2004/0039681 A1 | 2/2004 | Cullen et al. |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0046497 A1 | 3/2004 | Shaepkens et al. |
| 2004/0049452 A1 | 3/2004 | Blagg |
| 2004/0054619 A1 | 3/2004 | Watson et al. |
| 2004/0059626 A1 | 3/2004 | Smallwood |
| 2004/0059653 A1 | 3/2004 | Verkuylen et al. |
| 2004/0062213 A1 | 4/2004 | Koss |
| 2004/0078248 A1 | 4/2004 | Altschuler |
| 2004/0078324 A1 | 4/2004 | Lonnberg et al. |
| 2004/0083215 A1 | 4/2004 | de Jong |
| 2004/0088221 A1 | 5/2004 | Katz et al. |
| 2004/0093278 A1 | 5/2004 | Burchetta et al. |
| 2004/0098625 A1 | 5/2004 | Lagadec et al. |
| 2004/0102197 A1 | 5/2004 | Dietz |
| 2004/0103147 A1 | 5/2004 | Flesher et al. |
| 2004/0107123 A1 | 6/2004 | Haffner et al. |
| 2004/0107125 A1 | 6/2004 | Guheen et al. |
| 2004/0111305 A1 | 6/2004 | Gavan et al. |
| 2004/0111358 A1 | 6/2004 | Lange et al. |
| 2004/0111363 A1 | 6/2004 | Trench et al. |
| 2004/0117235 A1 | 6/2004 | Shacham |
| 2004/0117358 A1 | 6/2004 | Von Kaenel et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128227 A1 | 7/2004 | Whipple et al. |

(56) References Cited

U.S. PATENT DOCUMENTS

| | | |
|---|---|---|
| 2004/0128230 A1 | 7/2004 | Oppenheimer et al. |
| 2004/0128232 A1 | 7/2004 | Descloux |
| 2004/0128236 A1 | 7/2004 | Brown et al. |
| 2004/0139035 A1 | 7/2004 | Wang |
| 2004/0143526 A1 | 7/2004 | Monasterio et al. |
| 2004/0143546 A1 | 7/2004 | Wood et al. |
| 2004/0153330 A1 | 8/2004 | Miller et al. |
| 2004/0153448 A1 | 8/2004 | Cheng et al. |
| 2004/0158520 A1 | 8/2004 | Noh |
| 2004/0158523 A1 | 8/2004 | Dort |
| 2004/0163101 A1 | 8/2004 | Swix |
| 2004/0167793 A1 | 8/2004 | Masuoka et al. |
| 2004/0176995 A1 | 9/2004 | Fusz |
| 2004/0177046 A1 | 9/2004 | Ogram |
| 2004/0186807 A1 | 9/2004 | Nathans et al. |
| 2004/0193535 A1 | 9/2004 | Barazesh |
| 2004/0193538 A1 | 9/2004 | Raines |
| 2004/0199456 A1 | 10/2004 | Flint et al. |
| 2004/0199458 A1 | 10/2004 | Ho |
| 2004/0199462 A1 | 10/2004 | Starrs |
| 2004/0199789 A1 | 10/2004 | Shaw et al. |
| 2004/0205157 A1 | 10/2004 | Bibelnieks et al. |
| 2004/0212299 A1 | 10/2004 | Ishikawa et al. |
| 2004/0220896 A1 | 11/2004 | Finlay et al. |
| 2004/0225545 A1 | 11/2004 | Turner et al. |
| 2004/0225586 A1 | 11/2004 | Woods et al. |
| 2004/0225594 A1 | 11/2004 | Nolan, III et al. |
| 2004/0225596 A1 | 11/2004 | Kemper et al. |
| 2004/0230448 A1 | 11/2004 | Schaich |
| 2004/0230459 A1 | 11/2004 | Dordick et al. |
| 2004/0230527 A1 | 11/2004 | Hansen et al. |
| 2004/0230534 A1 | 11/2004 | McGough |
| 2004/0230820 A1 | 11/2004 | Hui Hsu et al. |
| 2004/0243450 A1 | 12/2004 | Bernard, Jr. et al. |
| 2004/0243518 A1 | 12/2004 | Clifton et al. |
| 2004/0243588 A1 | 12/2004 | Tanner et al. |
| 2004/0261116 A1 | 12/2004 | Mckeown et al. |
| 2005/0004805 A1 | 1/2005 | Srinivasan |
| 2005/0015330 A1 | 1/2005 | Beery et al. |
| 2005/0021397 A1 | 1/2005 | Cui et al. |
| 2005/0021476 A1 | 1/2005 | Candella et al. |
| 2005/0027633 A1 | 2/2005 | Fortuna et al. |
| 2005/0027983 A1 | 2/2005 | Klawon |
| 2005/0033734 A1 | 2/2005 | Chess et al. |
| 2005/0038726 A1 | 2/2005 | Salomon et al. |
| 2005/0050027 A1 | 3/2005 | Yeh et al. |
| 2005/0058262 A1 | 3/2005 | Timmins et al. |
| 2005/0065874 A1 | 3/2005 | Lefner et al. |
| 2005/0086261 A1 | 4/2005 | Mammone |
| 2005/0091164 A1 | 4/2005 | Varble |
| 2005/0097039 A1 | 5/2005 | Kulcsar et al. |
| 2005/0102206 A1 | 5/2005 | Savasoglu et al. |
| 2005/0102226 A1 | 5/2005 | Oppenheimer et al. |
| 2005/0113991 A1 | 5/2005 | Rogers et al. |
| 2005/0125350 A1 | 6/2005 | Tidwell et al. |
| 2005/0130704 A1 | 6/2005 | McParland et al. |
| 2005/0137899 A1 | 6/2005 | Davies et al. |
| 2005/0137963 A1 | 6/2005 | Ricketts et al. |
| 2005/0144452 A1 | 6/2005 | Lynch et al. |
| 2005/0144641 A1 | 6/2005 | Lewis |
| 2005/0154664 A1 | 7/2005 | Guy et al. |
| 2005/0154665 A1 | 7/2005 | Kerr |
| 2005/0159996 A1 | 7/2005 | Lazaraus et al. |
| 2005/0177489 A1 | 8/2005 | Neff et al. |
| 2005/0192008 A1 | 9/2005 | Desai et al. |
| 2005/0197953 A1 | 9/2005 | Broadbent et al. |
| 2005/0197954 A1 | 9/2005 | Maitland et al. |
| 2005/0201272 A1 | 9/2005 | Wang et al. |
| 2005/0209892 A1 | 9/2005 | Miller |
| 2005/0209922 A1 | 9/2005 | Hofmeister |
| 2005/0222900 A1 | 10/2005 | Fuloria et al. |
| 2005/0228692 A1 | 10/2005 | Hodgon |
| 2005/0246256 A1 | 11/2005 | Gastineau et al. |
| 2005/0251408 A1 | 11/2005 | Swaminathan et al. |
| 2005/0251474 A1 | 11/2005 | Shinn et al. |
| 2005/0251820 A1 | 11/2005 | Stefanik et al. |
| 2005/0256780 A1 | 11/2005 | Eldred |
| 2005/0256809 A1 | 11/2005 | Sadri |
| 2005/0257250 A1 | 11/2005 | Mitchell et al. |
| 2005/0262014 A1 | 11/2005 | Fickes |
| 2005/0262158 A1 | 11/2005 | Sauermann |
| 2005/0267774 A1 | 12/2005 | Merritt et al. |
| 2005/0273442 A1 | 12/2005 | Bennett et al. |
| 2005/0273849 A1 | 12/2005 | Araujo et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2005/0279827 A1 | 12/2005 | Mascavage et al. |
| 2005/0288954 A1 | 12/2005 | McCarthy et al. |
| 2005/0288998 A1 | 12/2005 | Verma et al. |
| 2005/0289003 A1 | 12/2005 | Thompson et al. |
| 2006/0004626 A1 | 1/2006 | Holmen et al. |
| 2006/0004731 A1 | 1/2006 | Seibel et al. |
| 2006/0010055 A1 | 1/2006 | Morita et al. |
| 2006/0014129 A1 | 1/2006 | Coleman et al. |
| 2006/0015425 A1 | 1/2006 | Brooks |
| 2006/0020611 A1 | 1/2006 | Gilbert et al. |
| 2006/0031158 A1 | 2/2006 | Orman |
| 2006/0031747 A1 | 2/2006 | Wada et al. |
| 2006/0032909 A1 | 2/2006 | Seegar |
| 2006/0041443 A1 | 2/2006 | Horvath |
| 2006/0041464 A1 | 2/2006 | Powers et al. |
| 2006/0041840 A1 | 2/2006 | Blair |
| 2006/0059073 A1 | 3/2006 | Walzak |
| 2006/0059110 A1 | 3/2006 | Madhok et al. |
| 2006/0074986 A1 | 4/2006 | Mallalieu et al. |
| 2006/0080126 A1 | 4/2006 | Greer et al. |
| 2006/0080230 A1 | 4/2006 | Freiberg |
| 2006/0080233 A1 | 4/2006 | Mendelovich et al. |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0089842 A1 | 4/2006 | Medawar |
| 2006/0095363 A1 | 5/2006 | May |
| 2006/0095923 A1 | 5/2006 | Novack et al. |
| 2006/0100954 A1 | 5/2006 | Schoen |
| 2006/0122921 A1 | 6/2006 | Comerford et al. |
| 2006/0129428 A1 | 6/2006 | Wennberg |
| 2006/0129481 A1 | 6/2006 | Bhatt et al. |
| 2006/0131390 A1 | 6/2006 | Kim |
| 2006/0136330 A1 | 6/2006 | DeRoy et al. |
| 2006/0149674 A1 | 7/2006 | Cook et al. |
| 2006/0155624 A1 | 7/2006 | Schwartz |
| 2006/0155639 A1 | 7/2006 | Lynch et al. |
| 2006/0161435 A1 | 7/2006 | Atef et al. |
| 2006/0173726 A1 | 8/2006 | Hall et al. |
| 2006/0173772 A1 | 8/2006 | Hayes et al. |
| 2006/0173776 A1 | 8/2006 | Shalley et al. |
| 2006/0177226 A1 | 8/2006 | Ellis, III |
| 2006/0178189 A1 | 8/2006 | Walker et al. |
| 2006/0178957 A1 | 8/2006 | LeClaire |
| 2006/0178971 A1 | 8/2006 | Owen et al. |
| 2006/0178983 A1 | 8/2006 | Nice et al. |
| 2006/0184440 A1 | 8/2006 | Britti et al. |
| 2006/0195390 A1 | 8/2006 | Rusk et al. |
| 2006/0202012 A1 | 9/2006 | Grano et al. |
| 2006/0204051 A1 | 9/2006 | Holland, IV |
| 2006/0206416 A1 | 9/2006 | Farias |
| 2006/0212350 A1 | 9/2006 | Ellis et al. |
| 2006/0218069 A1 | 9/2006 | Aberman et al. |
| 2006/0218079 A1 | 9/2006 | Goldblatt et al. |
| 2006/0229943 A1 | 10/2006 | Mathias et al. |
| 2006/0229961 A1 | 10/2006 | Lyftogt et al. |
| 2006/0229996 A1 | 10/2006 | Keithley et al. |
| 2006/0239512 A1 | 10/2006 | Petrillo |
| 2006/0241923 A1 | 10/2006 | Xu et al. |
| 2006/0242046 A1 | 10/2006 | Haggerty et al. |
| 2006/0242047 A1 | 10/2006 | Haggerty et al. |
| 2006/0242048 A1 | 10/2006 | Haggerty et al. |
| 2006/0242050 A1 | 10/2006 | Haggerty et al. |
| 2006/0253328 A1 | 11/2006 | Kohli et al. |
| 2006/0253358 A1 | 11/2006 | Delgrosso et al. |
| 2006/0259364 A1 | 11/2006 | Strock et al. |
| 2006/0262929 A1 | 11/2006 | Vatanen et al. |

(56) References Cited

U.S. PATENT DOCUMENTS

| | | |
|---|---|---|
| 2006/0265243 A1 | 11/2006 | Racho et al. |
| 2006/0265323 A1 | 11/2006 | Winter et al. |
| 2006/0267999 A1 | 11/2006 | Cash et al. |
| 2006/0271456 A1 | 11/2006 | Romain et al. |
| 2006/0271457 A1 | 11/2006 | Romain et al. |
| 2006/0271552 A1 | 11/2006 | McChesney et al. |
| 2006/0276171 A1 | 12/2006 | Pousti |
| 2006/0277102 A1 | 12/2006 | Agliozzo |
| 2006/0277141 A1 | 12/2006 | Palmer |
| 2006/0282328 A1 | 12/2006 | Gerace et al. |
| 2006/0282359 A1 | 12/2006 | Nobili et al. |
| 2006/0293921 A1 | 12/2006 | McCarthy et al. |
| 2006/0293932 A1 | 12/2006 | Cash et al. |
| 2006/0293979 A1 | 12/2006 | Cash et al. |
| 2006/0294199 A1 | 12/2006 | Bertholf |
| 2007/0005508 A1 | 1/2007 | Chiang |
| 2007/0011026 A1 | 1/2007 | Higgins et al. |
| 2007/0011039 A1 | 1/2007 | Oddo |
| 2007/0011083 A1 | 1/2007 | Bird et al. |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0022141 A1 | 1/2007 | Singleton et al. |
| 2007/0022297 A1 | 1/2007 | Britti et al. |
| 2007/0027778 A1 | 2/2007 | Schellhammer et al. |
| 2007/0027791 A1 | 2/2007 | Young et al. |
| 2007/0030282 A1 | 2/2007 | Cash et al. |
| 2007/0033227 A1 | 2/2007 | Gaito et al. |
| 2007/0038483 A1 | 2/2007 | Wood |
| 2007/0038497 A1 | 2/2007 | Britti et al. |
| 2007/0043654 A1 | 2/2007 | Libman |
| 2007/0055598 A1 | 3/2007 | Arnott et al. |
| 2007/0055599 A1 | 3/2007 | Arnott |
| 2007/0055618 A1 | 3/2007 | Pogust |
| 2007/0055621 A1 | 3/2007 | Tischler et al. |
| 2007/0061195 A1 | 3/2007 | Liu et al. |
| 2007/0061243 A1 | 3/2007 | Ramer et al. |
| 2007/0067207 A1 | 3/2007 | Haggerty et al. |
| 2007/0067208 A1 | 3/2007 | Haggerty et al. |
| 2007/0067209 A1 | 3/2007 | Haggerty et al. |
| 2007/0067235 A1 | 3/2007 | Nathans et al. |
| 2007/0067285 A1 | 3/2007 | Blume et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0078741 A1 | 4/2007 | Haggerty et al. |
| 2007/0078985 A1 | 4/2007 | Shao et al. |
| 2007/0083460 A1 | 4/2007 | Bachenheimer |
| 2007/0093234 A1 | 4/2007 | Willis et al. |
| 2007/0094137 A1 | 4/2007 | Phillips et al. |
| 2007/0106582 A1 | 5/2007 | Baker et al. |
| 2007/0112667 A1 | 5/2007 | Rucker |
| 2007/0112668 A1 | 5/2007 | Celano et al. |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0156515 A1 | 7/2007 | Hasselback et al. |
| 2007/0156589 A1 | 7/2007 | Zimler et al. |
| 2007/0156718 A1 | 7/2007 | Hossfeld et al. |
| 2007/0168246 A1 | 7/2007 | Haggerty et al. |
| 2007/0168267 A1 | 7/2007 | Zimmerman et al. |
| 2007/0179860 A1 | 8/2007 | Romero |
| 2007/0192165 A1 | 8/2007 | Haggerty et al. |
| 2007/0192248 A1 | 8/2007 | West |
| 2007/0205266 A1 | 9/2007 | Carr et al. |
| 2007/0208653 A1 | 9/2007 | Murphy |
| 2007/0208729 A1 | 9/2007 | Martino |
| 2007/0220611 A1 | 9/2007 | Socolow et al. |
| 2007/0226093 A1 | 9/2007 | Chan et al. |
| 2007/0226114 A1 | 9/2007 | Haggerty et al. |
| 2007/0244732 A1 | 10/2007 | Chatterji et al. |
| 2007/0244807 A1 | 10/2007 | Andringa et al. |
| 2007/0250327 A1 | 10/2007 | Hedy |
| 2007/0271178 A1 | 11/2007 | Davis et al. |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0288271 A1 | 12/2007 | Klinkhammer |
| 2007/0288355 A1 | 12/2007 | Roland et al. |
| 2007/0288360 A1 | 12/2007 | Seeklus |
| 2007/0288559 A1 | 12/2007 | Parsadayan |
| 2007/0294163 A1 | 12/2007 | Harmon et al. |
| 2007/0299759 A1 | 12/2007 | Kelly |
| 2007/0299771 A1 | 12/2007 | Brody |
| 2008/0004957 A1 | 1/2008 | Hildreth et al. |
| 2008/0005313 A1 | 1/2008 | Flake et al. |
| 2008/0010687 A1 | 1/2008 | Gonen et al. |
| 2008/0015887 A1 | 1/2008 | Drabek et al. |
| 2008/0015938 A1 | 1/2008 | Haddad et al. |
| 2008/0021804 A1 | 1/2008 | Deckoff |
| 2008/0027859 A1 | 1/2008 | Nathans et al. |
| 2008/0028067 A1 | 1/2008 | Berkhin et al. |
| 2008/0033852 A1 | 2/2008 | Megdal et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059364 A1 | 3/2008 | Tidwell et al. |
| 2008/0059449 A1 | 3/2008 | Webster et al. |
| 2008/0065774 A1 | 3/2008 | Keeler |
| 2008/0066188 A1 | 3/2008 | Kwak |
| 2008/0071882 A1 | 3/2008 | Hering et al. |
| 2008/0077526 A1 | 3/2008 | Arumugam |
| 2008/0086368 A1 | 4/2008 | Bauman et al. |
| 2008/0091463 A1 | 4/2008 | Shakamuri |
| 2008/0097768 A1 | 4/2008 | Godshalk |
| 2008/0097928 A1 | 4/2008 | Paulson |
| 2008/0103800 A1 | 5/2008 | Domenikos et al. |
| 2008/0103972 A1 | 5/2008 | Lanc |
| 2008/0110973 A1 | 5/2008 | Nathans et al. |
| 2008/0120155 A1 | 5/2008 | Pliha |
| 2008/0120569 A1 | 5/2008 | Mann et al. |
| 2008/0126233 A1 | 5/2008 | Hogan |
| 2008/0133273 A1 | 6/2008 | Marshall |
| 2008/0133322 A1 | 6/2008 | Kalia et al. |
| 2008/0133325 A1 | 6/2008 | De et al. |
| 2008/0133531 A1 | 6/2008 | Baskerville et al. |
| 2008/0134042 A1 | 6/2008 | Jankovich |
| 2008/0140476 A1 | 6/2008 | Anand et al. |
| 2008/0140507 A1 | 6/2008 | Hamlisch et al. |
| 2008/0140549 A1 | 6/2008 | Eder |
| 2008/0140576 A1 | 6/2008 | Lewis et al. |
| 2008/0147454 A1 | 6/2008 | Walker et al. |
| 2008/0147523 A1 | 6/2008 | Mulry et al. |
| 2008/0154766 A1 | 6/2008 | Lewis et al. |
| 2008/0167883 A1 | 7/2008 | Khazaneh |
| 2008/0167936 A1 | 7/2008 | Kapoor |
| 2008/0167956 A1 | 7/2008 | Keithley |
| 2008/0172324 A1 | 7/2008 | Johnson |
| 2008/0175360 A1 | 7/2008 | Schwarz et al. |
| 2008/0177655 A1 | 7/2008 | Zalik |
| 2008/0177836 A1 | 7/2008 | Bennett |
| 2008/0183564 A1 | 7/2008 | Tien et al. |
| 2008/0195425 A1 | 8/2008 | Haggerty et al. |
| 2008/0195600 A1 | 8/2008 | Deakter |
| 2008/0208548 A1 | 8/2008 | Metzger et al. |
| 2008/0208610 A1 | 8/2008 | Thomas et al. |
| 2008/0208631 A1 | 8/2008 | Morita et al. |
| 2008/0208788 A1 | 8/2008 | Merugu et al. |
| 2008/0215470 A1 | 9/2008 | Sengupta et al. |
| 2008/0221934 A1 | 9/2008 | Megdal et al. |
| 2008/0221947 A1 | 9/2008 | Megdal et al. |
| 2008/0221970 A1 | 9/2008 | Megdal et al. |
| 2008/0221971 A1 | 9/2008 | Megdal et al. |
| 2008/0221972 A1 | 9/2008 | Megdal et al. |
| 2008/0221973 A1 | 9/2008 | Megdal et al. |
| 2008/0221990 A1 | 9/2008 | Megdal et al. |
| 2008/0222016 A1 | 9/2008 | Megdal et al. |
| 2008/0222027 A1 | 9/2008 | Megdal et al. |
| 2008/0228538 A1 | 9/2008 | Megdal et al. |
| 2008/0228539 A1 | 9/2008 | Megdal et al. |
| 2008/0228540 A1 | 9/2008 | Megdal et al. |
| 2008/0228541 A1 | 9/2008 | Megdal et al. |
| 2008/0228556 A1 | 9/2008 | Megdal et al. |

(56) References Cited

U.S. PATENT DOCUMENTS

| | | |
|---|---|---|
| 2008/0228606 A1 | 9/2008 | Megdal et al. |
| 2008/0228635 A1 | 9/2008 | Megdal et al. |
| 2008/0243680 A1 | 10/2008 | Megdal et al. |
| 2008/0244008 A1 | 10/2008 | Wilkinson et al. |
| 2008/0255897 A1 | 10/2008 | Megdal et al. |
| 2008/0255992 A1 | 10/2008 | Lin |
| 2008/0262925 A1 | 10/2008 | Kim et al. |
| 2008/0263638 A1 | 10/2008 | McMurtry et al. |
| 2008/0281737 A1 | 11/2008 | Fajardo |
| 2008/0288382 A1 | 11/2008 | Smith et al. |
| 2008/0294540 A1 | 11/2008 | Celka et al. |
| 2008/0294546 A1 | 11/2008 | Flannery |
| 2008/0301016 A1 | 12/2008 | Durvasula et al. |
| 2008/0301188 A1 | 12/2008 | O'Hara |
| 2008/0312963 A1 | 12/2008 | Reiner |
| 2008/0312969 A1 | 12/2008 | Raines et al. |
| 2009/0006185 A1 | 1/2009 | Stinson |
| 2009/0006475 A1 | 1/2009 | Udezue et al. |
| 2009/0012889 A1 | 1/2009 | Finch |
| 2009/0018996 A1 | 1/2009 | Hunt et al. |
| 2009/0019027 A1 | 1/2009 | Ju et al. |
| 2009/0024505 A1 | 1/2009 | Patel et al. |
| 2009/0030776 A1 | 1/2009 | Walker et al. |
| 2009/0037247 A1 | 2/2009 | Quinn |
| 2009/0037323 A1 | 2/2009 | Feinstein et al. |
| 2009/0043637 A1 | 2/2009 | Eder |
| 2009/0044279 A1 | 2/2009 | Crawford et al. |
| 2009/0048877 A1 | 2/2009 | Binns et al. |
| 2009/0076883 A1 | 3/2009 | Kilger et al. |
| 2009/0089190 A1 | 4/2009 | Girulat |
| 2009/0089205 A1 | 4/2009 | Bayne |
| 2009/0094675 A1 | 4/2009 | Powers |
| 2009/0106150 A1 | 4/2009 | Pelegero et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0119199 A1 | 5/2009 | Salahi |
| 2009/0125369 A1 | 5/2009 | Kloostra et al. |
| 2009/0132347 A1 | 5/2009 | Anderson et al. |
| 2009/0132559 A1 | 5/2009 | Chamberlain et al. |
| 2009/0144102 A1 | 6/2009 | Lopez |
| 2009/0144160 A1 | 6/2009 | Haggerty et al. |
| 2009/0144201 A1 | 6/2009 | Gierkink et al. |
| 2009/0172815 A1 | 7/2009 | Gu et al. |
| 2009/0182653 A1 | 7/2009 | Zimiles |
| 2009/0198557 A1 | 8/2009 | Wang et al. |
| 2009/0198602 A1 | 8/2009 | Wang et al. |
| 2009/0198612 A1 | 8/2009 | Meimes et al. |
| 2009/0199264 A1 | 8/2009 | Lang |
| 2009/0210886 A1 | 8/2009 | Bhojwani et al. |
| 2009/0215479 A1 | 8/2009 | Karmarkar |
| 2009/0216591 A1 | 8/2009 | Buerger et al. |
| 2009/0222308 A1 | 9/2009 | Zoldi et al. |
| 2009/0222373 A1 | 9/2009 | Choudhuri et al. |
| 2009/0222374 A1 | 9/2009 | Choudhuri et al. |
| 2009/0222375 A1 | 9/2009 | Choudhuri et al. |
| 2009/0222376 A1 | 9/2009 | Choudhuri et al. |
| 2009/0222377 A1 | 9/2009 | Choudhuri et al. |
| 2009/0222378 A1 | 9/2009 | Choudhuri et al. |
| 2009/0222379 A1 | 9/2009 | Choudhuri et al. |
| 2009/0222380 A1 | 9/2009 | Choudhuri et al. |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0240609 A1 | 9/2009 | Cho et al. |
| 2009/0248567 A1 | 10/2009 | Haggerty et al. |
| 2009/0248568 A1 | 10/2009 | Haggerty et al. |
| 2009/0248569 A1 | 10/2009 | Haggerty et al. |
| 2009/0248570 A1 | 10/2009 | Haggerty et al. |
| 2009/0248571 A1 | 10/2009 | Haggerty et al. |
| 2009/0248572 A1 | 10/2009 | Haggerty et al. |
| 2009/0248573 A1 | 10/2009 | Haggerty et al. |
| 2009/0249440 A1 | 10/2009 | Platt et al. |
| 2009/0254476 A1 | 10/2009 | Sharma et al. |
| 2009/0254971 A1 | 10/2009 | Herz et al. |
| 2009/0265326 A1 | 10/2009 | Lehrman et al. |
| 2009/0271248 A1 | 10/2009 | Sherman et al. |
| 2009/0271265 A1 | 10/2009 | Lay et al. |
| 2009/0276233 A1 | 11/2009 | Brimhall et al. |
| 2009/0276368 A1 | 11/2009 | Martin et al. |
| 2009/0300066 A1 | 12/2009 | Guo et al. |
| 2009/0313163 A1 | 12/2009 | Wang et al. |
| 2009/0319648 A1 | 12/2009 | Dutta et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0030649 A1 | 2/2010 | Ubelhor |
| 2010/0043055 A1 | 2/2010 | Baumgart |
| 2010/0094704 A1 | 4/2010 | Subramanian et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0100945 A1 | 4/2010 | Ozzie et al. |
| 2010/0107225 A1 | 4/2010 | Spencer et al. |
| 2010/0114724 A1 | 5/2010 | Ghosh et al. |
| 2010/0114744 A1 | 5/2010 | Gonen |
| 2010/0121767 A1 | 5/2010 | Coulter et al. |
| 2010/0130172 A1 | 5/2010 | Vendrow et al. |
| 2010/0142698 A1 | 6/2010 | Spottiswoode et al. |
| 2010/0145836 A1 | 6/2010 | Baker et al. |
| 2010/0145847 A1 | 6/2010 | Zarikian et al. |
| 2010/0169159 A1 | 7/2010 | Rose et al. |
| 2010/0169264 A1 | 7/2010 | O'Sullivan |
| 2010/0185453 A1 | 7/2010 | Satyavolu et al. |
| 2010/0198629 A1 | 8/2010 | Wesileder et al. |
| 2010/0205662 A1 | 8/2010 | Ibrahim et al. |
| 2010/0211445 A1 | 8/2010 | Bodington |
| 2010/0217837 A1 | 8/2010 | Ansari et al. |
| 2010/0223168 A1 | 9/2010 | Haggerty et al. |
| 2010/0228657 A1 | 9/2010 | Kagarlis |
| 2010/0229245 A1 | 9/2010 | Singhal |
| 2010/0248681 A1 | 9/2010 | Phills |
| 2010/0250364 A1 | 9/2010 | Song et al. |
| 2010/0250434 A1 | 9/2010 | Megdal et al. |
| 2010/0250469 A1 | 9/2010 | Megdal et al. |
| 2010/0268557 A1 | 10/2010 | Faith et al. |
| 2010/0274739 A1 | 10/2010 | Haggerty et al. |
| 2010/0293114 A1 | 11/2010 | Khan et al. |
| 2010/0312717 A1 | 12/2010 | Haggerty et al. |
| 2010/0332292 A1 | 12/2010 | Anderson |
| 2011/0004498 A1 | 1/2011 | Readshaw |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0035333 A1 | 2/2011 | Haggerty et al. |
| 2011/0047071 A1 | 2/2011 | Choudhuri et al. |
| 2011/0054981 A1 | 3/2011 | Faith et al. |
| 2011/0066495 A1 | 3/2011 | Ayloo et al. |
| 2011/0071950 A1 | 3/2011 | Ivanovic |
| 2011/0076663 A1 | 3/2011 | Krallman et al. |
| 2011/0078073 A1 | 3/2011 | Annappindi et al. |
| 2011/0093383 A1 | 4/2011 | Haggerty et al. |
| 2011/0112958 A1 | 5/2011 | Haggerty et al. |
| 2011/0125595 A1 | 5/2011 | Neal et al. |
| 2011/0126275 A1 | 5/2011 | Anderson et al. |
| 2011/0137789 A1 | 6/2011 | Kortina et al. |
| 2011/0145122 A1 | 6/2011 | Haggerty et al. |
| 2011/0161323 A1* | 6/2011 | Hagiwara ............ G06N 99/005 707/737 |
| 2011/0164746 A1 | 7/2011 | Nice et al. |
| 2011/0173116 A1 | 7/2011 | Yan et al. |
| 2011/0184838 A1 | 7/2011 | Winters et al. |
| 2011/0184851 A1 | 7/2011 | Megdal et al. |
| 2011/0196791 A1 | 8/2011 | Dominguez |
| 2011/0211445 A1 | 9/2011 | Chen |
| 2011/0213641 A1 | 9/2011 | Metzger, II et al. |
| 2011/0218826 A1 | 9/2011 | Birtel et al. |
| 2011/0219421 A1 | 9/2011 | Ullman et al. |
| 2011/0238566 A1 | 9/2011 | Santos |
| 2011/0251946 A1 | 10/2011 | Haggerty et al. |
| 2011/0258050 A1 | 10/2011 | Chan et al. |
| 2011/0258142 A1 | 10/2011 | Haggerty et al. |
| 2011/0264581 A1 | 10/2011 | Clyne |
| 2011/0270779 A1 | 11/2011 | Showalter |

(56) References Cited

U.S. PATENT DOCUMENTS

| | | |
|---|---|---|
| 2011/0276396 A1 | 11/2011 | Rathod |
| 2011/0282779 A1 | 11/2011 | Megdal et al. |
| 2011/0307397 A1 | 12/2011 | Benmbarek |
| 2011/0320307 A1 | 12/2011 | Mehta et al. |
| 2012/0005070 A1 | 1/2012 | McFall et al. |
| 2012/0011056 A1 | 1/2012 | Ward et al. |
| 2012/0011158 A1 | 1/2012 | Avner et al. |
| 2012/0016948 A1 | 1/2012 | Sinha |
| 2012/0029956 A1 | 2/2012 | Ghosh et al. |
| 2012/0035980 A1 | 2/2012 | Haggerty et al. |
| 2012/0047219 A1 | 2/2012 | Feng et al. |
| 2012/0054592 A1 | 3/2012 | Jaffe et al. |
| 2012/0066065 A1 | 3/2012 | Switzer |
| 2012/0066106 A1 | 3/2012 | Papadimitriou |
| 2012/0084230 A1 | 4/2012 | Megdal et al. |
| 2012/0089605 A1* | 4/2012 | Bangalore ......... G06F 17/30976 707/737 |
| 2012/0101938 A1 | 4/2012 | Kasower |
| 2012/0101939 A1 | 4/2012 | Kasower |
| 2012/0106801 A1 | 5/2012 | Jackson |
| 2012/0110677 A1 | 5/2012 | Abendroth et al. |
| 2012/0116807 A1 | 5/2012 | Hane et al. |
| 2012/0123968 A1 | 5/2012 | Megdal et al. |
| 2012/0124498 A1 | 5/2012 | Santoro et al. |
| 2012/0136763 A1 | 5/2012 | Megdal et al. |
| 2012/0143637 A1 | 6/2012 | Paradis et al. |
| 2012/0143921 A1 | 6/2012 | Wilson |
| 2012/0158460 A1 | 6/2012 | Kruger et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0191479 A1 | 7/2012 | Gupta et al. |
| 2012/0209586 A1 | 8/2012 | Mieritz et al. |
| 2012/0215682 A1 | 8/2012 | Lent et al. |
| 2012/0216125 A1 | 8/2012 | Pierce |
| 2012/0232958 A1 | 9/2012 | Silbert |
| 2012/0239497 A1 | 9/2012 | Nuzzi |
| 2012/0239515 A1 | 9/2012 | Batra et al. |
| 2012/0265661 A1 | 10/2012 | Megdal et al. |
| 2012/0284118 A1 | 11/2012 | Mamich, Jr. et al. |
| 2012/0290660 A1 | 11/2012 | Rao et al. |
| 2012/0317016 A1 | 12/2012 | Hughes |
| 2012/0323954 A1 | 12/2012 | Bonalle et al. |
| 2013/0080242 A1 | 3/2013 | Alhadeff et al. |
| 2013/0080467 A1 | 3/2013 | Carson et al. |
| 2013/0085804 A1 | 4/2013 | Leff et al. |
| 2013/0085902 A1 | 4/2013 | Chew |
| 2013/0103571 A1 | 4/2013 | Chung et al. |
| 2013/0117832 A1 | 5/2013 | Gandhi |
| 2013/0124263 A1 | 5/2013 | Amaro et al. |
| 2013/0132151 A1 | 5/2013 | Stibel et al. |
| 2013/0137464 A1 | 5/2013 | Kramer et al. |
| 2013/0151388 A1 | 6/2013 | Falkenborg et al. |
| 2013/0159168 A1 | 6/2013 | Evans |
| 2013/0159411 A1 | 6/2013 | Bowen |
| 2013/0173359 A1 | 7/2013 | Megdal et al. |
| 2013/0173450 A1 | 7/2013 | Celka et al. |
| 2013/0173481 A1 | 7/2013 | Hirtenstein et al. |
| 2013/0218638 A1 | 8/2013 | Kilger et al. |
| 2013/0226787 A1 | 8/2013 | Haggerty et al. |
| 2013/0226820 A1 | 8/2013 | Sedota, Jr. et al. |
| 2013/0238413 A1* | 9/2013 | Carlson ............. G06Q 30/0224 705/14.25 |
| 2013/0268324 A1 | 10/2013 | Megdal et al. |
| 2013/0275331 A1 | 10/2013 | Megdal et al. |
| 2013/0293363 A1 | 11/2013 | Plymouth |
| 2013/0347059 A1 | 12/2013 | Fong et al. |
| 2014/0012633 A1 | 1/2014 | Megdal et al. |
| 2014/0019331 A1 | 1/2014 | Megdal et al. |
| 2014/0032265 A1 | 1/2014 | Paprocki et al. |
| 2014/0032384 A1 | 1/2014 | Megdal et al. |
| 2014/0046887 A1 | 2/2014 | Lessin |
| 2014/0095251 A1 | 4/2014 | Huovilainen |
| 2014/0096249 A1 | 4/2014 | Dupont et al. |
| 2014/0149179 A1 | 5/2014 | Haggerty et al. |
| 2014/0156501 A1 | 6/2014 | Howe |
| 2014/0164112 A1 | 6/2014 | Kala |
| 2014/0164398 A1 | 6/2014 | Smith et al. |
| 2014/0172686 A1 | 6/2014 | Haggerty et al. |
| 2014/0181285 A1 | 6/2014 | Stevens et al. |
| 2014/0244353 A1 | 8/2014 | Winters |
| 2014/0278774 A1 | 9/2014 | Cai et al. |
| 2014/0310157 A1 | 10/2014 | Haggerty et al. |
| 2014/0316852 A1 | 10/2014 | Chatterji et al. |
| 2014/0316855 A1 | 10/2014 | Haggerty et al. |
| 2014/0317022 A1 | 10/2014 | Haggerty et al. |
| 2014/0324538 A1 | 10/2014 | Haggerty et al. |
| 2014/0344069 A1 | 11/2014 | Haggerty et al. |
| 2015/0026039 A1 | 1/2015 | Annappindi |
| 2015/0051948 A1* | 2/2015 | Aizono ................. G06Q 10/00 705/7.29 |
| 2015/0120391 A1 | 4/2015 | Jodice et al. |
| 2015/0120755 A1 | 4/2015 | Burger et al. |
| 2015/0295906 A1 | 10/2015 | Ufford et al. |
| 2015/0310543 A1 | 10/2015 | Debie et al. |
| 2015/0332414 A1* | 11/2015 | Unser ................. G06F 17/3053 705/30 |
| 2015/0363328 A1* | 12/2015 | Candelaria ......... G06F 12/0864 711/216 |
| 2016/0055487 A1 | 2/2016 | Votaw et al. |
| 2016/0071175 A1 | 3/2016 | Reuss et al. |
| 2016/0092997 A1 | 3/2016 | Shen et al. |
| 2016/0210224 A1* | 7/2016 | Cohen ................. G06F 9/44589 |
| 2016/0246581 A1 | 8/2016 | Jimenez et al. |
| 2017/0278182 A1 | 9/2017 | Kasower |
| 2018/0060546 A1 | 3/2018 | Yin |
| 2018/0189871 A1 | 7/2018 | Lennert |

FOREIGN PATENT DOCUMENTS

| | | |
|---|---|---|
| EP | 0 419 889 | 4/1991 |
| EP | 0 458 698 | 11/1991 |
| EP | 0 468 440 | 1/1992 |
| EP | 0 554 083 | 8/1993 |
| EP | 0 566 736 | 8/1993 |
| EP | 0 559 358 | 9/1993 |
| EP | 0 869 652 | 10/1998 |
| EP | 0 913 789 | 5/1999 |
| EP | 0 919 942 | 6/1999 |
| EP | 0 977 128 | 2/2000 |
| EP | 1 028 401 | 8/2000 |
| EP | 1 077 419 | 2/2001 |
| EP | 0 772 836 | 12/2001 |
| EP | 2 088 743 | 8/2009 |
| EP | 2 151 793 | 2/2010 |
| GB | 2 392 748 | 3/2004 |
| JP | 10-222559 | 8/1998 |
| JP | 10-261009 | 9/1998 |
| JP | 10-293732 | 11/1998 |
| JP | 2000-331068 | 11/2000 |
| JP | 2001-282957 | 10/2001 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163449 | 6/2002 |
| JP | 2002-163498 | 6/2002 |
| JP | 2002-259753 | 9/2002 |
| JP | 2003-271851 | 9/2003 |
| JP | 2003-316881 | 11/2003 |
| JP | 2003-316950 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2013-0107394 | 10/2013 |
| TW | 256569 | 6/2006 |
| WO | WO 94/006103 | 3/1994 |
| WO | WO 95/034155 | 12/1995 |
| WO | WO 96/000945 | 1/1996 |
| WO | WO 97/023838 | 7/1997 |
| WO | WO 98/041931 | 9/1998 |

(56) References Cited

FOREIGN PATENT DOCUMENTS

| | | |
|---|---|---|
| WO | WO 98/041932 | 9/1998 |
| WO | WO 98/041933 | 9/1998 |
| WO | WO 98/049643 | 11/1998 |
| WO | WO 99/008218 | 2/1999 |
| WO | WO 99/017225 | 4/1999 |
| WO | WO 99/017226 | 4/1999 |
| WO | WO 99/022328 | 5/1999 |
| WO | WO 99/038094 | 7/1999 |
| WO | WO 00/004465 | 1/2000 |
| WO | WO 00/028441 | 5/2000 |
| WO | WO 00/055778 | 9/2000 |
| WO | WO 00/055789 | 9/2000 |
| WO | WO 00/055790 | 9/2000 |
| WO | WO 01/010090 | 2/2001 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/057720 | 8/2001 |
| WO | WO 01/080053 | 10/2001 |
| WO | WO 01/084281 | 11/2001 |
| WO | WO 02/001462 | 1/2002 |
| WO | WO 02/027610 | 4/2002 |
| WO | WO 03/071388 | 8/2003 |
| WO | WO 03/101123 | 12/2003 |
| WO | WO 2004/046882 | 6/2004 |
| WO | WO 2004/051436 | 6/2004 |
| WO | WO 2004/061563 | 7/2004 |
| WO | WO 2004/114160 | 12/2004 |
| WO | WO 2005/059781 | 6/2005 |
| WO | WO 2005/124619 | 12/2005 |
| WO | WO 2007/004158 | 1/2007 |
| WO | WO 2007/014271 | 2/2007 |
| WO | WO 2007/149941 | 12/2007 |
| WO | WO 2008/022289 | 2/2008 |
| WO | WO 2008/054403 | 5/2008 |
| WO | WO 2008/076343 | 6/2008 |
| WO | WO 2008/127288 | 10/2008 |
| WO | WO 2008/147918 | 12/2008 |
| WO | WO 2009/061342 | 5/2009 |
| WO | WO 2009/076555 | 6/2009 |
| WO | WO 2009/117518 | 9/2009 |
| WO | WO 2009/132114 | 10/2009 |
| WO | WO 2010/045160 | 4/2010 |
| WO | WO 2010/062537 | 6/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |
| WO | WO-2015162681 A1 * 10/2015 ............... G06F 3/06 |
| WO | WO 2018/039377 | 3/2018 |

OTHER PUBLICATIONS

U.S. Appl. No. 12/705,511, filed Feb. 12, 2010, Bargoli et al.
"A New Approach to Fraud Solutions", BasePoint Science Solving Fraud, pp. 8, 2006.
"Aggregate and Analyze Social Media Content: Gain Faster and Broader Insight to Market Sentiment," SAP Partner, Mantis Technology Group, Apr. 2011, pp. 4.
"Auto Market Statistics:Drive Response with Aggregated Motor Vehicle Information"; Experian; Apr. 2007; http://www.experian.com/assets/marketing-services/product-sheets/auto-market-statistics.pdf.
"Bank of America Launches Total Security Protection™; Features Address Cardholders' Financial Safety Concerns; Supported by $26 Million National Advertising Campaign; Free Educational Materials", PR Newswire, Oct. 9, 2002, pp. 2.
"Beverly Hills Man Convicted of Operating 'Bust-Out' Schemes that Caused More than $8 Million in Losses", Department of Justice, Jul. 25, 2006, 2 Pgs.
"Bust-Out Schemes", Visual Analytics Inc. Technical Product Support, Newsletter vol. 4, Issue 1, Jan. 2005, pp. 7.
"Carbon Calculator—Calculation Explanation," Warwick University Carbon Footprint Project Group, 2005, pp. 5, http://www.carboncalculator.co.uk/explanation.php.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003.
"Fighting the New Face of Fraud", FinanceTech, http://www.financetech.com/showArticle.jhtml?articleID=167100405, Aug. 2, 2005.
"Intelligent Miner Applications Guide", IBM Corp., Apr. 2, 1999, Chapters 4-7, pp. 33-132.
"PostX to Present at Internet Showcase", PR Newswire, Apr. 28, 1997, pp. 2.
"PremierGuide Announces Release 3.0 of Local Search Platform", Business Wire, Mar. 4, 2004, Palo Alto, CA, p. 5574.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
"Japan's JAAI system appraises used cars over internet", Asia Pulse, Mar. 3, 2000.
"Mosaic" (geodemography), available from http://en.wikipedia.org/wiki/Mosaic (geodemography), as last modified Jul. 13, 2012. pp. 4.
"WashingtonPost.com and Cars.com launch comprehensive automotive web site for the Washington area", PR Newswire, Oct. 22, 1998.
Adzilla, Press Release, "Zillacasting Technology Approved and Patent Pending," http://www.adzilla.com/newsroom/pdf/patent_051605.pdf, May 16, 2005, pp. 2.
Akl, Selim G., "Digital Signatures: A Tutorial Survey," Computer, Feb. 1983, pp. 15-24.
Alexander, Walter, "What's the Score", ABA Banking Journal, vol. 81, 1989. [Journal Article Excerpt].
BackupBox, http://mybackupbox.com printed Feb. 8, 2013 in 2 pages.
BBC Green Home, "My Action Plan", as printed from the Wayback Machine at http://web.archive.org/web/20080513014731/http://www.bbcgreen.com/actionplan, May 13, 2008, pp. 50.
BERR: Department for Business Enterprise & Regulatory Reform, "Regional Energy Consumption Statistics", Jun. 10, 2008, http://webarchive.nationalarchives.gov.uk/20080610182444/berr.gov.uk/energy/statistics/regional/index.html.
Bult et al., "Optimal Selection for Direct Mail," Marketing Science, 1995, vol. 14, No. 4, pp. 378-394.
Burr Ph.D., et al., "Utility Payments as Alternative Credit Data: A Reality Check", Asset Builders of America, Inc., Oct. 5, 2006, pp. 1-18, Washington, D.C.
Burr Ph.D., et al., "Payment Aggregation and Information Dissemination (Paid): Annotated Literature Search", Asset Builders of America, Inc., Sep. 2005.
Caliendo, et al., "Some Practical Guidance for the Implementation of Propensity Score Matching", IZA:Discussion Paper Series, No. 1588, Germany, May 2005, pp. 32.
Chandler et al., "The Benefit to Consumers from Generic Scoring Models Based on Credit Reports", The MDS Group Atlanta, Georgia, Jul. 1, 1991, Abstract.
CreditKarma, http://www.creditkarma.com printed Feb. 8, 2013 in 2 pages.
CreditSesame, http://www.credtsesame.com/how-it-works/our-technology/ printed Feb. 5, 2013 in 2 pages.
Davies, Donald W., "Applying the RSA Digital Signature to Electronic Mail," Computer, Feb. 1983, pp. 55-62.
Declaration of Paul Clark, DSc. For Inter Partes Review of U.S. Pat. No. 8,504,628 (Symantec Corporation, Petitioner), dated Jan. 15, 2014 in 76 pages.
Elmasri et al., "Fundamentals of Database Systems, Third Edition (Excerpts)", Jun. 2000, pp. 253, 261, 268-70, 278-80, 585, 595.
Energy Saving Trust™, "HEED Online User Manual (1.7)", Jul. 24, 2008, pp. 18, www.energysavingstrust.org.uk, Jul. 24, 2008.
Exhibit D to Joint Claim Construction Statement, filed in Epsilon Data Management, LLC, No. 2:12-cv-00511-JRG (E.D. Tex.) (combined for pretrial purposes with *RPost Holdings, Inc., et al. v.*

(56) References Cited

OTHER PUBLICATIONS

*Experian Marketing Solutions. Inc.*, No. 2:12-cv-00513-JRG (E.D. Tex.)) Filed Jan. 14, 2014 in 9 pages.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, 2009, pp. 164.
Experian: Mosaic UK—Unique Consumer Classification Based on In-Depth Demographic Data, as printed from http://www.experian.co.uk/busness-strategies/mosaic-uk.html, Jul. 30, 2012, pp. 2.
Experian: Mosaic UK—Optimise the Value of Your Customers and Locations, Now and in the Future, Brochure, 2010, pp. 24.
Experian: Mosaic United Kingdom, Brochure, Jun. 2009, pp. 24.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, 2012, pp. 2.
Experian-Scorex Announces New Credit Simulation Tool, PR Newswire, Costa Mesa, CA, Jun. 13, 2005.
Fanelli, Marc, "Building a Holistic Customer View", MultiChannel Merchant, Jun. 26, 2006, pp. 2.
Findermind, "PeopleFinders Review", as archived Jun. 1, 2012 in 4 pages. http://web.archive.org/web/20120601010134/http://www.findermind.com/tag/peoplefinders-review/.
First Amended Complaint in Civil Action No. 2:12-cv-511-JRG (*Rpost Holdings, Inc. And Rpost Communications Limited* v. *Constant Contact, Inc.*; et al.) filed Feb. 11, 2013 in 14 pages.
First Amended Complaint in Civil Action No. 2:12-cv-511-JRG (*Rpost Holdings, Inc. And Rpost Communications Limited* v. *Epsilon Data Management, LLC.*) filed Sep. 13, 2013 in 9 pages.
First Amended Complaint in Civil Action No. 2:12-cv-513-JRG (*Rpost Holdings, Inc. And Rpost Communications Limited* v. *Experian Marketing Solutions, Inc.*) filed Aug. 30, 2013 in 9 pages.
Frontporch, "Ad Networks-Partner with Front Porch!," www.frontporch.com printed Apr. 2008 in 2 pages.
Frontporch, "New Free Revenue for Broadband ISPs!", http://www.frontporch.com/html/bt/FPBroadbardISPs.pdf printed May 28, 2008 in 2 pages.
Garcia-Molina, "Database Systems: The Complete Book", Prentice Hall, 2002, pp. 713-715.
Haughton et al., "Direct Marketing Modeling with CART and CHAID", Journal of Direct Marketing, Fall 1997, vol. 11, No. 4, pp. 42-52.
Hojoki, http://hojoki.com printed Feb. 8, 2013 in 5 pages.
IFTTT, "About IFTTT," http://ifttt.com/wtf printed Feb. 18, 2013 in 4 pages.
Instant Access to Credit Reports Now Available Online with DMS' CreditBrowser-based system also Simplifies Credit Decisioning and Offers a Central Point of Control, Business Wire, p. 0264, Dallas, May 23, 2000.
International Preliminary Report and Written Opinion in PCT/US2008/064594, dated Dec. 10, 2009.
International Preliminary Report on Patentability for Application No. PCT/US2013/052342, dated Feb. 5, 2015.
International Search Report and Written Opinion for Application No. PCT/US2008/064594, dated Oct. 30, 2008.
International Search Report and Written Opinion for Application No. PCT/US2013/052342, dated Nov. 21, 2013.
Jowit, Juliette, "Ever wondered how big your own carbon footprint might be?", Nov. 4, 2007, pp. 4, http://www.guardian.co.uk/money/2007/nov/04/cash.carbonfootprints/print.
Karlan et al., "Observing Unobservables:Identifying Information Asymmetries with a Consumer Credit Field Experiment", Jun. 17, 2006, pp. 58, http://aida.econ.yale.edu/karlan/papers/ObservingUnobservables.KarianZinman.pdf.
Kessler, Josh "How to Reach the Growing 'Thin File' Market: Huge Immigration Market and Other Groups with Little or No Credit History May Be Creditworthy. There are Several Ways to Tap This Well of Business", ABA Banking Journal, vol. 97, 2005.
King et al., Local and Regional CO2 Emissions Estimates for 2004 for the UK, AEA Energy & Environment, Report for Department for Environment, Food and Rural Affairs, Nov. 2006, London, UK, pp. 73.
Klein, et al., "A Constant-Utility Index of the Cost of Living", The Review of Economic Studies, pp. 84-87, vol. XV-XVI, Kraus Reprint Corporation, New York, 1960.
Klein, et al., "An Econometric Model of the United States: 1929-1952", North-Holland Publishing Company, Amsterdam, 1955, pp. 4-41.
Klein, Lawrence R., "The Keynesian Revolution", New York, The MacMillan Company, 1947, pp. 56-189.
Kohavi, Ron, "A Study of Cross-Validation and Bootstrap for Accuracy Estimation and Model Selection", Internation Joint Conference on Artificial Intelligence, 1995, pp. 7.
Lamons, Bob, "Be Smart: Offer Inquiry Qualification Services," Marketing News, ABI/Inform Global, Nov. 6, 1995, vol. 29, No. 23, pp. 13.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
LifeLock, http://web.archive.org/web/20/10721011010/http://www.lifelock.com/? as archived Jul. 24, 2011 in 1 page.
McNamara, Paul, "Start-up's pitch: The Envelope, please," Network World, Apr. 28, 1997, vol. 14, No. 17, p. 33.
Miller, Joe, "NADA used-car prices go online", Automotive News, Jun. 14, 1999, p. 36.
Mint.com, http://www.mint.com.how-it-works/ printed Feb. 5, 2013 in 2 pages.
Mover, "One API for the Cloud," http://mover.io printed Feb. 6, 2013 in 3 pages.
MyReceipts—How it Works, http://www.myreceipts.com/howItWorks.do, printed Oct. 16, 2012 in 1 page.
MyReceipts, http://www.myreceipts.com/, printed Oct. 16, 2012 in 1 page.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
Organizing Maniac's Blog—Online Receipts Provided by MyQuickReceipts.com, http://organizingmaniacs.wordpress.com/2011/01/12/online-receipts-provided-by-myquickreceipts-com/ dated Jan. 12, 2011 printed Oct. 16, 2012 in 3 pages.
Otixo, "Your Dashboard for the Cloud," http://Otixo.com/product printed Feb. 6, 2013 in 3 pages.
Padgett et al., "A Comparison of Carbon Calculators", Environmental Impact Assessment Review 28, pp. 106-115, Jun. 7, 2007.
Perry et al., "Integrating Waste and Renewable Energy to Reduce the Carbon Footprint of Locally Integrated Energy Sectors", Energy 33, Feb. 15, 2008, pp. 1489-1497.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Pipes, http://pipes.yahoo.com/pipes printed Feb. 18, 2013 in 1 pages.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.

(56) References Cited

OTHER PUBLICATIONS

PostX, "PostX® Envelope and ActiveView", http://web.archive.org/web/19970714203719/http://www.postx.com/priducts_fm.html, Jul. 14, 1997 (retrieved Nov. 7, 2013) in 2 pages.
Primadesk, http://primadesk.com printed Feb. 8, 2013 in 1 page.
PrivacyGuard, http://web.archive.org/web/20110728114049/http://www.privacyguard.com/ as archived Jul. 28, 2011 in 1 page.
RapUP, Attribute Management & Report Systems:Absolute Advantage!, Magnum Communications Brochure, Copyright 2004, pp. 5.
Rodgers, Zachary, "ISPs Collect User Data for Behavioral Ad Targeting", ClickZ, www.clickz.com/showPage.hml?page=clickz, Jan. 3, 2008, pp. 3.
Rosset et al., "Wallet Estimation Models", IBM TJ Watson Research Center, 2005, Yorktown Heights, NY, pp. 12.
Sakia, R.M., "The Box-Cox Transformation Technique: a Review", The Statistician, 41, 1992, pp. 169-178.
SalesLogix.net, SalesLogix Sales Tour, Apr. 11, 2001, http://www.saleslogix.com, pp. 19.
Sawyers, Arlena, "NADA to Offer Residual Guide", Automotive News, May 22, 2000, p. 3.
Schmittlein et al., "Customer Base Analysis: An Industrial Purchase Process Application", Marketing Science, vol. 13, No. 1, Winter 1994, pp. 41-67.
ServiceObjects, "DOTS Web Services—Product Directory", http://www.serviceobjects.com/products/directory_of_web_services.asp printed Aug. 17, 2006 in 4 pages.
ShoeBoxed, http://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
Source Code Appendix attached to U.S. Appl. No. 08/845,722 by Venkatraman et al., Exhibit A, Part 1 & 2, pp. 32.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Storage Made Easy(SME), http://storagemadeeasy.com printed Feb. 6, 2013 in 1 pages.
Sumner, Anthony, "Tackling the Issue of Bust-Out Fraud", e-News, Experian: Decision Analytics, pp. 4, [Originally Published in Retail Banker International Magazine Jul. 24, 2007].
Sumner, Anthony, "Tackling the Issue of Bust-Out Fraud", Experian: Decision Analytics, Dec. 18, 2007, pp. 24.
Sumner, Anthony, "Tackling the Issue of Bust-Out Fraud", Retail Banker International, Jul. 24, 2007, pp. 4.
Tao, Lixin, "Shifting Paradigms with the Application Service Provider Model"; Concordia University, IEEE, Oct. 2001, Canada.
Thoemmes, Felix, "Propensity Score Matching in SPSS", Center for Educational Science and Psychology, University of Tübingen, Jan. 2012.
White, Ron, "How Computers Work", Millennium Edition, Que Corporation, Indianapolis, IN, Sep. 1999. [Uploaded in 2 parts].
Wiedmann, et al., "Report No. 2: The use of input-output analysis in REAP to allocate Ecological Footprints and material flows to final consumption categories", Resources and Energy Analysis Programme, Stockholm Environment Institute—York, Feb. 2005, York, UK, pp. 33.
Wilson, Andrea, "Escaping the Alcatraz of Collections and Charge-Offs", http://www.transactionworld.net/articles/2003/october/riskMgmt1.asp, Oct. 2003.
Working, Holbrook, "Statistical Laws of Family Expenditure", Journal of the American Statistical Association, pp. 43-56, vol. 38, American Statistical Association, Washington, D.C., Mar. 1943.
Zapier, "Integrate Your Web Services," http://www.Zapier.com printed Feb. 18, 2013 in 3 pages.
"A Google Health update," Google Official Blog, Sep. 15, 2010 in 4 pages, http://googleblog.blogspot.com/2010/09/google-health-update.html.
Amo, Tina, "How to Find Out Who Has Lived inYour House Before You", https://web.archive.org/web/20130327090532/http://homeguides.sfgate.com/out-lived-house-before-50576.html as archived Mar. 27, 2013, pp. 2.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
Corepoint Health, "The Continuity of Care Document—Changing the Landscape of Healthcare Information Exchange," Jan. 2009, pp. 9.
Dankar et al., "Efficient Private Information Retrieval for Geographical Aggregation", Procedia Computer Science, 2014, vol. 37, pp. 497-502.
Dé, Andy, "Will mHealth Apps and Devices Empower ePatients for Wellness and Disease Management? A Case Study," Jan. 10, 2011 in 6 pages, http://www.healthsciencestrategy.com/2011/04/will-mhealth-apps-and-devices-empower-epatients-for-wellness-and-disease-management-a-case-study-2/.
Downey, Sarah A., "Smile, you're on Spokeo.com! Concerned? (here's what to do)", https://www.abine.com/blog/2011/how-to-remove-yourself-from-spokeo/, as posted Jan. 13, 2011 in 7 pages.
Equifax; "White Paper: Driving Safe Growth in a Fluid Economy", http://www.equifax.com/assets/USCIS/efx_safeGrowth_wp.pdf, Oct. 2012 in 14 pages.
Equifax; "True In-Market Propensity Scores™", http://www.equifax.com/assets/USCIS/efx-00174-11-13_efx_tips.pdf, Nov. 2013 in 1 page.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
Experian; "Case study: SC Telco Federal Credit Union", http://annualcreditreport.experian.com/assets/consumer-information/case-studies/sc-telco-case-study.pdf, Jun. 2011 in 2 pages.
Experian; "In the Market Models^SM", http://www.experian.com/assets/consumer-information/product-sheets/in-the-market-models.pdf, Sep. 2013 in 2 pages.
Fisher, Joseph, "Access to Fair Credit Reports: Current Practices and Proposed Legislation," American Business Law Journal, Fall 1981, vol. 19, No. 3, p. 319.
Gao et al., "Exploring Temporal Effects for Location Recommendation on Location-Based Social Networks", RecSys'13, Oct. 12-16, 2013, Hong Kong, China, pp. 93-100.
"Geographic Aggregation Tool SAS Beta Version 4.1", Environmental Health Surveillance Section, New York State Dept. In Health, Troy, NY, Mar. 24, 2015, pp. 10.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Hampton et al., "Mapping Health Data: Improved Privacy Protection With Donut Method Geomasking", American Journal of Epidemiology, Sep. 3, 2010, vol. 172, No. 9, pp. 8.
Healow.com, Various screenshots from page titled "Health and Online Wellness," https://healow.com/apps/jsp/webview/index.jsp printed Aug. 19, 2013 in 4 pages.
Healthspek.com, "How Good Are We?" http://healthspek.com/how-good-are-we/ printed Jan. 21, 2014 in 2 pages.
"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.
HealthVault, "Share Health Information," https://account.healthvault.com/sharerecord.aspx, printed Feb. 20, 2013 in 2 pages.

(56) References Cited

OTHER PUBLICATIONS

HealthVault, "What Can you do with HealthVault?" https://www.healthvault.com/us/en/overview,http://www.eweek.com/mobile/diversinet-launches-mobihealth-wallet-for-patient-data-sharing/, printed Feb. 20, 2013 in 2 pages.
Horowitz, Brian T., "Diversinet Launches MobiHealth Wallet for Patient Data Sharing," eWeek, Dec. 4, 2012, http://www.eweek.com/mobile/diversinet-launches-mobihealth-wallet-for-patient-data-sharing/.
igiHealth.com, "Orbit® PHR: Personal Health Record (PHR)," http://www.igihealth.com/consumers/orbit_phr.html, printed Jan. 21, 2014 in 2 pages.
InsightsOne.com, "Healthcare," http://insightsone.com/healthcare-predictive-analytics/ printed Mar. 6, 2014 in 5 pages.
International Search Report and Written Opinion for Application No. PCT/US2017/048265, dated Dec. 5, 2017.
International Search Report and Written Opinion for Application No. PCT/US2017/068340, dated Feb. 26, 2018.
Kwan et al., "Protection of Geoprivacy and Accuracy of Spatial Information: How Effective Are Geographical Masks?", Carographica, Summer 2004, vol. 39, No. 2, pp. 15-27.
Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.
Maciejewski et al., "Understanding Syndromic Hotspots—A Visual Analytics Approach", Conference Paper, IEEE Sumposium on Visual Analytics Science and Technoloby, Oct. 21-23, 2017, pp. 8.
MergePower, Inc., "Attribute Pro", http://web.archive.org/web/20060520135324/http://www.mergepower.com/attribute_pro.html, dated May 20, 2006 in 1 page.
MergePower, Inc., "Attribute Pro", http://web.archive.org/web/20080708204709/http:/www.mergepower.com/APInfo.aspx, dated Jul. 8, 2008 in 2 pages.
MergePower, Inc., "Attribute Pro®—Credit Bureau Attributes", http://web.archive.org/web/20120307000028/http:/www.mergepower.com/APInfo.aspx, dated Mar. 7, 2012 in 2 pages.
MergePower, Inc., "MergePower, Inc", http://web.archive.org/web/20060513003556/http:/www.mergepower.com/, dated May 13, 2006 in 1 page.
MergePower, Inc., "MergePower, Inc", http://web.archive.org/web/20070208144622/http:/www.mergepower.com/, dated Feb. 8, 2007 in 1 page.
MergePower, Inc., "MergePower, Inc", http://web.archive.org/web/20070914144019/http:/www.mergepower.com/, dated Sep. 14, 2007 in 1 page.
MergePower, Inc., "MergePower, Inc", http://web.archive.org/web/20110828073054/http:/www.mergepower.com/, dated Aug. 28, 2011 in 2 pages.
MERit Credit Engine™, Diagram, http://creditengine.net/diagram.htm, copyright 1997, pp. 1.
"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-647A-444F-BD11-8B4D7D8B3532,frame . . . in 6 pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Shvachko et al., "The Hadoop Distributed File System", 2010 IEEE 26th Symposium on Mass Storage Systems and Technologies (MSST), May 3, 2010, pp. 1-10.
"STAGG Variables Sum Up Credit Attributes for Automated Decisions", PRWeb, May 11, 2011, pp. 2. http://www.prweb.com/releases/2011/5/prweb8404324.htm.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Yuan et al., "Time-Aware Point-of-Interest Recommendation", SIGIR'13, Jul. 28-Aug. 1, 2013, Dublin, Ireland, pp. 363-372.
Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.
"AT&T Expected to Turn Up Heat in Card Wars", American Banker, May 27, 1993, vol. 158, No. 101, pp. 3.
"Balance Transfers Offer Opportunities", Risk Credit Risk Management Report, Jan. 29, 1996, vol. 6, No. 2, pp. 2.
"Bank of America Direct Web-Based Network Adds Core Functionality to Meet Day-To-Day Treasury Needs", Business Wire, Oct. 25, 1999. pp. 2.
"Chase Gets Positive," Bank Technology News, May 6, 2000, vol. 14, No. 5, p. 33.
"Cole Taylor Bank Chooses Integrated E-Banking/E-Payments/Reconciliation Solution From Fundtech", Business Wire, Oct. 21, 1999, pp. 2.
"Equifax and FICO Serve Consumers", Mortgage Servicing News, Mar. 2001, vol. 5, No. 3, p. 19.
"Experian Launches Portfolio Monitor—Owner NoticesSM", News Release, Feb. 2003, Costa Mesa, CA.
"FinExtra, Basepoint Analytics Introduces Predictive Technology for Mortgage Fraud", Oct. 5, 2005, pp. 3.
"FTC Testifies: Identity Theft on the Rise", FTC News Release, Mar. 7, 2000, pp. 3.
"ID Thieves These Days Want Your Number, Not Your Name", The Colombus Dispatch, Columbus, Ohio, http://www.dispatch.com/content/stories/business/2014/08/03/id-thieves-these-days-want-your-number-not-your-name.html, Aug 3, 2014 in 2 pages.
"Industry News, New Technology Identifies Mortgage Fraud: Basepoint Analytics Launches FraudMark", Inman News, American Land Title Association, Oct. 5, 2005, pp. 1.
"New Privista Product Provides Early Warning System to Combat Identity Theft", PR Newswire, Oct. 24, 2000, PR Newswire Association, Inc., New York.
ASIG's National Underwriting Database, A-PLUS, is Now the Largest in the Industry, Business Wire, Aug. 7, 1997.
Announcing TrueProfiler, http://web.archive.org/web/20021201123646/http://www.truecredit.com/index.asp, dated Dec. 1, 2002, 2 pages.
Applied Geographic Solutions, "What is MOSAIC™", as captured Feb. 15, 2004 from http://web.archive.org/web/20040215224329/http://www.appliedgeographic.com/mosaic.html in 2 pages.
Bitran et al., "Mailing Decisions in Catalog Sales Industry", Management Science (JSTOR), vol. 42, No. 9, pp. 1364-1381, Sep. 1996.
Brown et al., "ALCOD IDSS:Assisting the Australian Stock Market Surveillance Team's Review Process," Applied Artificial Intelligence Journal, Dec. 1, 1996, pp. 625-641.
Cantor, R. and Packer, F., "The Credit Rating Industry," FRBNY Quarterly Review, Summer-Fall, 1994, pp. 1-24.
ChannelWave.com, PRM Central—About PRM, http://web.archive.org/web/20000510214859/http://www.channelwave.com as printed on Jun. 21, 2006, May 2000 Archive.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chen, et al., "Modeling Credit Card 'Share of Wallet': Solving the Incomplete Information Problem", New York University: Kauffman Management Center, http://www.rhsmith.umd.edu/marketing/pdfs_docs/seminarsspr05/abstract%20-%20chen.pdf, Spring 2005, 48 pages.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Credit Card Management, "Neural Nets Shoot for Jackpot," Dec. 1995, pp. 1-6.

(56) References Cited

OTHER PUBLICATIONS

Credit Risk Management Report, Potomac, Mar. 9, 1998, vol. 8, No. 4.
CreditAnalyst, Digital Matrix Systems, as printed out Mar. 4, 2008, pp. 2.
CreditXpert Inc., CreditXpert 3-Bureau Comparison™, 2002, pp. 5, http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%205core%20&%20Analysis%20and%20Credit%20Wizard%20sample.pdf.
CreditXpert Inc., CreditXpert Essentials™, Advisor View—Experian on Jul. 7, 2003, http://www.credtxpert.com/cx_ess_app.pdf.
CreditXpert Inc., CreditXpert Essentials™, Advisor View—TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View—TransUnion on Oct. 10, 1999, pp. 6, http://www.creditxpert.com/cx_ess_app.pdf.
CreditXpert Inc., CreditXpert What-If Simulator™, 2002, pp. 8, http://web.archive.org/web/20030630132914/http://creditxpert.com/CreditXpert%20What-If%20Simulator(TM)%20sample.pdf.
CreditXpert, http://www.creditxpert.com/Products/individuals.asp printed Oct. 12, 2012 in 1 page.
Dataman Group, "Summarized Credit Statistics," Aug. 22, 2001, http://web.archive.com/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
DeGruchy, et al., "Geodemographic Profiling Benefits Stop-Smoking Service;" The British Journal of Healthcare Computing & Information Management; Feb. 2007; 24, 7; pp. 29-31.
Dillon et al., "Good Science", Marketing Research: A Magazine of Management & Applications™, Winter 1997, vol. 9, No. 4; pp. 11.
EFunds Corporation, "Data & Decisioning: Debit Report" printed Apr. 1, 2007, htttP://www.efunds.com/web/industry-solutions/financial-services/frm-debit-report/htm in 1 page.
Egol, Len; "What's New in Database Marketing Software," Direct, Aug. 1994, vol. 6, No. 8, pp. 39.
Ettorre, "Paul Kahn on Exceptional Marketing," Management Review, vol. 83, No. 11, Nov. 1994, pp. 48-51.
Experian and AGS Select SRC to Deliver Complete Marketing Solutions; Partnership First to Marketplace with Census2000 Data. PR Newswire. New York: Mar. 21, 2001. p. 1.
Experian Announces PLUS Score; Experian Press Release dated Oct. 16, 2003; Experian Global Press Office.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fickenscher, Lisa, "Merchant American Express Seeks to Mine its Data on Cardholder Spending Patterns," American Banker, vol. 162, Issue 56, Mar. 24, 1997, pp. 1-2.
GAO-03-661, Best Practices: Improved Knowledge of DOD Service Contracts Could Reveal Significant Savings, GAO, Jun. 2003.
Gilje, Shelby, "Keeping Tabs on Businesses That Keep Tabs on Us", NewsRoom, The Seattle Times, Section: Scene, Apr. 19, 1995, pp. 4.
Gonul, et al., "Optimal Mailing of Catalogs: A New Methodology Using Estimable Structural Dynamic Programming Models", 14 pages, Management Science, vol. 44, No. 9, Sep. 1998.
Hill, Kerry, "Identity Theft Your Social Security Number Provides Avenue for Thieves", NewsRoom, Wisconsin State Journal, Sep. 13, 1998, pp. 4.

Ideon, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions", Waltham, MA; Webpage printed out from http://www.lewtan.com/press/1208014_Impac-Lewtan.htm on Mar. 20, 2008.
Internal Revenue Service Data Book 2000, Issued Aug. 2001, Revised May 2003.
International Search Report and Written Opinion for Application No. PCT/US09/37565, dated May 12, 2009.
International Search Report and Written Opinion for Application No. PCT/US2007/06070, dated Nov. 10, 2008.
Jacob et al., A Case Study of Checking Account Inquiries and Closures in Chicago, The Center for Financial Services Innovation, Nov. 2006.
Jost, Allen; Neural Networks, Credit World, Mar./Apr. 1993, vol. 81, No. 4, pp. 26-33.
"JPMorgan Worldwide Securities Services to Acquire Paloma's Middle and Back Office Operations", Webpage printed from http://jpmorgan.com on Apr. 1, 2009.
Lee, W.A.; "Experian, on Deal Hunt, Nets Identity Theft Insurer", American Banker: The Financial Services Daily, Jun. 4, 2003, New York, NY, 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock, Various Pages, www.lifelock.com/, 2007.
Longo, Tracey, "Managing Money: Your Family Finances", Kiplinger's Personal Finance Magazine, Jun. 1, 1995, vol. 49, No. 6, pp. 4.
McManus et al.; "Street Wiser," American Demographics; ABI/Inform Global; Jul./Aug. 2003; 25, 6; pp. 32-35.
Merugu, et al.; "A New Multi-View Regression Method with an Application to Customer Wallet Estimation," The 12th International Conference on Knowledge Discovery and Data Mining, Aug. 20-23, 2006, Philadelphia, PA.
Muus, et al., "A Decision Theoretic Framework for Profit Maximization in Direct Marketing", Sep. 1996, pp. 20.
Occasional CF Newsletter; http://www.halhelms.com/index.cfm?fuseaction=newsletters.oct1999, Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Official Communication in Canadian Patent Application No. 2,381,349, dated Jul. 31, 2014.
Otter, et al., "Direct Mail Selection by Joint Modeling of the Probability and Quantity of Response", Jun. 1997, pp. 14.
"Parse", Definition from PC Magazine Encyclopedia, http://www/pcmag.com/encyclopedia_term_0.2542.t=parse&l=48862.00.asp as downloaded Mar. 5, 2012.
Perlich et al., "High Quantile Modeling for Customer Wallet Estimation with Other Applications," The 13th International Conference on Knowledge Discovery and Data Mining, Aug. 12-15, 2007, San Jose, CA.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Powerforms: Declarative Client-Side for Field Validation, ISSN 1386-145x, Dec. 2000.
Saunders, A., "Data Goldmine," Management Today, London: Mar. 1, 2004, 6 pages.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.

(56) References Cited

OTHER PUBLICATIONS

Stein, Benchmarking Default Prediction Models: Pitfalls and Remedies in Model Validation, Moody's KMV, Revised Jun. 13, 2002, Technical Report #020305; New York.
Sweat, Jeff; "Know Your Customers," Information Week, Nov. 30, 1998, pp. 20.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Van Collie, Shimon, "The Road to Better Credit-Card Marketing," Bank Technology News, Sep. 1995, pp. 4.
Verstraeten, Geert, Ph.D.; Issues in predictive modeling of individual customer behavior: Applications in targeted marketing and consumer credit scoring; Unversiteit Gent (Belgium) 2005.
Watts, Craig, "Consumers Now Can Know What Loan Rate Offers to Expect Based on Their FICO Credit Score at MyFICO.com," Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webber, Richard, "The Relative Power of Geodemographics vis a vis Person and Household Level Demographic Variables as Discriminators of Consumer Behavior," CASA:Working Paper Series, http://www.casa.uci.ac.uk/working_papers/paper84.pdf, Oct. 2004, pp. 17.
Webpage printed out from http://www.fairisaac.com/NR/rdonlyres/AC4C2F79-4160-4E44-B0CB-5C899004879A/0/ScoreNetnetworkBR.pdf on Mar. 4, 2008.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Wyatt, Craig, "Usage Models just for Merchants," Credit Card Management, Sep. 1995, vol. 8, No. 6, pp. 4.
Yücesan et al., "Distributed Web-Based Simulation Experiments for Optimization", Simulation Practice and Theory 9, 2001, pp. 73-90.
Zimmerman et al., "A Web-Based Platform for Experimental Investigation of Electric Power Auctions," Decision Support Systems, 1999, vol. 24, pp. 193-205.

\* cited by examiner

USER BEHAVIOR SEGMENTATION USING LATENT TOPIC DETECTION

CROSS-REFERENCE TO RELATED APPLICATIONS

This application claims priority benefit under 35 U.S.C. § 119(e) to U.S. Provisional Application No. 62/094,819, filed on Dec. 19, 2014, entitled "Systems and Interactive User Interfaces for Database Access and Application of Rules to Determine Recommendations for User Actions," the disclosure of which is hereby incorporated herein by reference in its entirety. Any and all priority claims identified in the Application Data Sheet, or any correction thereto, are hereby incorporated by reference under 37 C.F.R. § 1.57.

This application is also related to U.S. application Ser. No. 14/975,536 filed on the same day as the present application, entitled "ENTITY RECOMMENDATION SYSTEMS AND METHODS," the disclosure of which is hereby incorporated herein by reference in its entirety.

This application is also related to U.S. application Ser. No. 14/975,440 filed on the same day as the present application, entitled "SYSTEMS AND METHODS FOR DYNAMIC REPORT GENERATION BASED ON AUTOMATIC MODELING OF COMPLEX DATA STRUCTURES," the disclosure of which is hereby incorporated herein by reference in its entirety.

BACKGROUND

Field

The present development relates to applying topic discovery algorithms, such as a latent dirichlet allocation algorithm, to reduce the dimensionality of event data to develop segmentations based on user n behavior indicated by the event data.

Description of Related Art

With the advent of modern computing devices, the ways in which users use electronic devices to interact with various entities has dramatically increased. Each event a user performs, whether by making a small purchasing at a grocery store, logging into a web-site, checking a book out of a library, driving a car, making a phone call, or exercising at the gym, the digital foot print of the users interactions can be tracked. The quantity of event data collected for just one user can be immense. The enormity of the data may be compounded by the number of users connected and the increasing number of event types that are made possible through an increasing number of event sources and entities. To understand a particular user, one can provide large swaths of the user's event history, but there are several obstacles which make this difficult if not impossible. To ensure a full picture of the user is provided, all event data would need to be considered. As mentioned, this can include providing many megabytes, if not gigabytes of data, for one user. This may pose a problem in limited resource environments such as mobile computing or networked system. In the mobile world, mobile computing devices typically have constraints on the memory, power, and processing capabilities. To provide a lot of data to the device could drain these precious resources. In the networked systems, one concern is network utilization. Providing all of a user's event data for each event could increase the traffic flowing through the network and thus adversely impact the overall performance.

One solution could be to take a snapshot of a user's events. However, this method fails to consider longer term trends by making an arbitrary cutoff to the data. The cutoff may be based on date, event source, or other criteria to limit the event data that would be transmitted for a user. This can lead to inaccurate assumptions about the user based on the limited view of their historical events. Making sense of the collected event data and providing usable forms of the data.

Accordingly, improved systems, devices, and methods for compressing event data to reduce its dimensionality and then placing users into segments with similar behavior without losing descriptive details of the underlying set of event data set are desirable.

SUMMARY

Various systems and methods are disclosed which include features relating to artificial intelligence directed compression of user event data based on complex analysis of user event data including latent feature detection and clustering. Further features are described for reducing the size of data transmitted during event processing data flows and devices such as card readers or point of sale systems. Machine learning features for dynamically determining an optimal compression as well as identifying targeted users and providing content to the targeted users based on the compressed data are also included.

The systems, methods, and devices of the disclosure each have several innovative aspects, no single one of which is solely responsible for the desirable attributes disclosed herein.

In one innovative aspect, a method of artificial intelligence guided segmentation of event data is provided. The method includes accessing, from a data store, a set of event records associated with respective users of a group of users. A first set of event records is associated with a first user is stored using a first quantity of storage. The method also includes accessing an event categories data structure indicating a set of event categories and, for each event category, attribute criteria usable to identify events associated with respective event categories. For the event records, the method includes identifying one or more attributes of the event record, comparing the identified one or more attributes of the event record to the attribute criteria of respective event categories, and based on said comparing, assigning, to the event record, an event category having attribute criteria matching the identified one or more attributes of the event record. The method also includes generating, for the first user, first compressed event data using the event records associated with the first user and a latent feature identification model such as a dirichlet allocation model. The latent feature identification model takes the event records for the first user and the event categories assigned thereto as inputs. The first compressed event data associated with the first user is stored using a second quantity of storage that is less than the first quantity of storage for storing the event records of the first user. The method also includes assigning each user to one of the data clusters included in a clustering model using respective first compressed event data for the user. The method further includes generating, for the first user, second compressed event data using a comparison between the first compressed event data for the first user and an average latent feature identification value for a latent feature included in the data cluster to which the first user has been assigned. The second compressed event data associated with the first user is stored using a third quantity of storage that is less than the second quantity of storage.

In some implementations of the method, assigning a user to one of the data clusters includes identifying center points for each data cluster included in the clustering model. In such implementations, the method may also include generating an association strength for each latent feature included in the first compressed event data for the users for each data cluster. The association strength may indicate a degree of association between the first compressed event data for a user and respective data cluster center points. The method may also include identifying the one of the data clusters as having the highest association strength for the user from amongst the data clusters included in the clustering model.

In some implementations, generating the association strength for a user includes comparing a latent feature identification value included in the first compressed event record for a latent feature for the user to the center point.

Generating the second compressed event data, may in some implementations, include calculating a secondary center point for a secondary data cluster using first compressed event data for each user assigned to the secondary data cluster. In such implementations, the method may include generating a secondary association strength for each latent feature included in the first compressed event data for a user assigned to the data cluster. The secondary association strength may indicate a secondary degree of association between the first compressed event data for the user assigned to the data cluster and the secondary center point of the secondary data cluster to which the user is not assigned. The second compressed event data may include an identifier for the secondary data cluster and the generated secondary association strengths.

In some implementations, the method may include accessing content data including a content identifier and an indication of a target data cluster of the data clusters. The method may also include identifying a group of users assigned to the target data cluster and selecting a target group of users having second compressed event data including generated association strengths indicating a threshold degree of association to the center point of the target data cluster. An electronic communication may be generated to provide to the target set of user profiles, the electronic communication including content indicated by the content identifier.

In some implementations, the method may include training the latent feature identification model through probabilistic analysis of a plurality of historical event records to identify a target number of topics. The method may also include training the clustering model using a desired compression level indicating a number of data clusters for the clustering model. Training the clustering model may include generating a center point for each data cluster using topically compressed historical event data.

In another innovative aspect, a method of compressing transaction data is provided. The method includes receiving a set of transaction records each identifying a transaction by one of a group of users. The method further includes assigning a category to each of the set of transaction records. The method also includes generating first compressed transaction records using a latent feature identification model. The method includes identifying a clustering compression model for the one of the group of users. The method further includes generating second compressed transaction records using the first compressed transaction records and the clustering compression model.

In some implementations, generating a first compressed transaction record for a user includes receiving association strengths for each topic identified by the latent feature identification model for a set of transactions for the user.

Some implementations of the method may include receiving a compression configuration indicating a target number of features to identify for an end user and training a latent dirichlet allocation model to identify the target number of features using the received set of transaction records. The latent feature identification model may include the latent dirichlet allocation model trained.

Each data cluster included in the clustering compression model may be associated with at least one latent feature identifiable by the latent feature identification model. In such implementations, generating the second compressed transaction records may include assigning each user to one of the data clusters using the first compressed transaction records. Generating the second compressed transaction records may also include generating the second compressed transaction records for each user using a comparison between the first compressed transaction data for a user and the center point for the cluster to which the user is assigned.

In some implementations, generating the second compressed transaction records may include calculating a secondary center point for a secondary data cluster using first compressed transaction data for each user assigned to the secondary data cluster, and generating a secondary association strength for each latent feature included in the first compressed transaction data for a user assigned to the data cluster. The secondary association strength may indicate a secondary degree of association between the first compressed transaction data for the user assigned to the data cluster and the secondary center point of the secondary data cluster to which the user is not assigned. The second compressed transaction data may include an identifier for the secondary data cluster and the generated secondary association strengths.

In some implementations, the method includes training a clustering model using the desired compression level and at least a portion of the set of transaction records.

In some implementations, the method includes receiving, from a transaction terminal, a pending transaction record for a user included in the group of users. The pending transaction record is not included in the set of transaction records. The method may also include retrieving a second compressed transaction record for the user using an identifier of the user included in the pending transaction record. The method may further include transmitting the second compressed transaction record to the transaction terminal.

A content element may be selected for presentation to the user during or after the current transaction using the second compressed transaction record. The content element may be provided to a content delivery system configured to transmit the content element to the user.

In another innovative aspect, a transaction data compression system is provided. The system includes a data preparation module configured to access transaction data associated with a group of users. For a set of transactions in the transaction data, the data preparation module is configured to assign a transaction category based on one or more attributes of the transaction, and normalize a level of the transaction based on spend levels of individual users.

The system includes a compression module configured to generate, for each user, first compressed transaction data using the transaction categories assigned to the transaction records for a respective user and a latent feature identification model. The first compressed transaction data associated with the one of the respective users is stored using a second quantity of storage that is less than the first quantity of storage. The compression module is further configured to identify a clustering compression model for users included in the plurality of users. The compression module may be further configured to assign each of the users to one of a set of data clusters included in the respective clustering compression model using respective first compressed transaction data for the user, and generate, for each user, second compressed transaction data using a comparison between the first compressed transaction data for a user and an average for the data cluster to which the user has been assigned. The second compressed transaction data may be stored using a third quantity of storage that is less than the second quantity of storage.

In some implementations, the system may include a profile targeting module. The profile targeting module may be configured to access content data including a content identifier and an indication of a target data cluster of the data clusters. The profile targeting module may be further configured to identify a group of users assigned to the target data cluster. The profile targeting module may be further configured to select a target group of users having second compressed transaction data including generated association strengths indicating a threshold degree of association to the center point of the target data cluster. The profile targeting module may also be configured to generate an electronic communication to provide to the target set of user profiles, the electronic communication including content indicated by the content identifier.

A content generation module may be included in the system. The content generation module may be configured to access the target group of users and identify a target device for a user included in the target group of users. In some implementations, the content generation module may be configured to provide the electronic communication to the target device.

A card reader may be included in some implementations of the system. The card reader may include a payment information detector configured to detect payment information for a transaction for a user. The card reader may further include a targeted content generator configured to receive compressed transaction data during the transaction for the user, and identify content stored by the card reader using a comparison between a content selection rule and the compressed transaction data, the content for presentation via the card reader. The card reader may also include a display configured to present the content to the user.

A compression model generator may be included in the system. The compression model generator may be configured to generate at least one of the latent feature identification model and a clustering model identifying the set of data clusters for the set of transaction records.

DETAILED DESCRIPTION

Disclosed herein are system and methods of analyzing, processing, and manipulating large sets of event data of users in order to provide various visualizations, alerts, and other actionable intelligence to users, merchants, and others. The event data may include, for example, specific transactions on one or more credit cards of a user, such as the detailed transaction data that is available on credit card statements. Transaction data may include transaction-level debit information also, such as regarding debit card or checking account transactions. The transaction data may be obtained from various sources, such as from credit issuers (e.g., financial institutions that issue credit cards), transaction processors (e.g., entities that process credit card swipes at points of sale), transaction aggregators, merchant retailers, and/or any other source. Transaction data may also include non-financial exchanges. For example, login in activity, Internet search history, Internet browsing history, posts to a social media platform, or other interactions between communication devices. In some implementations, the users may be machines interacting with each other (e.g., machine to machine communications).

This disclosure describes several unique uses of such transaction data. In general, the features relate to compression of user transaction database on complex analysis of user transaction data including latent feature detection and clustering. Further features are described for including these features in transaction processing data flows and devices such as card readers or point of sale systems. Features for identifying targeted users and providing content to the targeted users based on the detected behavioral segmentation are also included. The identification may also be used for login authentication, fraud detection, or activity alerting. For example, the compressed user transaction data may provide a transaction "fingerprint" for a user. Using the fingerprint, a requested transaction may be analyzed to determine a likelihood that the transaction was initiated by the user. Where the transaction is a login in attempt, the authentication may include this likelihood in considering whether to authenticate the user. Where the transaction is an exchange, the authorization of the exchange may consider the likelihood in making the authorization decision.

Figure 15:
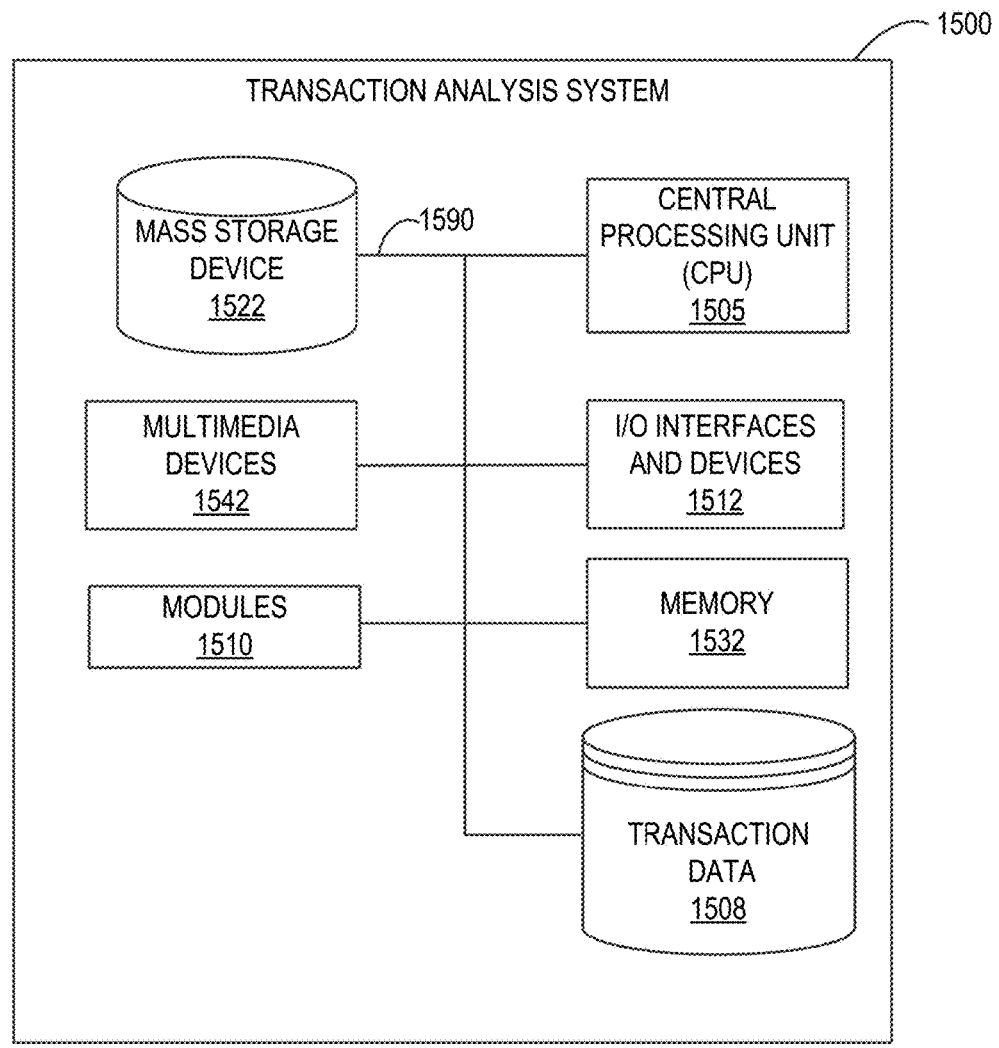
FIG. 15 is a block diagram showing example components of a transaction analysis processing system.

Each of the processes described herein may be performed by a transaction analysis processing system (also referred to as simply "the system," "the transaction analysis system," or "the processing system" herein), such as the example transaction analysis system illustrated in FIG. 15 and discussed below. In other embodiments, other processing systems, such as systems including additional or fewer components than are illustrated in FIG. 15 may be used to perform the processes. In other embodiments, certain processes are performed by multiple processing systems, such as one or more servers performing certain processes in communication with a user computing device (e.g., mobile device) that performs other processes.

As noted above, in one embodiment the transaction analysis processing system accesses transaction data associated with a plurality of users in order to segment the users into groups. This transaction based segmentation provides advantages over other segmentation systems that make use of demographic information to find groups of "like" individuals, some of which are discussed below. Furthermore, it may be desirable to provide accurate information about a user during a transaction. Such "real-time" data allows the user to receive relevant information at a specific point in time.

Exemplary Definitions

To facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Transaction data (also referred to as event data) generally refers to data associated with any event, such as an interaction by a user device with a server, website, database, and/or other online data owned by or under control of a requesting entity, such as a server controlled by a third party, such as a merchant. Transaction data may include merchant name, merchant location, merchant category, transaction dollar amount, transaction date, transaction channel (e.g., physical point of sale, Internet, etc.) and/or an indicator as to whether or not the physical payment card (e.g., credit card or debit card) was present for a transaction. Transaction data structures may include, for example, specific transactions on one or more credit cards of a user, such as the detailed transaction data that is available on credit card statements. Transaction data may also include transaction-level debit information, such as regarding debit card or checking account transactions. The transaction data may be obtained from various sources, such as from credit issuers (e.g., financial institutions that issue credit cards), transaction processors (e.g., entities that process credit card swipes at points-of-sale), transaction aggregators, merchant retailers, and/or any other source. Transaction data may also include non-financial exchanges, such as login activity, Internet search history, Internet browsing history, posts to a social media platform, or other interactions between communication devices. In some implementations, the users may be machines interacting with each other (e.g., machine-to-machine communications). Transaction data may be presented in raw form. Raw transaction data generally refers to transaction data as received by the transaction processing system from a third party transaction data provider. Transaction data may be compressed. Compressed transaction data may refer to transaction data that may be stored and/or transmitted using fewer resources than when in raw form. Compressed transaction data need not be "uncompressible." Compressed transaction data preferably retains certain identifying characteristics of the user associated with the transaction data such as behavior patterns (e.g., spend patterns), data cluster affinity, or the like.

A model generally refers to a machine learning construct which may be used by the segmentation system to automatically identify the latent topics in the transaction data and to generate segments for each user based on their transaction behavior as indicated by their transaction data. A model may be trained. Training a model generally refers to an automated machine learning process to generate the model. A model may be represented as a data structure that identifies, for a given value, one or more correlated values. For example, a topic identification data structure may include data indicating, for a candidate list of transactions, one or more topics.

A topic generally refers to a theme or common behavior exhibited in transaction data. Topics can be learned by examining the transaction behavior of users we are interested in analyzing. Each topic may be defined by a subset of merchant categories or other information included in the transaction data. The topics may be learned such that they closely reproduce the observed behaviors in the transaction data set. For example, a set of transaction may be analyzed to determine what transaction aspects (e.g., transaction category, merchant, amount, location, time and/or day of the week of the transaction) are represented across a significant number of transactions. These aspects may be included as topics describing, in general terms, what the set of transactions are directed to.

A segment (also referred to herein as a "data cluster") generally refers to a group of users where each user is associated with one or more topics within a set of topics with different weights. A segment generally indicates a collection of users with similar topic distribution in their transaction behavior. For example, a segment identifying a lifestyle of "sports fan" may include a user having transactions identified in the topics of "athletic events," "sporting goods," "physical fitness," and "sports bar."

The term machine learning generally refers to automated processes by which received data is analyzed to generate and/or update one or more models. Machine learning may include artificial intelligence such as neural networks, genetic algorithms, clustering, or the like. Machine learning may be performed using a training set of data. The training data may be used to generate the model that best characterizes a feature of interest using the training data. In some implementations, the class of features may be identified before training. In such instances, the model may be trained to provide outputs most closely resembling the target class of features. In some implementations, no prior knowledge may be available for training the data. In such instances, the model may discover new relationships for the provided training data. Such relationships may include similarities between data elements such as transactions or transaction categories as will be described in further detail below.

A message encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, a message may be composed, transmitted, stored, received, etc. in multiple parts.

The terms determine or determining encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The term selectively or selective may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

The terms provide or providing encompass a wide variety of actions. For example, "providing" may include storing a value in a location for subsequent retrieval, transmitting a value directly to a recipient, transmitting or storing a reference to a value, and the like. "Providing" may also include encoding, decoding, encrypting, decrypting, validating, verifying, and the like.

A user interface (also referred to as an interactive user interface, a graphical user interface or a UI) may refer to a web-based interface including data fields for receiving input signals or providing electronic information and/or for providing information to the user in response to any received input signals. A UI may be implemented in whole or in part using technologies such as HTML, Flash, Java, .net, web services, and RSS. In some implementations, a UI may be included in a stand-alone client (for example, thick client, fat client) configured to communicate (e.g., send or receive data) in accordance with one or more of the aspects described.

Example Transaction Data Compression System

Figure 1:
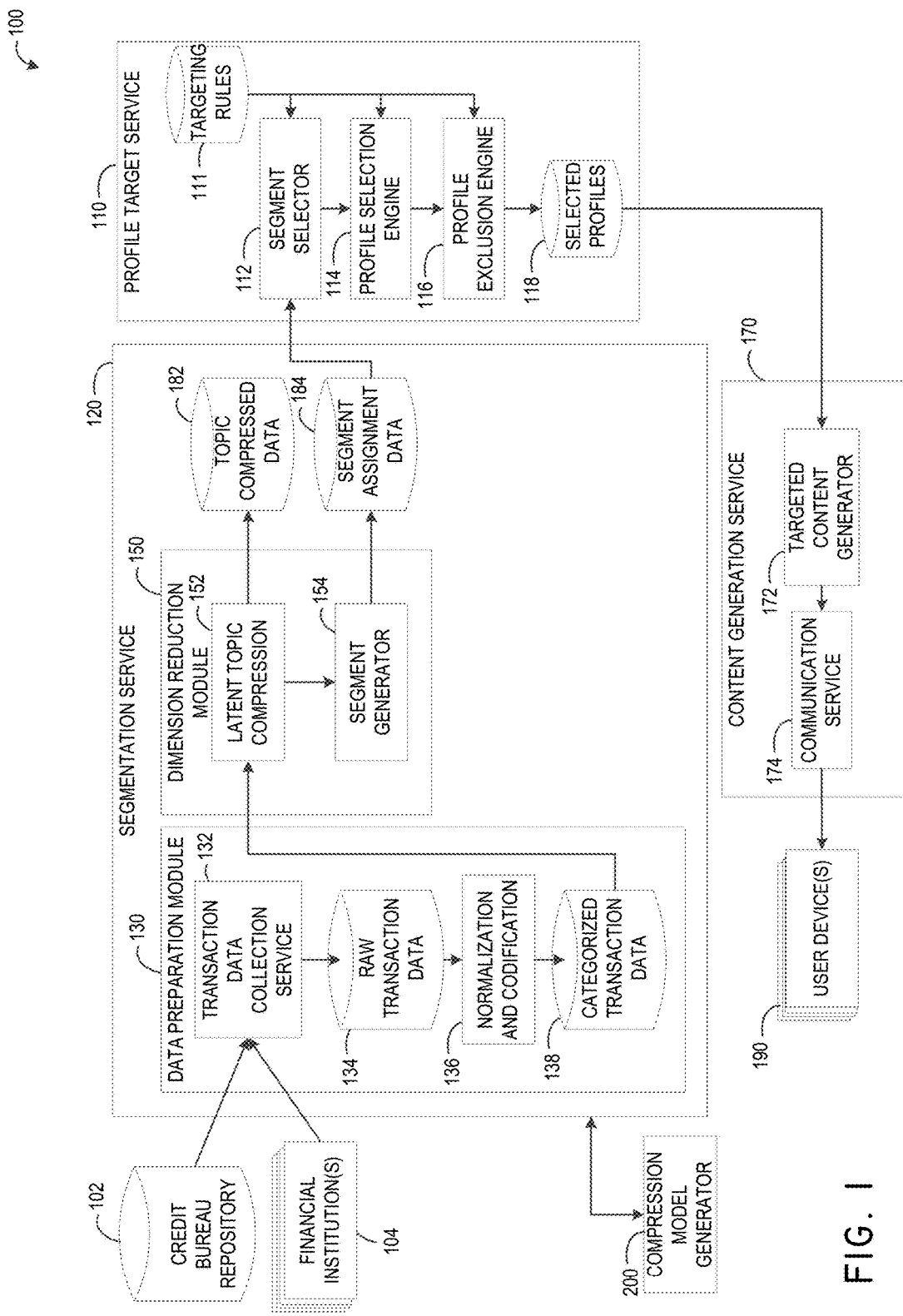
FIG. 1 shows a functional block diagram of an example of a user behavior segmentation system.

FIG. 1 shows a functional block diagram of an example of a user behavior segmentation system. The system 100 shown can process transaction data from a variety of sources. As shown, transaction data may be received from a credit bureau repository 102 or one or more financial institutions 104. However, as discussed above, transaction data may be received from a user's car, a gym, a library, a merchant, or other system whereby the user interacts to perform a transaction.

The transaction data may be received by a segmentation service 120. Although FIG. 1 shows a direct connection between the segmentation service 120 and the sources of transaction data, it will be understood that other intermediate systems may be used during transmission. The segmentation service 120 is responsible for reducing the dimensionality of the transaction data such that user behavior-based segmentation can be performed effectively and accurately. As discussed above, the transaction data dimension reduction may be particularly useful to allow accurate user profiling based on large volumes of transaction data. In some implementations, the large volume of transaction data may also be from disparate sources. Accordingly, the segmentation service 120 is provided to compress transaction data while retaining meaningful profiling data for each account holder.

The segmentation service 120 includes a data preparation module 130. The data preparation module is provided to ensure transaction data is uniformly organized prior to dimension reduction. A transaction data collection service 132 is included to receive the transaction data from the transaction data sources. The transaction data may be received via wire, wireless, or hybrid wired and wireless means. The transaction data collection service 132 may collect data by requesting transaction data from a data source. In some implementations, the collection service 132 may receive transaction data from a transaction data source such as according to a schedule.

The transaction data received from a transaction data source may be stored in a raw transaction data store 134. The raw transaction data store 134 may be a specialized data store device configured to handle large volumes of data.

The data preparation module 130 shown in FIG. 1 includes a normalization and codification device 136 which may be implemented using a processor specially programmed with executable instructions to generate normalized and codified transaction data. The normalization process may include normalizing the format of the data such that transaction data from different sources each appear in a uniform record. For example, the system 100 may have a target record type and include one or more conversions to map a value from the raw transaction record to a field of the target record type.

The instructions may further cause the device 136 to categorize or codify the transaction data. In some implementations, the set of all users is run through one or more models, such as a latent dirichlet allocation (LDA) algorithm, which was originally designed to discover topics in text documents. In this approach each user is treated as a document, and each transaction is converted to a "word" by codification. These "words," which are analogous to the "categories" discussed herein, may be included in the raw transaction data. In some implementations, the categories may be added to the raw transaction data by the device 136. The category or "word" assigned to a particular transaction may be determined by the device 136 using the transaction data such as an item identifier, an item name, merchant name, a merchant code, or a merchant category code or merchant location, or transaction amount, or transaction time, or combinations of the above. For example, the segmentation service 120 may be segmenting the data for identifying users to whom the system 100 will be providing specific content, such as health and safety information. As such, it may be desirable to categorize the transactions in a variety of health and safety categories. The categories may be provided as a configuration to the segmentation service 120 such that the same raw transaction data may be compressed in different ways. The configuration may identify the available categories and transaction data that cause the categorization device 136 to assign the associated category or word.

The normalization and codification device 136 is in data communication with a codified transaction data store 138. The codified transaction data store 138 is a specially configured transaction data storage device capable of handling large volumes of data (e.g., hundreds of millions of records). Illustratively, the system 100 may include hundreds of millions, or billions of transaction records. Advantageously, the system 100 is able to process these records in a duration of a few hours, whereas if such processing were to be performed manually by humans, it could take days, weeks, months, or years, depending on the number of human resources applied to the processing task. In some implementations, the codified transaction data store 138 may be commonly implemented with the raw transaction data store 134. However, in some implementations, such as when the segmentation service 120 provides segmentation data for different end uses, it may be desirable maintain separate data stores to ensure the security of the categorized or codified data for each end user.

The segmentation service 120 includes a dimension reduction module 150. The dimension reduction module 150 is in data communication with the codified transaction data store 138. The dimension reduction module 150 may be configured to generate compressed transaction records. To reduce the dimensions of the normalized transaction records, the dimension reduction module 150 may include a latent topic compression unit 152. The latent topic compression unit 152 may be configured to analyze transaction data for a group of users and identify latent features, such as topics, included in the transaction data. One example of latent topic identification may include a latent dirichlet allocation (LDA) model. The topic identification information can be a compressed representation of the normalized transaction data for a user. The topic identification information may include, for each topic modeled by the latent feature model used by the latent topic compression unit 152, an association value. The association value may indicate how closely the user is associated with each of the topics modeled. The topic identification information may be stored in a topic compressed data store 182.

The dimension reduction module 150 may include a segment generator 154. The latent topic compression unit 152 may provide the topic compressed data to the segment generator 154. In some implementations, the latent topic compression unit 152 may transmit a message including an identifier for the topic compressed data. The segment generator 154 may use the identifier to obtain the topically compressed transaction records from the topic compressed data store 182. Once obtained, the segment generator 154 may assign each user to a data cluster or segment. The assignment information may be stored in a segment assignment data store 184. Although topic compressed data store 182 and the segment assignment data store 184 are shown as separate data storage devices, it will be understood that all or some portion of these may be commonly implemented on a single data storage device.

As discussed above, the topic and/or segmentation compression may be performed using models. The models may be generated by a compression model generator 200.

Example Training Phase

To train models for transaction data compression, the transaction analysis system may collect, for each entity (e.g., individual users), transaction data over a certain period of time (for example one year). Each user may be represented by a list of all of their transactions during the designated time period and each transaction may be converted to a "word" by means of categorical description of the type of transaction. For example, a particular card transaction may be associated with a category of "Restaurant," or more specifically "Chinese Restaurant"

In some implementations, the set of all users is run through one or more models, such as a latent dirichlet allocation (LDA) algorithm, which was originally designed to discover topics in text documents. In this approach each user is treated as a document, and each transaction is converted to a "word" by codification. The transaction to word conversion can be based on merchant category code (MCC) or merchant name, or merchant location, or transaction amount, or transaction time, or combinations of the above. Transaction at restaurant, restaurant transaction with transaction amount larger than $100, restaurant transaction from 6 pm to 9 pm and with transaction amount larger than $100 are examples of valid conversions. Transaction codification or conversion is a crucial step in transaction data compression by using latent topic discovery algorithm such as LDA. Different codification will lead to different results and optimal codification is problem dependent. The optimal codification for fraud detection may not be optimal for extracting insights from transaction data for marketing optimization. After codification transactions are treated as words that make up the documents. Each document (a proxy for the user) may be represented by a collection of words. The words may be derived from transaction MCCs or merchant names or merchant location or transaction amount or transaction time or combination of the above for transactions performed by the user. The latent topic identification model may be configured to discover a set of statistical properties common in the dataset and creates topics which describe various archetypes of spend patterns. The number of spend patterns to be discovered can be set manually or discovered automatically. The output of this model may be a series of parameters describing the topics which may be referred to in this example as "Model A."

In addition to creating "Model A", each user may be assigned a likeness measure to each of the topics discovered by "Model A." In one embodiment, this measure represents the weight of a particular topic in order to most accurately represent the user's spending behavior. The result of this step is a set of users which are each represented by a vector of the length of the number of topics which may be referred to in this example as "Vector A."

"Vector A" can be used to assign each user to one or more segments in a variety of ways such as, for example, by assigning the user to the segment which represents the largest in the vector (e.g., strongest association) or assigning the user to all segments above a particular threshold. It is also possible to use "Vector A" as in input to additional algorithms which can be used to further classify a user. In addition, "Vector A" is itself a potential output of the system which describes the user's transactional behavior in a compressed manner.

"Vector A" may then be used as an input to a clustering algorithm, such as k-means clustering in order to produce clustering results, which will be referred to as "Model B." In one embodiment, the clustering algorithm returns the location of the center of a preset number of clusters in the same space as "Vector A". A segment can then be assigned to a user by measuring the distance from "Vector A" to each of the points described in "Model B." This system may then, optionally, generate a second vector, "Vector B" which measures the distances of the given data point (user) to the center point of each cluster in the topic space. "Vector B" is of the same dimension as the number of clusters produced by "Model B" and can be used in a similar manner to "Vector A."

Figure 2:
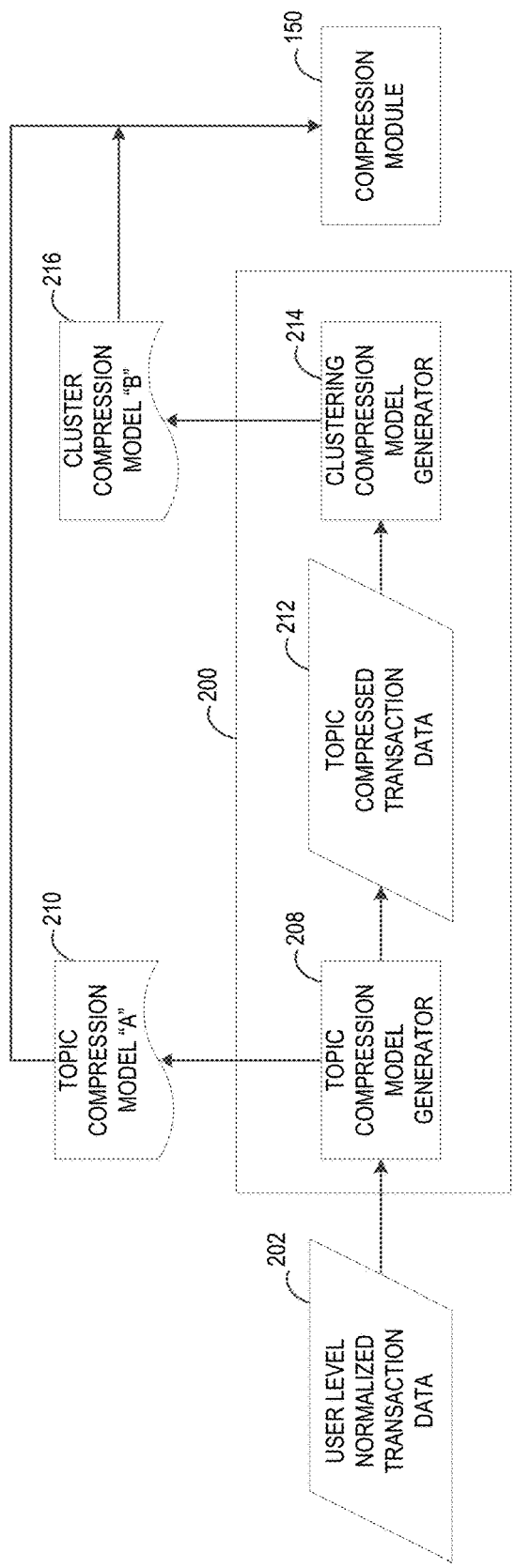
FIG. 2 shows a functional block diagram of an example of a process to train a user behavior segmentation system.

FIG. 2 shows a functional block diagram of an example of a process to train a user behavior segmentation system. A set of user level normalized and codified transaction data 202 may be provided for training the models. A topic compression model generator 208 may receive the user level normalized and codified transaction data 202. The topic compression model generator 208 may then generate a topic compression model 210. The model 210 may be generated by iteratively analyzing the user level records to generate a model that accurately compresses the user data records into smaller, compressed records. For example, when generating a latent topic model, the iterations may adjust the number of topics to identify a model that meets specific criteria such as a target number of topics or a target "goodness-of-fit" measure.

In some embodiments, the topic compression model generator 208 may automatically determine an optimal number of topics to learn during the training phase. For example, the topic compression model generator 208 may divide the population into two pieces referred to as "Train and Test" groups. The topic compression model generator 208 may then execute the training algorithm described above multiple times with a variety number of topics in order to learn using the "Train" data. As a side-benefit of the training phase, a total probability of the dataset may be produced. This can be thought of as a goodness of fit measure. In general the more topics developed off of the training set the higher the total probability will be on the training data set. The "Test" data may then be run through the generated models (e.g., topic compression model). Finally, the topic compression model generator 208 may measure the total probability for the "Test" data for each model and select the model with the highest "Test" probability.

Figure 3:
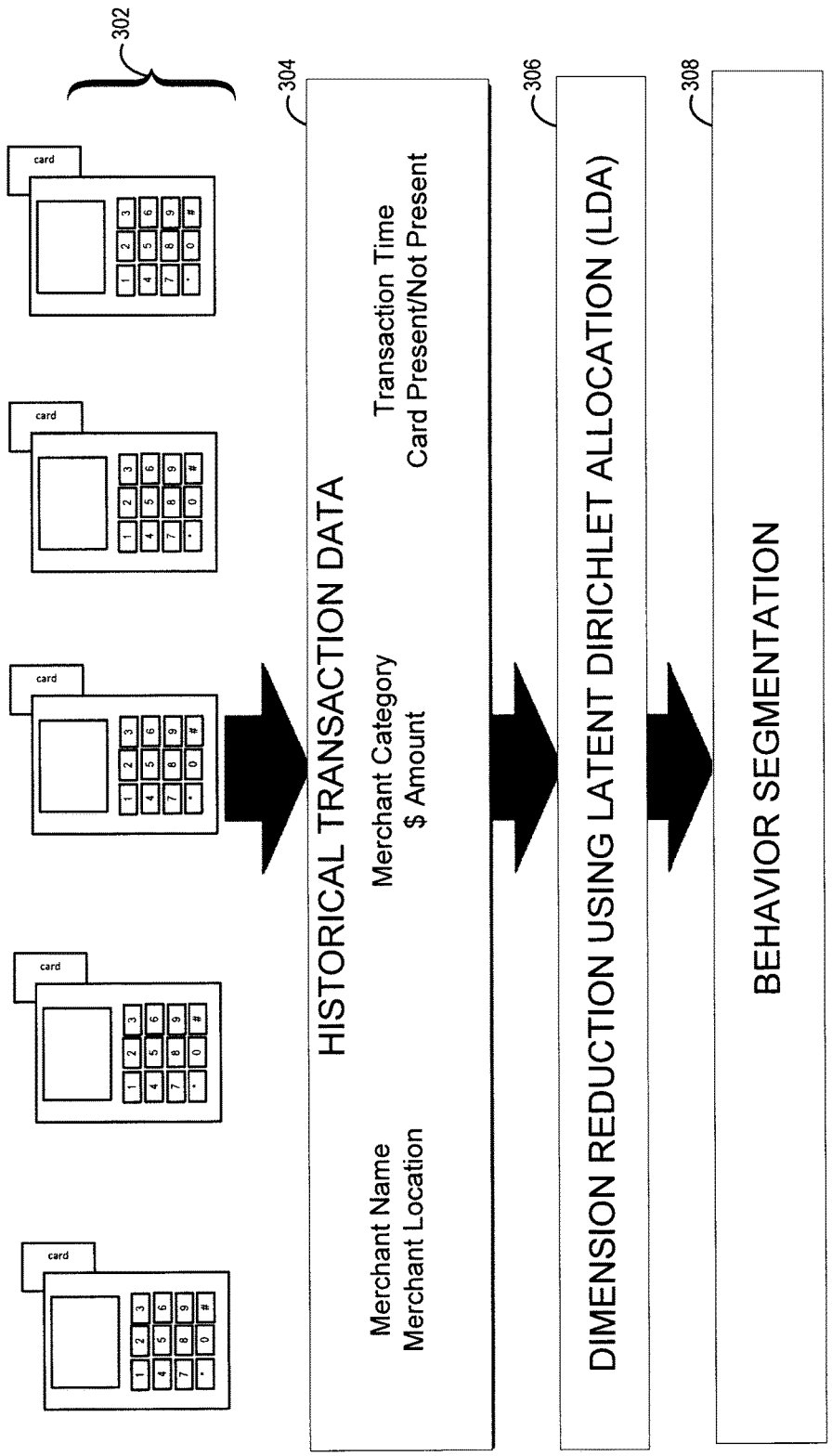
FIG. 3 shows a process flow diagram of example method of transaction data compression with machine learning.

FIG. 3 shows a process flow diagram of an example method of transaction data compression with machine learning. The method 300 shown in FIG. 3 may be implemented in whole or in part by one or more of the devices described in this application such as FIG. 1 or 2. FIG. 3 summarizes some of the aspects of model generation discussed with reference to FIG. 2.

A network of card readers 302 may provide transaction data 304 for transactions processed via a reader. In this example, the transaction data may be obtained from a point of sale transaction processor, such as an entity that is the intermediary between the point-of-sale and the credit card issuer, which may be referred to herein as a transaction processor.

The transaction data 304 may include merchant name, merchant location, merchant category, transaction dollar amount, transaction date, and an indicator as to whether or not the card was present for the transaction.

At block 306, the number of dimensions of information represented by the transaction data may be reduced using latent topic detection techniques. Once the clustering is performed, at block 308, data clusters indicative of behavior segments may be generated. The clustering at block 308 may produce an interface, or underlying data for generating the interface, shown in FIG. 10.

At block 308, the transaction data may be further processed, such as by the transaction analysis system using machine learning to a large set of transaction data associated with multiple users, to determine behavior segments associated with respective users. The behavior segments may be selected based on such transaction data and/or compressed transaction data to provide a different segmentation than is possible using traditional user information alone such as demographic data of users. Depending on the embodiment, a user can be associated of more than one segment.

Returning to FIG. 2, once an optimal topic model is identified, the topic compression model generator 208 may output a topic compressed transaction data 212 including the topic compressed transaction data for each user. A clustering compression model generator 214 may also be included. The clustering compression model generator 214 may obtain the topic compressed transaction data 212 and generate a clustering compression model 216. The generation of the clustering compression model 216 may be an iterative process for generating an appropriate clustering compression model. For example, the clustering compression model generator 214 may iteratively identify center points for clusters. For each iteration, how compressed user records are assigned to clusters may be evaluated as a criteria for determining whether the model is suitable. The evaluation may include density of users within the clusters, number of clusters, center points for a cluster, average distance to a center point for each cluster, and other similar information that may be identified from the cluster and/or transaction data for users assigned to the cluster.

In one example, the clustering compression model generator 214 may compare the topically compressed user records to each other to identify clusters of compressed user records. The data clusters may be determined using an automated, machine-driven approach, without manually-driven rules. It may not be clear given the quantity of transactions and compressed transaction data records how users can be grouped to form data clusters. In one embodiment, the clustering compression model generator 214 may automatically group "like" users to indicate affinity groups. The grouping may be based on transaction data and/or topically compressed transaction data for the users. For example, data clusters may be identified using spend categories for a set of users. The clustering compression model generator 214 may process the transaction data and/or compressed transaction data to determine likely data clusters within the data set. It may be desirable to direct the comparison such that a predetermined number of clusters are identified. For example, some end users may wish to selectively provide content to ten different clusters of users. In such implementations, the identification of clusters may be guided such that the number of clusters identified matches the target number of clusters (e.g., in this example, ten clusters). In some embodiments, multiple techniques may be applied to identify clusters, such as combining traditional clustering algorithms with machine-learning based techniques, such as topic modeling.

The topic compression model 210 and the clustering compression model 216 may be provided to the compression module 150 and used to compress subsequently received transaction data as described above and in further detail below.

The models generated by the compression model generator 200 shown in FIG. 2 may be used by different end users. As such, the compression model generator 200 may receive a training configuration to generate models for specific end users. For example, the number of topics, specific topics, compression ratios, data cluster size, data cluster density, transaction categorization rules, and the like may be provided as the training configuration. In such implementations, the models generated may include an identifier indicating the end user and/or training configuration used to generate the model. This allows the compression model generator 200 to use the same structures to generate different models for compressing transaction data.

The behavior segmentation systems and methods described herein may group like sets of users into overlapping groups based on their transactional behavior. This differs from other traditional transaction based segmentation in a variety of ways. One way is that the described features may include a latent topic identification model, such as a model generated via a latent dirichlet allocation (LDA) algorithm, to uncover spending patterns among the population automatically. Unlike other methods, LDA does not require grouping merchants either manually using ad hoc rules or statistically by counting co-occurrence as in content vector approach. It operates directly on the collection of transactions over many users and allows users to belong to multiple groups. This makes particular sense when thinking about transactional behavior as each transaction may be driven by different characteristics about the user. For instance, some spend may be driven by necessity, e.g., grocery shopping, whereas other types of spend may be hobby driven, e.g., photography or entertainment.

As noted above, the behavior segments may be determined using an automated, machine-driven approach, without manually-driven rules. In one embodiment, clustering algorithms automatically group "like" individuals by their spend. In some embodiments, multiple techniques may be applied to develop more optimized data clusters, such as combining clustering algorithms with machine-learning based techniques, such as topic modeling. In some embodiments, a clustering output maps distance of users to the developed segment centers. Thus, a user may be assigned to a segment they are closest to along with distance measurements that show the user's proximity to other (possibly all) segments. This creates opportunities to consider multiple types of transaction behavior of the user in assessing how their behavior (such as spending patterns) is unique from other users in the population and target content accordingly.

In some embodiments, the segmentation methodology is data driven with a few parameters that can be tuned to produce different model outputs.

Example Computing Phase

The compression models may be used to compress transaction data. Transaction data for users may be initially prepared in the same manner as described in FIG. 1 discussed above. For example, the transaction analysis system 100 may collect (or otherwise accesses) transaction data for users over a certain period of time. The system 100 may then use "Model A" as computed during the training phase to compute the equivalent of "Vector A" for the data used in the testing phase. If there is a "Model B", the series of parameters describing the segments may be used to generate the equivalent of "Vector B" for the data used in the computing phase.

Figure 4:
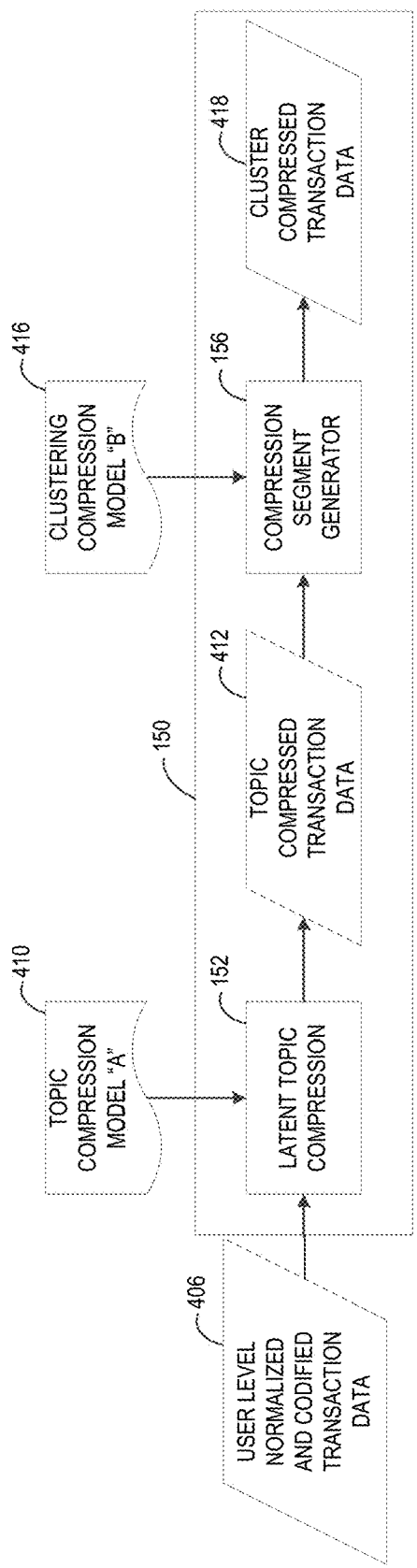
FIG. 4 shows a functional block diagram of an example of the user behavior segmentation system generating segments for users using trained models.

FIG. 4 shows a functional block diagram of an example of the user behavior segmentation system generating segments for users using trained models. The compression module 150 may be similar that shown and described above, such as with reference to FIG. 1. User level normalized and codified transaction data 406 may be provided to the compression module 150. The compression module 150 shown in FIG. 4 also receives the trained compression models. As shown in FIG. 4, the compression module 150 receives a topic compression model 410 and a clustering compression model 416. The compression models may be provided to the compression module 150 such as via a message from the compression model generator 200. In some implementations, the compression module 150 may request a model from the compression model generator 200 or a data storage device configured to store models generated thereby. Such model requests may include one or more of: an end user identifier, a model identifier, a model type identifier, a security/authorization token to ensure the requesting device is authorized to access the requested model, or the like.

The latent topic compression 152 may be configured to generate topic compressed transaction data 412 using the user level normalized transaction data 406 and the topic compression model 410. The topic compressed transaction data 412 may include, for each user, an indication of how closely the transaction data for the user is associated with the topics identified by the model. As noted above, the topic compressed transaction data 412 may be stored using a quantity of storage resources that are less than the storage resources used to store the user level normalized transaction data 406.

The compression segment generator 156 included in the compression module 150 may be similarly configured to obtain the clustering compression model 416. Using the topic compressed transaction data 1012 and the clustering compression model 416, the compression segment generator 156 may generate cluster compressed transaction data 418 for the users. As noted above, the cluster compressed transaction data 418 may be stored using a quantity of storage resources that are less than the storage resources used to store the topic compressed transaction data 412.

Example Uses of Compressed Transaction Data

Returning to FIG. 1, the system 100 may also include elements configured to utilize the compressed transaction data. As shown in FIG. 1, a profile target service 110 is provided. The profile target service 110 may use the user segmentation data to identify users to target to receive specific content. The profile target service 110 may access content data including a content identifier and an indication of a target data cluster of the data clusters. The target data cluster may identify the segment to which the content is to be provided. In some implementations, the profile target service 110 may identify a plurality of users assigned to the target data cluster. The profile target service 110 may also select a target set of users including generated association strengths that indicate a threshold degree of association to the center point of the target data cluster. The profile target service 110 may then generate an electronic communication to provide to the target set of user profiles, the electronic communication including content indicated by the content identifier. In some implementations, the profile target service 110 may provide an indication of the set of users to another aspect of the system 100, such as a content generation server 170, to generate and communicate the identified content to the identified target.

In implementations where the profile target service 110 generates an electronic communication to provide to the target set of user profiles, the electronic communication may be implemented as or included within a message transmitted via a communication channel such as a wireless communication channel to a wireless device of a targeted user. The message may cause the wireless device to activate and/or initiate an application that is configured to acquire content for the user based on the segment identified for the user. In some implementations, the application may be initiated on the user device and, upon receipt of the message, the interface of the application may be adjusted using the received message. For example, a card issuer may provide an interactive application for managing a user account. As a user device operates the interactive application, a message including segmentation information may be received. This message may cause the interactive application to adjust one or more functions using the segmentation information. For example, the segmentation information may indicate the user has a disability. In such instances, a prompt may be presented via the interactive application, asking whether the user would like to switch to a high contrast mode. Content may also be selected for presentation using data provided in the message as selection criteria. Because the application may be initiated or adjusted upon receipt of the message, additional attributes may be identified at or near the same time the message is provided. These additional attributes may include location of the wireless device, power mode of the wireless device, connectivity of the wireless device (e.g., WiFi, cellular, USB tether), other applications executing on the wireless device (e.g., music, photos, movies, Internet browsing), or the like. These attributes may also be used in conjunction with the segmentation data to provide a contextually relevant interactive application adjustments and/or content to the user.

To support these features of the profile target service 110, a targeting rules data store 111 may be provided. The targeting rules data store 111 may include the targeting goals to be achieved by the profile target service 110. A targeting rule may identify an assigned segment, association strengths to the assigned segment, association strengths to a non-assigned segment, or other transaction data that can be used to determine which users should receive the content.

A segment selector 112 may be included to compare the segment assignment data with one or more targeting rule to select a portion of the users which are associated with a desired target segment. A profile selection engine 114 may then narrow the users identified by the segment selector 112 to focus on a particular set of the users to target. For example, the profile selection engine 114 may identify users having a certain distance to the center point of the assigned cluster. The distance may be a short distance, which would indicate a group of users who are strongly identified with the cluster. Such strong affinity can be useful in providing specific content of interest to those within the cluster. The distance may be larger distance, which would indicate a group of users who are identified, but not as strongly as others, with the cluster. Such loose affinity can be useful in providing specific content to increase a user's affinity with the assigned segment.

As noted above, the profile selection engine 114 may also consider relationships between the users assigned to the target cluster and another data cluster to which the users have not been assigned. Such relationships may indicate that while a user is strongly affiliated with the assigned cluster, there may be some interest in another cluster. Such relationships may indicate that a user has a very strong distaste for a very distant cluster. These valuable insights may be determined using the smaller compressed records for the users quickly and with efficient use of system resources.

Similar to the profile selection engine 114, a profile exclusion engine 116 may be included to filter out selected target users. Using targeting rules, the automatically generated target set of users can be further processed to ensure accurate and timely selection. For example, it may be desirable to exclude targeting of a user who has transaction data indicating a recent illness or death (e.g., transactions at a hospital, funeral home, or pharmacy). As another example, it may be desirable to avoid targeting of a user for an end user who is already a loyal customer of a merchant identified in a user's transaction data. For instance, a new user incentive need not be provided to a long time user of a service.

The profile target service 110 may store information for the identified target users in a selected profiles data store 118. The selected profiles data store 118 may be access by the content generation service 170 to generate and deliver the content to each of the identified target users. To generate the content, a targeted content generator 172 may be included in the content generation service 170. The targeted content generator 172 may be configured to format the targeted content element for each user. For example, different targeted users may use different devices to receive content. In such instance, the targeted content generator 172 may adjust, reformat, convert, or otherwise change the targeted content so that a registered user device for a targeted user can receive the content. The targeted content generator 172 may also dynamically adjust content to include targeted user specific information in the content such as the user's name, home town, or other user or transaction information available to the content generation service. The targeted content generator 172 may also prepare printable materials for mailing to the user.

Once the targeted content is prepared, a communication service 174 is included to communicate the generated content to the targeted users. As shown in FIG. 1, the communication service 174 provides the content to user devices 190. In some implementations, the content may be provided to a bulk printing service for physical print and mailing to the targeted users. The communication service 174 may be configured to control the timing of the content delivery. For example, the communication service 174 may transmit the content during a period of time (e.g., at night) when the network for the system 100 is experiencing slow traffic and may have available resources or when the cost of transmitting the content is lower than other times (e.g., nights and weekends). This can also help reduce the resource strain on the network in providing the transaction data targeting.

Figure 5:
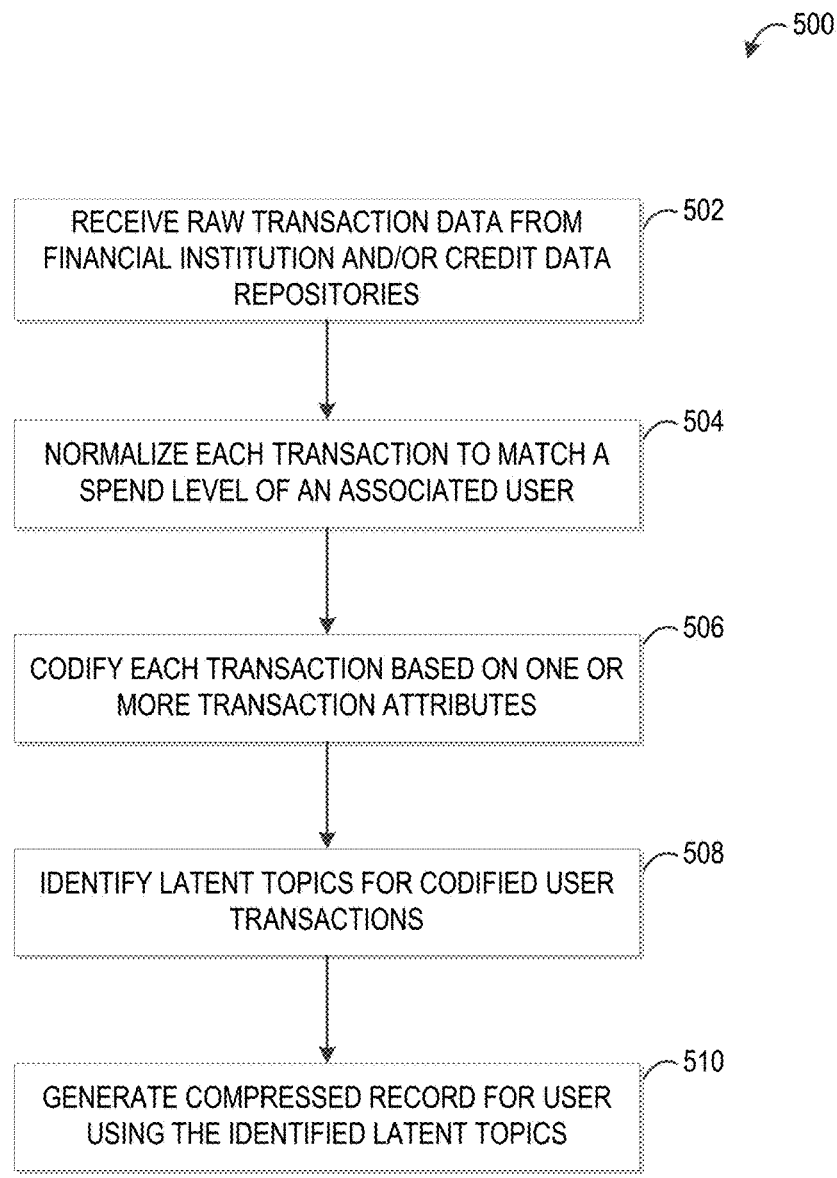
FIG. 5 shows a process flow diagram of an example method of reducing the dimensionality of transaction data.

FIG. 5 shows a process flow diagram of an example method of reducing the dimensionality of transaction data. The method 500 shown in FIG. 5 may be implemented in whole or in part by one or more of the devices described in this application such as FIG. 1 or 4. The dimension reduction described in FIG. 5 may be achieved, in part, by mapping the transaction data to latent topics. The mapping via the latent topics provides a more focused representation of the transaction data over fewer dimensions.

At block 502, raw transaction data is received from a transaction data source such as a financial institution or credit data repositories. As discussed above, the data may be received in batch mode. The data may be pushed from the source to the transaction data processing system. The data may be requested by the system 100 from a source. In some implementations, some data may be pushed and some may be requested.

At block 504, raw transaction data may be categorized or codified using one or more transaction attributes. The transaction attributes that may be used to categorize transactions include merchant name, merchant category code, transaction amount, transaction channel (online versus off-line), or the like. The categorization may utilize match rules which identify transaction data attribute and values therefor that match a given category.

At block 506, the transaction data may be normalized. For example, the normalization may be performed to ensure transaction data from different sources are represented in a consistent format.

At block 508, latent topics for the codified transaction data are identified. The latent topics may be identified using latent topic detection which may include, in some implementations, an LDA model. The topics may be identified by training an LDA model using previous transaction data. For example, the training may reveal that a set of transactions are each related to a transaction topic such as traveling.

At block 510, a compressed record of the user is generated. The compressed record may be generated using the latent topics identified at block 508. To generate the compressed record, for an identified latent topic for a given user's transaction data, a value may be generated. The value may indicate how closely a specific user's transactions match an identified topic. In implementations where multiple topics are identified, values for each topic may be generated. The values may be expressed as an ordered vector of match values. Each match value may indicate how closely the user matches the associated topic. The match value may be expressed as an integer number or decimal number depending on the target compression level. For example, in some implementations, it may be desirable to provide a binary indication as to whether a topic applied to a given user. In such implementations, the values may be 1 or 0. In some implementations, it may be desirable to provide a decimal value where 0 is no match and 1 is a perfect match. The decimal values between 0 and 1 identify the degree of matching for a given value.

Having generated compressed transaction data using topics, it may be desirable perform a segmentation based on the topically compressed user records. The segmentation provides further summarization the behavior of a user. This can be useful in implementations where users with similar behavior patterns will be analyzed or provided content in similar fashions. This summary may also be useful to reduce the amount of data transmitted for a user such as in environments where resources are limited for exchanging, storing, and processing transaction data such as via mobile devices.

Figure 6:
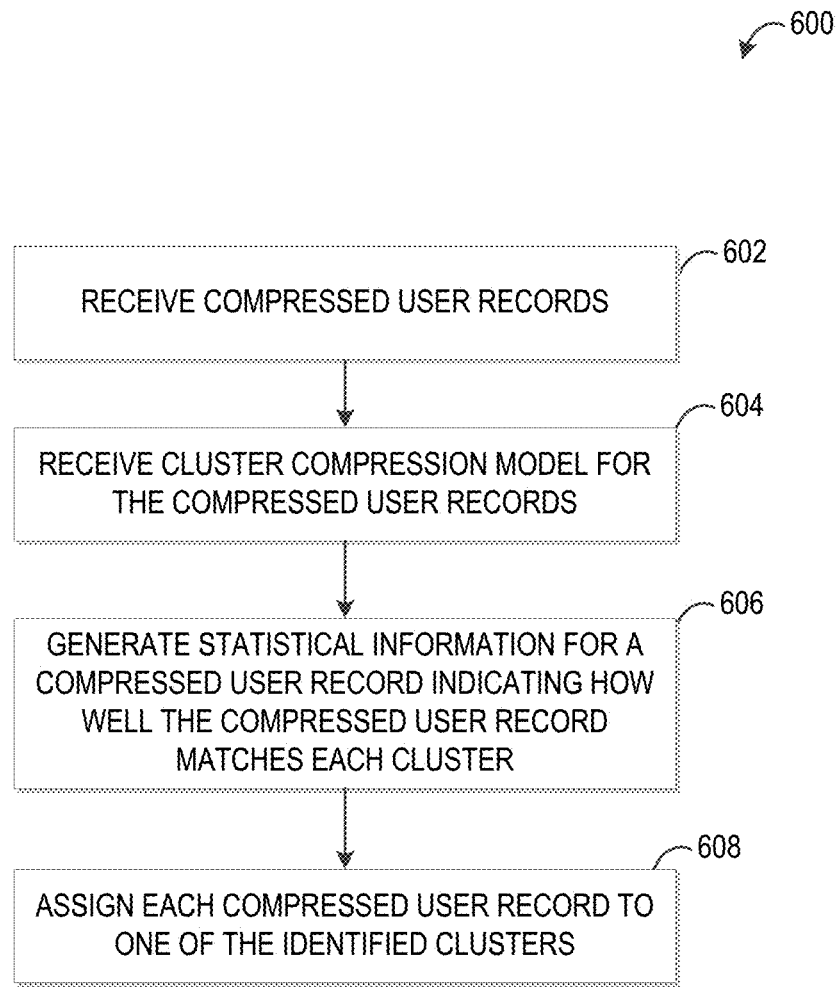
FIG. 6 shows a process flow diagram of an example of a method of segmenting user by using topically compressed user records.

FIG. 6 shows a process flow diagram of an example of a method of segmenting users by using topically compressed user records. The method 600 shown in FIG. 6 may be implemented in whole or in part by one or more of the devices described in this application such as FIG. 1 or 4.

At block 602, the topically compressed user records are received. The records may be received via wired, wireless, or hybrid wired-wireless means. In some implementations, the segment generator 154 may receive the records.

At block 604, a cluster compression model for the compressed user records is received. The cluster compression model may be received along with the user records. In some implementations, the cluster compression model may be received from a model storage device such as in response to a query. The query may include information to identify the model of interest. For example, the query may indicate a target entity for which the compression is being performed, such as a bank or credit card issuing company.

At block 606, statistical information (e.g., an association strength) for each topic (e.g., latent feature) included in the compressed transaction data for the users is generated. The cluster compression model may include one or more center points for each cluster included in the model. Where the compressed transaction data is used for clustering, the center point of a cluster may identify a point within the data cluster that is most centrally located to represent an average topic match value for each topic included in the data cluster.

The statistical information generated at block 606 may indicate how well the compressed user record matches to the respective cluster. In some embodiments, a clustering output maps distance of users to the modeled segment centers. The association strength may indicate a degree of association between a topic in the topically compressed transaction data for a user and the center point of a data cluster included in the cluster compression model.

Figure 7:
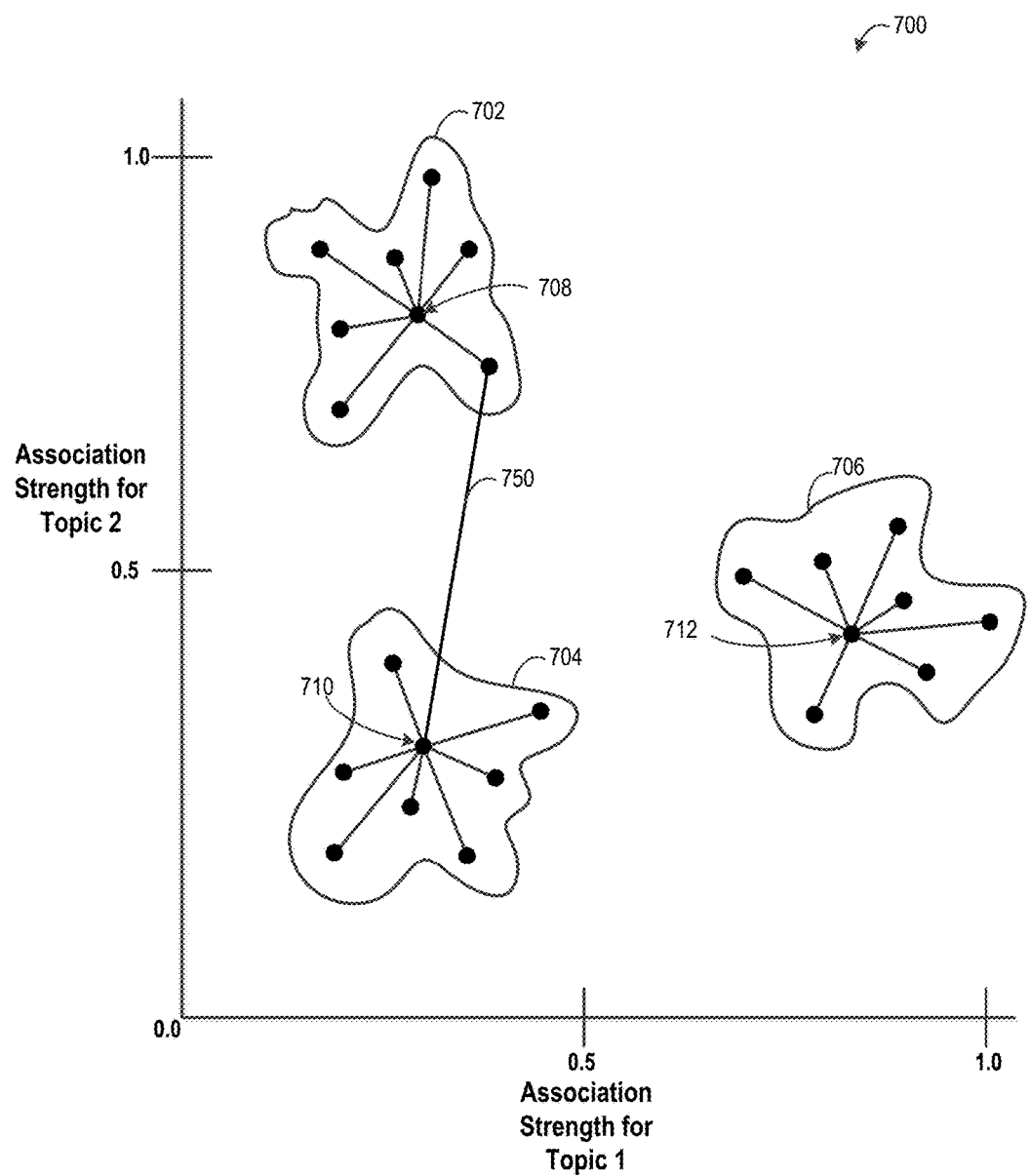
FIG. 7 is a plot diagram showing an example visualization of data clusters with center points.

FIG. 7 is a plot diagram showing an example visualization of data clusters with center points. The diagram 700 shows compressed data for two topics. The x-axis shows the match value for topic 1 and the y-axis shown the match value for topic 2. Twenty-one compressed transaction records are shown. The process of identifying data clusters included a configuration to identify three clusters. A first cluster 702, a second cluster 704, and a third cluster 706 have been identified and are shown in the diagram 700. Each data cluster includes a center point (e.g., 708, 710, and 712). For the first cluster 702, the distances to the center point 408 are shown. These distances identify how far a given user record is from the "ideal" compressed record for the data cluster. The center point may indicate an average topic match value taken from compressed transaction records to be included in the cluster.

In FIG. 7, a distance 750 is shown between a compressed user record 720 included in the first data cluster 702 and the center point 710 of the second data cluster 704. In some implementations, it may be desirable to ensure a user record is at least a certain distance from another data cluster. Because the topics and clusters are generated through machine learning, preferences for edge records (e.g., records which may lie at the boundary of a data cluster) may be difficult to predict. Accordingly, it may be desirable to identify those records for further analysis or exclusion from, say, content delivery.

Returning to FIG. 6, the statistical information based on, for example, the distance information, indicates how well a compressed user record matches each cluster included in the model. In some embodiments, a clustering output maps distance of users to the developed segment centers expressed in the cluster compression model. Thus, at block 608, a user may be assigned to a data cluster they are closest to along with distance measurements that show the customer's proximity to other (possibly all) data cluster. The assignment may be based on the difference between topic match values for the record and the center points of the identified data clusters. Assigning users to one or more clusters creates opportunities to consider multiple types of behavior as expressed via transaction data of the user in assessing how their behavior(s) is/are unique from other users in the population. The clustering also allows targeting of products, offers, or other messaging according to the assigned cluster and/or relationship to other non-assigned clusters.

Thus, a user may be assigned to a data cluster they are closest to along with distance measurements that show the customer's proximity to other (possibly all) data cluster. This creates opportunities to consider multiple types of behavior of the user in assessing how their behavior is unique from other users in the population and target products, offers or messaging accordingly.

Figure 8:
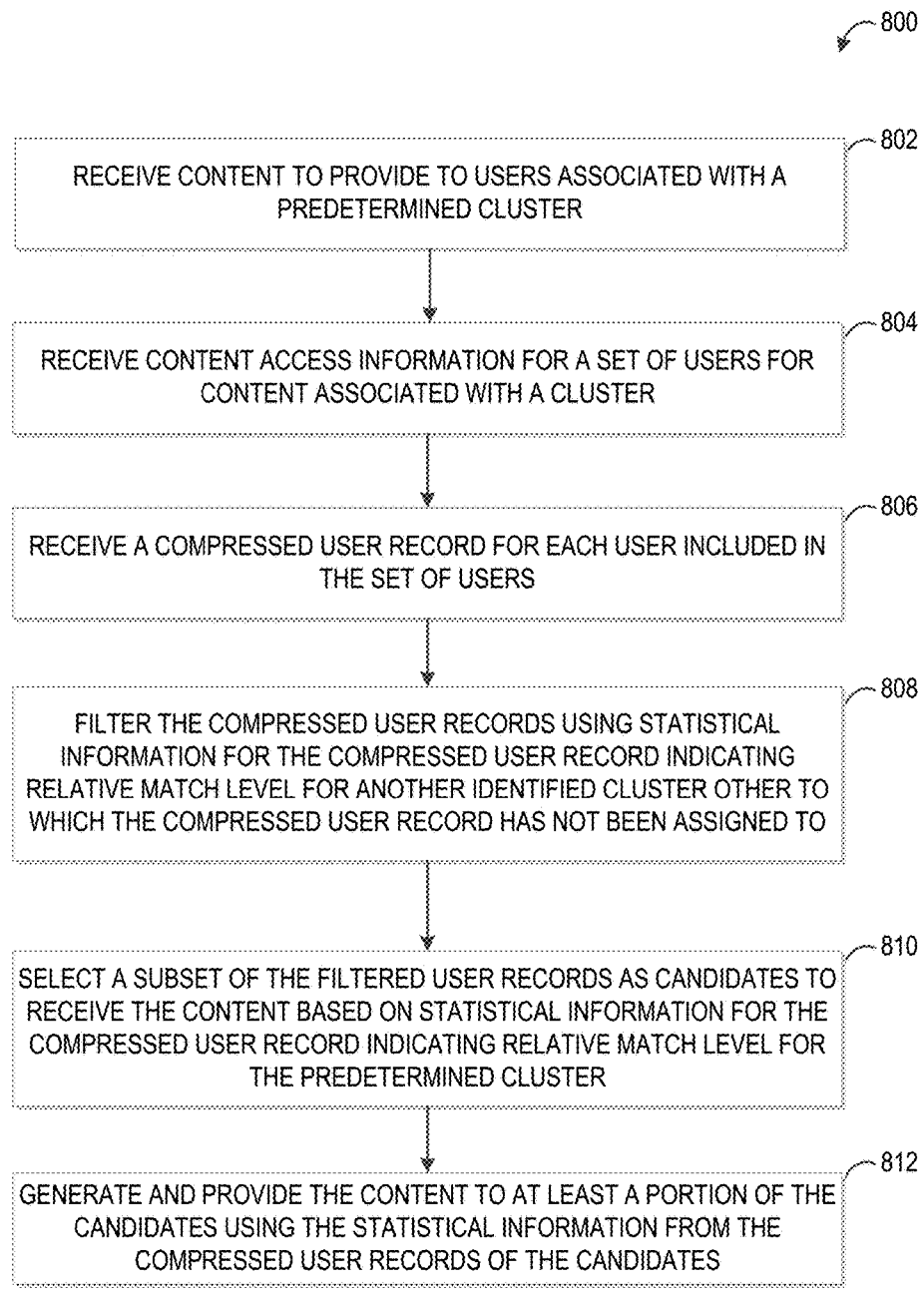
FIG. 8 shows a process flow diagram of an example method of providing content using segmentation.

FIG. 8 shows a process flow diagram of an example method of providing content using segmentation. The method 800 shown in FIG. 8 may be implemented in whole or in part by one or more of the devices described in this application such as FIG. 1.

At block 802, content to provide to users associated with a predetermined cluster is received. The content may be received via wired, wireless, or hybrid wired and wireless means. The content may be received in a machine readable message. The content may include audio, video, text, graphic, olfactory, or haptic content.

At block 804, content access information for a set of users for content associated with a data cluster is received. The content access information may indicate which users within a data cluster should have access to the content. The content access information may include compression values for a given user record such as topic association strengths. For example, a content element may be accessed if, for a given data cluster, the association strength for a first topic is greater than a first threshold and the association strength for a second topic is less than a second threshold. In some implementations, the compression information for association strength with non-assigned data clusters may be specified in the content access information. The content access information may be received via wired, wireless, or hybrid wired and wireless means. The content access information may also include time information indicating when access to the content should be granted. For example, the time may be specified as a date range during which a particular video should be available for access. The content access information may be received in a machine readable message. The content access information may be received together with the content or in a separate message.

At block 806, a compressed user record for each user included in the set of users is received. The compressed user records may be received via wired, wireless, or hybrid wired and wireless means. The compressed user records may be received in a machine readable message. The compressed user records may include topically compressed transaction data and/or clustered compressed data. The compressed user records may be received from a transaction processing system.

At block 808, the compressed user records are filtered. The filtering may be applied using the content access information in comparison to the compressed user records. For example, a record may be filtered out of consideration if the compression information for the record includes an association strength with a non-assigned data cluster at or above a threshold value. Accordingly, the filtering may use statistical information for the compressed user record indicating a relative match level for another identified cluster to which the compressed user record has not been assigned.

At block 810, a subset of the filtered user records are selected as candidates to receive the content based on the statistical information for the compressed user record indicating a relative match level for the predetermined data cluster. In some implementations, it may be desirable to target only a portion of the filtered user records to receive the content. The selection may be based on a comparison of the content access information with the compressed user record. For example, a comparison of topic match level to a threshold may be performed to determine whether a user record should be included in the subset of the filtered user records.

At block 812, a content message is generated and provided to at least a portion of the candidates. The content message includes the content. The content message may include a dynamic portion of content generated based on compressed user records for each candidate. This provides a second level of tailoring and access control for the content. The content message may be provide via wired or wireless means to a device of the user. In some implementations, the content may be provided to a fulfillment device such as a bulk mail generator for printing and shipping to one or more of the candidate users. In such implementations, the content may be provided with shipping information or an identifier that can be used to obtain the shipping information for the content.

In certain implementations, one or more of the content messages are operable to automatically activate a user communication service program on the user device 190 or a client service system (not shown). The activated user communication service program automatically generates one or more communications directed to the user for whom at least one of the content messages was transmitted. Generation of the user communications can be informed by informational included in the content message. The user communications are then automatically transmitted to the user in one or more modes of communication, such as, for example, electronic mail, text messaging, and regular postal mail, to name a few. In certain modes of communication to the user, the user communication may be configured to automatically operate on the user device 190. For example, a user's mobile device may, upon receipt of the transmitted user communication, activate a software application installed on the user's mobile device to deliver the user communication to the user. Alternatively, the user communication may activate a web browser and access a web site to present the user communication to the user. In another example, a user communication may be transmitted to a user's email account and, when received, automatically cause the user's device, such as a computer, tablet, or the like, to display the transmitted user communication. In another example, the user may receive from the client service system a coupon/discount offer in various manners, such as in a billing statement delivered via postal or other delivery service, in a text message to the user's mobile device, and in an email message sent to one or more of the user's email accounts. When a content message is transmitted to the client in response to a transaction, such offers may be effective because they are provided at or near a time that the product or service may be purchased by the user.

Figure 9:
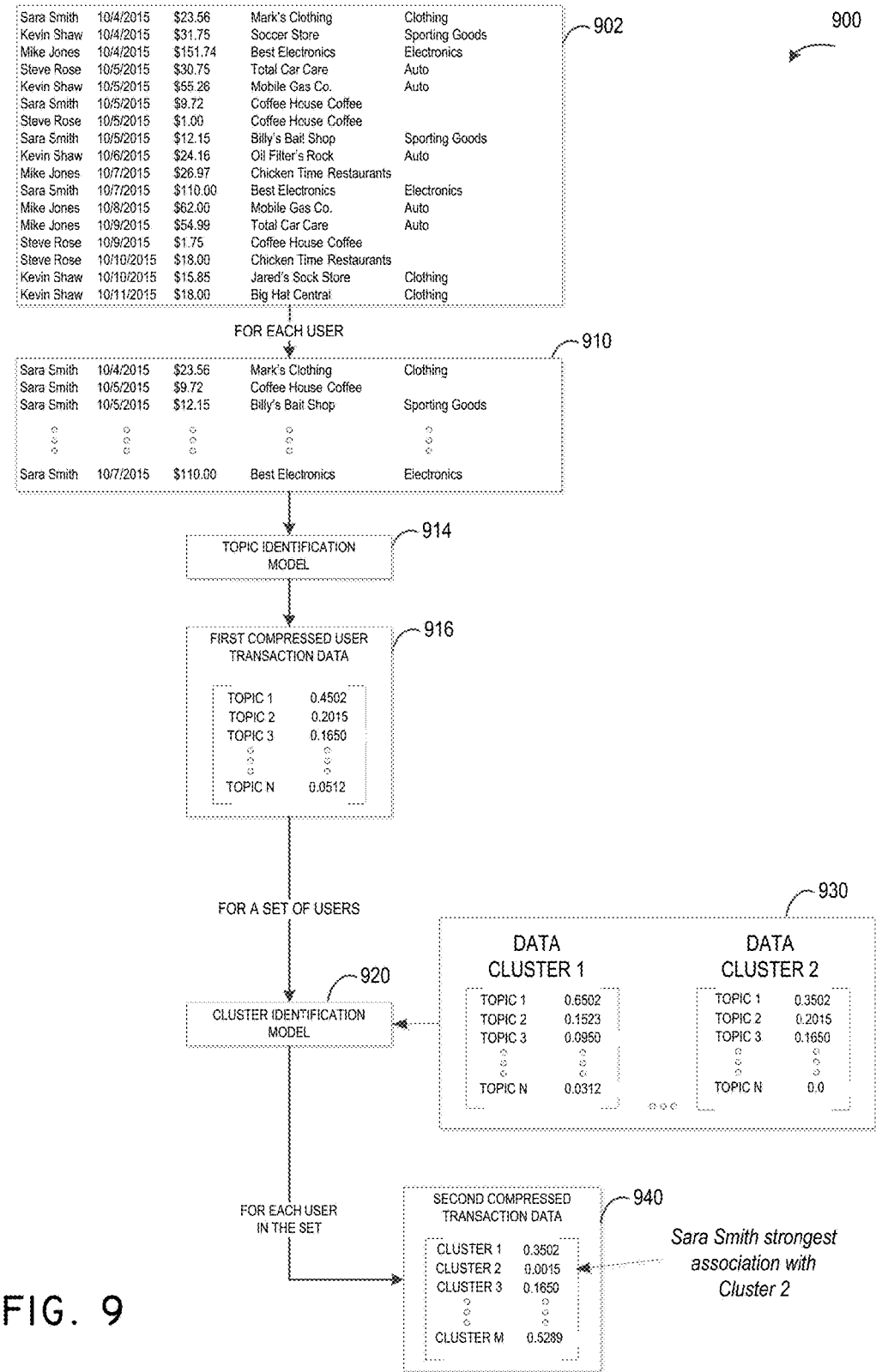
FIG. 9 shows a data flow diagram for an example dimension reduction and segmentation assignment for transaction data.

FIG. 9 shows a data flow diagram for an example dimension reduction and segmentation assignment for transaction data. The data flow 900 begins with an initial set of transaction data 902 for multiple users. Each transaction may be categorized or codified (e.g., clothing, auto, coffee). The initial transaction data 902 may be parsed to identify only those transactions for a specific user. A set of user transaction data 910 for a user (e.g., "Sara Smith") is shown in FIG. 9. It will be appreciated that additional sets may be identified for other users and processed in a similar manner.

A topic identification model 914 may be used in conjunction with the set of user transaction data 910 to generate first compressed user transaction data 916. One example topic identification model 914 is a latent feature model such as an LDA model. The latent feature model may be used to discover the behavior topic and to reduce dimensionality of the transaction data. The discovery via the latent feature model is probabilistic based on identified connections between transaction data elements.

The first compressed user transaction data 916 may include a list of values indicating how closely the transaction data matches a given topic. The values are generated by the topic identification model. As shown in FIG. 9, each topic is included as a row in a vector representation of the first compressed data. It will be understood that the representation may be different (e.g., string of characters, binary encoded value, XML, or other machine readable format).

Transactional data for one user or a group of users may then be provided to a cluster identifier 920. This allows the cluster identifier to group the transaction data for the users based on the intrinsic similarities of their transaction data in the topic space.

The cluster identifier 920 may obtain a set of data clusters 930 for the transaction data 902. The set of data cluster 930 may provide as a segmentation model (e.g., "Model B"). The cluster identifier 920 may generate association strength values for transaction data for a user with one or more data clusters included in the data clusters 930. The association strength values for a given user may represent the distance of the user to a center point of a data cluster, such as the center point shown in FIG. 7. Users may be assigned to one or more clusters and a second compressed transaction data record 940 (e.g., the user segmentation) may be generated. As shown in FIG. 9, the user (e.g., "Sara Smith") has the smallest distance to the center point of cluster 2 therefore she may be assigned to data cluster 2. The second compressed transaction data record 940 includes a row for each cluster included in the set of data clusters. The rows may include a distance value to the center point of the respective data cluster. In some implementations, the row may simply include the topic association strength values for the cluster included in the data clusters to which the user record was assigned. As shown, an indicator that the user associated with the second compressed transaction data record 940 is assigned to data cluster 2 may be included. This may further reduce the amount of data needed to represent the transactions for the user.

Figure 10:
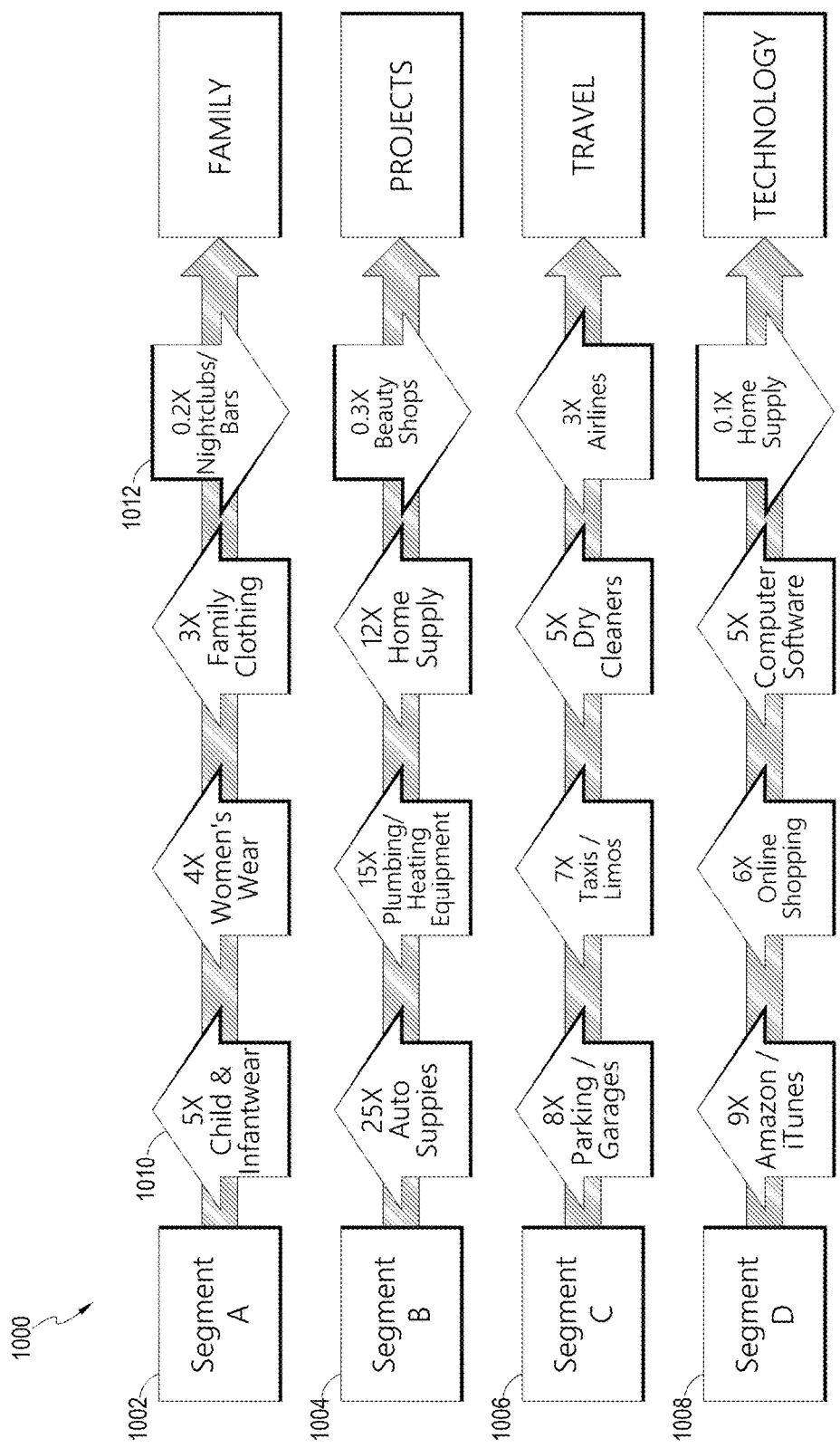
FIG. 10 shows some sample user behavior segments generated from transaction data.

FIG. 10 shows some sample user behavior segments generated from transaction data. The interface 1000 includes four clusters 1002, 1004, 1006, and 1008. As shown in FIG. 10 the data clusters are presented as segments. For each cluster, topic summaries may be presented to indicate the characteristics of users assigned to the cluster. For example, for the first cluster 1002, a first indicator 1010 may be included to identify that the users assigned to the first data cluster 1002 spend 5 times more than the average user on child and infant-wear. A second indicator 1012 may be included to indicate the users assigned to the first cluster 1002 spend only 20 percent of the average on nightclubs and bars. The interface diagram may be generated using the identified data clusters and the center point information. The interface 1000 may be useful to help quickly assess the types of users present within a set of transaction data. The assessment may be for the purposes of providing content. As such, it may be desirable to provide an accurate but abbreviated view of a data cluster rather than generating specific views for each user.

Example Transaction Processing with Compression

Figure 11:
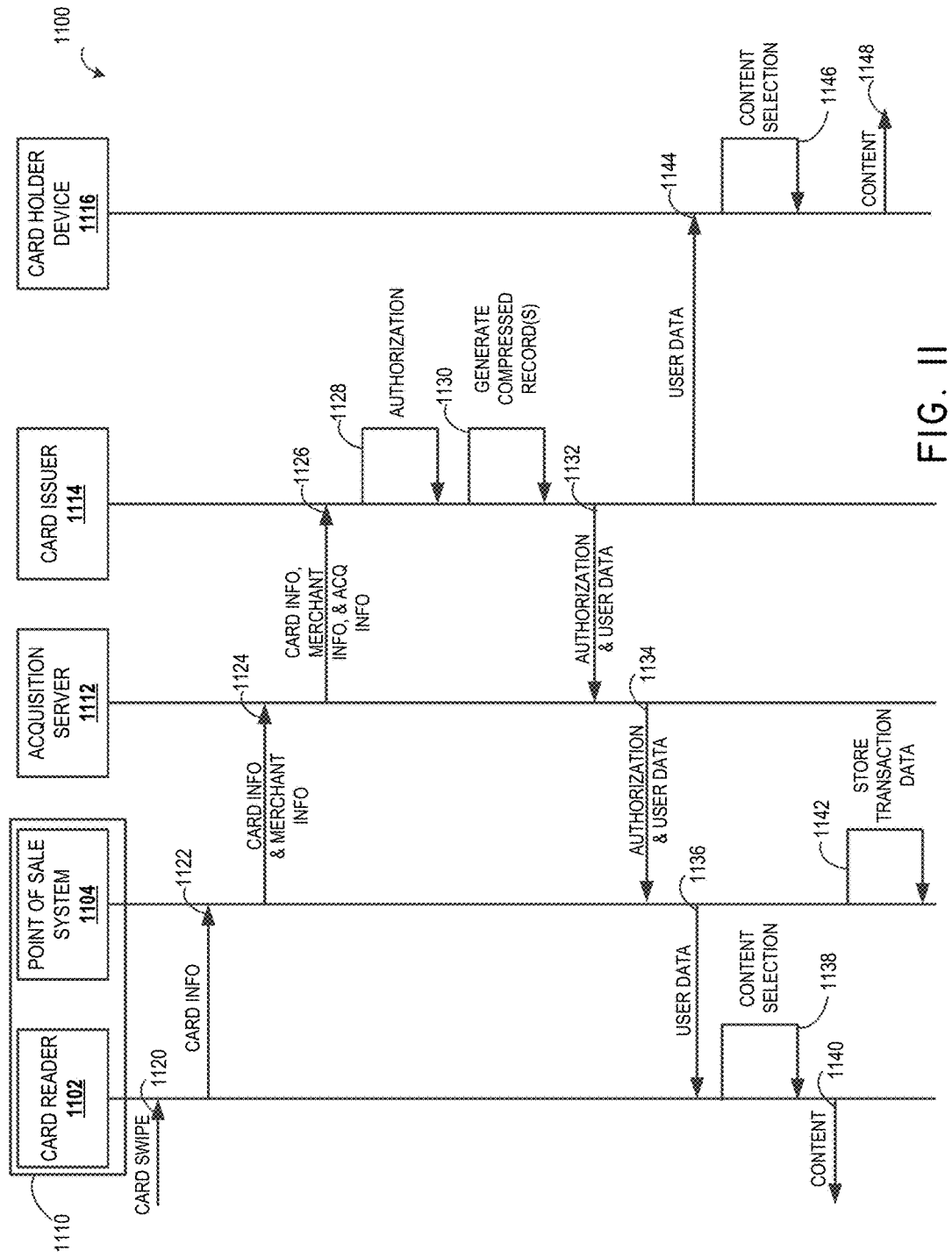
FIG. 11 shows a message flow diagram of an example transaction with transaction data compression and content provided based on the compressed transaction data.

FIG. 11 shows a message flow diagram of an example transaction with transaction data compression and content provided based on the compressed transaction data. A merchant system 1110 may include a card reader 1102 and a point of sale system 1104. The card reader 1102 may be configured to receive card or other payment information from a user. The card reader 1102 may be in data communication with the point of sale system 1104 to receive information collected by the card reader 1102 and other equipment at the merchant site such as a cash register, product scanner, receipt printer, display terminal, and the like. The merchant system 1110 may communicate with an acquisition server 1112. The acquisition server 1112 may be configured to determine, for payment tendered for a transaction, which issuer is responsible for the payment presented. In the case of credit cards, the issuer may be a card issuer 1114.

The message flow 1100 shown in FIG. 11 provides a simplified view of messages that may be exchanged between the entities shown for gathering, processing, and compressing transaction data as well as providing content based on the compressed transaction data for a user. It will be understood that additional entities may mediate one or more of the messages shown in FIG. 11.

The message flow 1100 may begin with a card swipe detection by the card reader 1102 based on a message 1120. The message 1120 may include the payment information read from the card such as from a magnetic strip, an embedded memory chip, a near-field communication element, or other information source included on the card. Via message 1122, the card information may be transmitted from the card reader 1102 to the point of sale system 1104. The point of sale system 1104 may determine that the card is a credit card and identify the acquisition server 1112 as a source for determining whether the payment is authorized.

The point of sale system 1104 may transmit a message 1124 to the acquisition server 1112 including the card information and merchant information. The merchant information may include a merchant identifier, merchant transaction information (e.g., desired payment amount), or other information available to the merchant for the transaction. The acquisition service 1112 may identify the card issuer based on the card information received and transmit a message 1126 to the card issuer 1114. The message 1126 may include the card information and merchant information received via message 1124. The message 1126 may also include information about the acquisition server 1112. The card issuer 1114 may then authorize the requested payment amount via message 1128. The authorization of payment is known in the field of payment processing. The authorization determines whether or not the requested payment for the transaction is to be honored. The card issuer 1114 also knows one of their users is at a payment terminal trying to make a purchase. This can be a desirable moment to interact with the customer to provide additional content to the customer, such as content selected by the card issuer or by the merchant. To select content however, an accurate record of the user may be needed to provide relevant content for the specific user involved in the transaction. As such, via message 1130, one or more compressed transaction records may be generated by the card issuer 1114.

It will be understood that the compression may be performed by a third-party system, such as the system 100 shown in FIG. 1. It will also be understood that transaction data may be stored, and thus compressed, by any of the entities shown in FIG. 11. For example, the acquisition server 1112 or the merchant system 1110 may store and compress transaction data. Furthermore, any of the systems or servers through which the transaction data is passed may serve as a transaction data source for the system 100 shown in FIG. 1.

Via message 1132, the authorization decision and compressed user data may be transmitted back to the merchant system 1110 via the acquisition server 1112. Because the compressed user data may be represented using a relatively small quantity of resources, this data may be easily included in the current messaging used to authorize transactions. The point of sale system 1104 may use the authorization information to determine whether or not to allow the transaction to proceed. If the authorization is negative, then the point of sale system 1104 may request alternate payment from the user. As shown in FIG. 11, the compressed user data may be transmitted to the card reader 1102 via message 1136. The merchant may desire to present content relevant to the tastes of the user. In such implementations, the card reader 1102 may be configured to select content via message 1138. The content or indicators therefor (e.g., file names, network locations, uniform resource locators, etc.) may be stored at the card reader along with selection criteria. The card reader 1102 may compare the compressed user data to the selection criteria for the content stored at the card reader 1102. For example, the compressed user data may include data cluster compressed user data indicating an association strength to a particular topic such as "business travel." A content element discussing a business service may be relevant to business travelers. As such, this content element may have a selection criteria such that a user having an association strength to the topic of "business travel" that exceeds a threshold value is eligible to receive the content. The identified content may be provided to the card reader (e.g., a display, a printer, a speaker) via message 1140. The card reader 1102 may then render the content for presentation to the user. As noted above, the entities processing the transaction may store and/or compress the transaction data. As shown in FIG. 11, the point of sale system 1104 may store the transaction data via message 1142. The storage of the transaction data may be performed to allow the merchant to submit all transactions in batch for processing at a later time or date, such as shown in FIG. 12.

In some implementations, the user data may be transmitted via a message 1144 to a card holder device 1116. The card holder device 1116 is an electronic communication device associated with a user who has been issued a payment card or otherwise accesses the system to perform a transaction. As shown in FIG. 11, the user data may be sent from the card issuer 1114, however, it will be appreciated that the user data may be transmitted to the card holder device 1116 from any of the entities shown in FIG. 11 with access to the user data. The message 1144 may cause the card holder device 1116 to initiate an application that is configured to acquire content for the user based on the segment identified for the user. In some implementations, the application may be initiated on the card holder device 1114 and, upon receipt of the message 1144, the interface of the application may be adjusted using the received message. The application, via message 1146, may cause selection of content to provide to the user via the card holder device 1114. The selection may further consider information available to the card holder device 1114 such as location, other installed applications, other executing applications, resource availability, resource level, etc.). Once identified, the content may be provided via message 1148. As discussed above, the content may be provided via the card holder device 1114 during or proximate to the time of the transaction involving the card swipe at message 1120.

Figure 12:
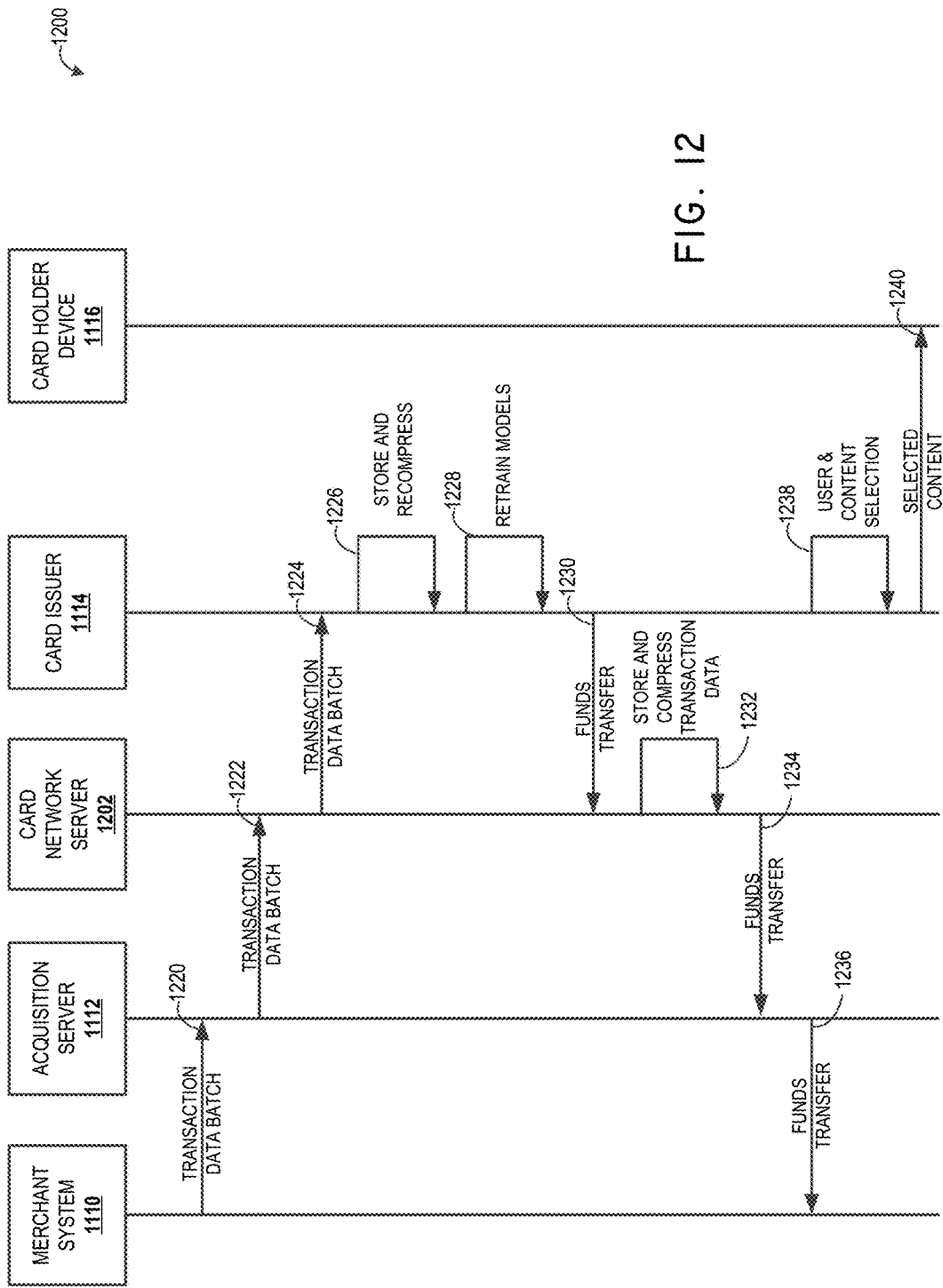
FIG. 12 shows a message flow diagram of an example batch transaction processing with transaction data compression and content provided based on the compressed transaction data.

FIG. 12 shows a message flow diagram of an example batch transaction processing with transaction data compression and content provided based on the compressed transaction data. Some of the entities shown in FIG. 12 overlap with those shown in FIG. 11. Added to FIG. 12 is a card network server 1202. The card network server 1202 is an electronic device operated by the credit card network to which a given card belongs such as VISA.

The merchant system 1110 may transmit a batch of transaction data for multiple transactions with multiple users via message 1220. The batch of transaction data from a single merchant may include hundreds, thousands, or millions of individual transaction records. The merchant system 1110 may transmit the message 1220 to the acquisition server 1112 to initiate payment for the transactions. The acquisition server 1112, via message 1222, may transmit those transactions from a specific card network to the card network server 120 to request payment from the specific network. Because a single card network may have multiple card issuers (e.g., banks, credit unions, etc.), the card network server 1202 splits the batch of transactions by card issuer. The transactions for a specific issuer are transmitted via message 1224 to, as shown in FIG. 12, the card issuer 1114. The card issuer 1114 stores the transaction data. Because new information is now available, the card issuer 1114 may also initiate a recompression of the transaction data in light of the new transactions. The storage and recompression may be performed via message 1226.

The new transaction data may also indicate that the models used to compress the transaction data should be retrained. For example, if the new transactions represent a significant percentage of the overall transaction data stored by the system 100, the retraining of the models may be desirable to ensure an accurate and current view of the users. The retraining may also be needed to account for new transactions for new users who were previously not included in the training process.

Via message 1230, the card issuer 1114 may initiate a transfer of funds to settle one or more of the transactions included in the transaction data batch. As shown in FIG. 12, the card network server 1202, via message 1232, may also store and compress transaction data. The card network server 1202 may also initiate a transfer of funds to settle one or more of the transactions included in the transaction data batch via message 1234 and, ultimately, to transfer funds to the merchant system 1110 via message 1236.

The card issuer 1114 may interface with the card holder. For example, the card issuer 1114 may provide an interactive application for reporting transaction information to the card holder such as via the card holder device. Using the compressed transaction records, users may be identified to receive particular content. In some implementations, the profile target service 110 shown in FIG. 1 may perform the selection of users and/or content to be provided. Via message 1240, the selected content may be provided to the identified user. The content may be provided to the card holder device 1116 by the content generating service 170 shown in FIG. 1.

The card issuer 1114 may interface via mail such as by printing and mailing content to the card holder. In such implementations, the content included in the message 1240 may be provided to a fulfillment server responsible for printing and mailing the content to the card holder.

Example Point-of-Sale Card Reader

Figure 13:
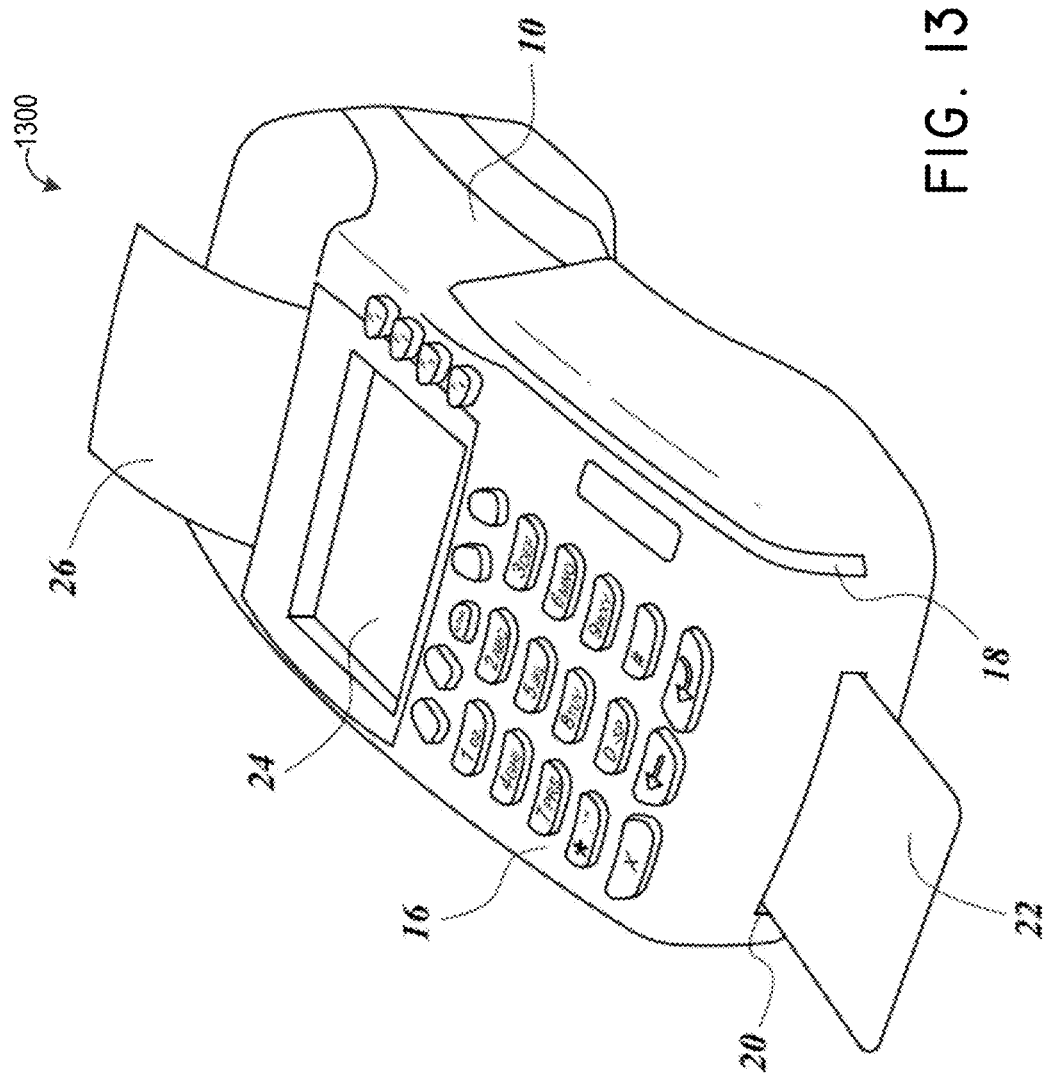
FIG. 13 shows a schematic perspective view an example card reader.

FIG. 13 shows a schematic perspective view of an example card reader. As seen in FIG. 13, there is provided a point-of-sale card reader 1300 including a housing 10. The housing 10 may enclose transaction circuitry (not shown) and other electronic components to implement one or more of the transaction data compression features described.

The point-of-sale card reader 1300 includes a keypad 16, which interfaces with the point-of-sale transaction circuitry to provide input signals indicative of transaction or event events at or near the point-of-sale card reader 1300. The point-of-sale card reader 1300 also includes a magnetic card reader 18 and a smart card reader 20, which may be adapted to receive a smart card 22.

The point-of-sale card reader 1300 also includes a display 24 and a printer 26 configured to provide output information prior to, during, or after a transaction. The content may include single media or multimedia content. The content may be static (e.g., a movie, a text, an image, and/or audio) or dynamically generated. For example, using the compressed transaction data, the card swiped may be identified with a data cluster for sports fans. In such an implementation, the content may be adapted to include sports-centric information such as inserting a team logo into the presented content.

Figure 14:
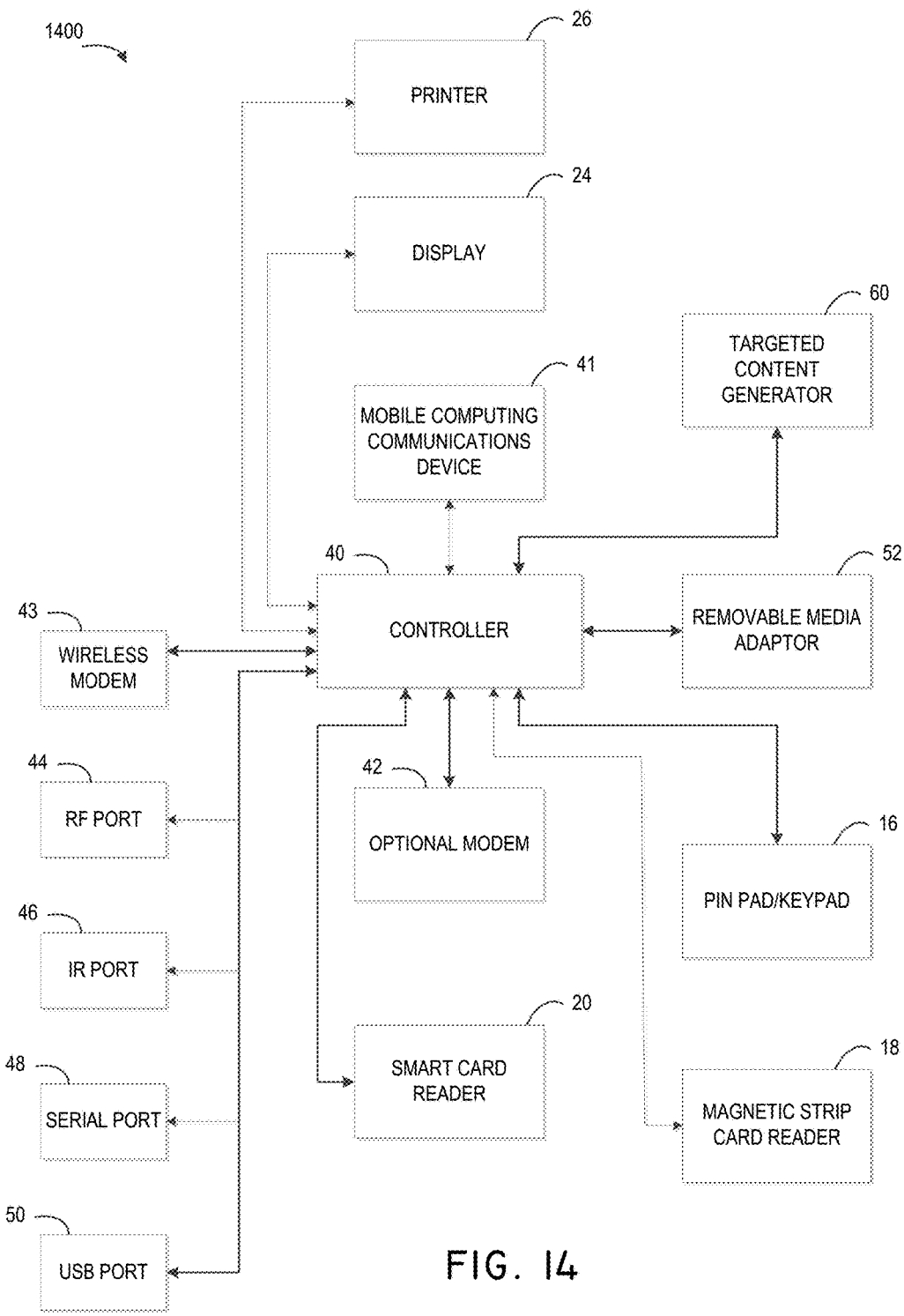
FIG. 14 shows a functional block diagram of the card reader of FIG. 13.

FIG. 14 shows a functional block diagram of the exemplary card reader of FIG. 13. A controller 40 which interfaces with the keypad 16, the display 24, the printer 26, and with a targeted content generator 60 are shown. The controller 40, which may include card reader and/or point-of-sale terminal functionality may interface with the magnetic card reader 18 and, when available, the smart card reader 20.

The controller 40 also interfaces with a mobile computing communication device 41 and may interface with an optional modem 42. The mobile computing communication device 41 and the modem 42 may be used by the reader 1300 to communicate messages such as with a point-of-sale system or other merchant transaction processing equipment.

The card reader 900 shown in FIG. 14 includes a wireless modem 43 and various types of communications points such as an RF port 44, and IR port 46, a serial port 48, and a USB port 50. The communication ports may also be used by the reader 1300 to communicate messages as described in this application. A removable media adapter 52 may also interface with the transaction circuitry 12. Removable media may be employed for storage, archiving, and processing of data relevant to the reader 1300 functionality. For example, transaction data may be stored on removable media for transfer, at a later time, to merchant transaction processing equipment.

The targeted content generator 60 may be configured to obtain content and compressed transaction data. Using the compressed transaction data, the targeted content generator 60 may identify one or more elements of obtained content for presentation via one or more of the outputs of the card reader. For example, the display 24 may be used to show content to a user who presented a card at the card reader. During the transaction, such as part of the authorization process, a compressed transactional record for the user may be received by the card reader 1300 and processed by the targeted content generator 60. By comparing at least a portion of the compressed data to selection criteria associated with the obtained content, the targeted content generator 60 may identify a relevant content element for presentation and cause it to be presented.

Example System Implementation and Architecture

FIG. 15 is a block diagram showing example components of a transaction data processing system 1500. The processing system 1500 includes, for example, a personal computer that is IBM, Macintosh, or Linux/Unix compatible or a server or workstation. In one embodiment, the processing system 1500 includes a server, a laptop computer, a smart phone, a personal digital assistant, a kiosk, or a media player, for example. In one embodiment, the processing system 1500 includes one or more central processing unit ("CPU") 1505, which may each include a conventional or proprietary microprocessor specially configured to perform, in whole or in part, one or more of the transaction data compression features described above. The processing system 1500 further includes one or more memory 1532, such as random access memory ("RAM") for temporary storage of information, one or more read only memory ("ROM") for permanent storage of information, and one or more mass storage device 1522, such as a hard drive, diskette, solid state drive, or optical media storage device. A specially architected transaction data store 1508 may be provided. The transaction data store 1508 may be optimized for storing raw and/or compressed transaction data as described above. In some implementations, the transaction data store 1508 may be designed to handle large quantities of data and provide fast retrieval of the records. To facilitate efficient storage and retrieval, the transaction data store 1508 may be indexed using compressed transaction data, such as those described above.

Typically, the components of the processing system 1500 are connected using a standards-based bus system 1590. In different embodiments, the standards-based bus system 1590 could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of processing system 1500 may be combined into fewer components and modules or further separated into additional components and modules.

The processing system 1500 is generally controlled and coordinated by operating system software, such as Windows XP, Windows Vista, Windows 7, Windows 8, Windows Server, UNIX, Linux, SunOS, Solaris, iOS, Blackberry OS, Android, or other compatible operating systems. In Macintosh systems, the operating system may be any available operating system, such as MAC OS X. In other embodiments, the processing system 1500 may be controlled by a proprietary operating system. The operating system is configured to control and schedule computer processes for execution, perform memory management, provide file system, networking, I/O services, and provide a user interface, such as a graphical user interface ("GUI"), among other things.

The processing system 1500 may include one or more commonly available input/output (I/O) devices and interfaces 112, such as a keyboard, mouse, touchpad, and printer. In one embodiment, the I/O devices and interfaces 1512 include one or more display devices, such as a monitor, that allows the visual presentation of data to a user. More particularly, a display device provides for the presentation of GUIs, application software data, and multimedia presentations, for example. The processing system 1500 may also include one or more multimedia devices 1542, such as speakers, video cards, graphics accelerators, and microphones, for example.

In the embodiment of FIG. 15, the I/O devices and interfaces 1512 provide a communication interface to various external devices. The processing system 1500 may be electronically coupled to one or more networks, which comprise one or more of a LAN, WAN, cellular network, satellite network, and/or the Internet, for example, via a wired, wireless, or combination of wired and wireless, communication link. The networks communicate with various computing devices and/or other electronic devices via wired or wireless communication links, such as the credit bureau data source and financial information data sources.

In some embodiments, information may be provided to the processing system 1500 over a network from one or more data sources. The data sources may include one or more internal and/or external data sources that provide transaction data, such as credit issuers (e.g., financial institutions that issue credit cards), transaction processors (e.g., entities that process credit card swipes at points of sale), and/or transaction aggregators. The data sources may include internal and external data sources which store, for example, credit bureau data (for example, credit bureau data from File OneSM) and/or other user data. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the processing system 1500, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

In the example of FIG. 15, the modules 1510 may be configured for execution by the CPU 1505 to perform, in whole or in part, any or all of the process discussed above, such as those shown in FIGS. 3, 5, 6, 8, 9, 11, and/or 12.

Additional Embodiments

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. For example, the methods described herein may be performed by a processing system, card reader, point of sale device, acquisition server, card issuer server, and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, compact disk read-only memories (CD-ROMs), magnetic tape, flash drives, and optical data storage devices.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

What is claimed is:

1. A method of artificial intelligence guided segmentation of event data, the method comprising:

accessing, from a data store, a plurality of event records associated with respective users of a plurality of users, wherein a first plurality of event records associated with a first user are stored using a first quantity of storage;

accessing an event categories data structure indicating a plurality of event categories and, for each event category, attribute criteria usable to identify events associated with respective event categories;

for the event records,
identifying one or more attributes of the event record,
comparing the identified one or more attributes of the event record to the attribute criteria of respective event categories, and
based on said comparing, assigning, to the event record, an event category having attribute criteria matching the identified one or more attributes of the event record;

generating, for the first user, first compressed event data using the event records associated with the first user and a latent feature identification model, wherein the latent feature identification model takes the event records for the first user and the event categories assigned thereto as an input, and provides association values for the first user for respective event topics identified by the first compressed event data, wherein first compressed event data associated with the first user is stored using a second quantity of storage, the second quantity of storage being less than the first quantity of storage for storing the event records of the first user;

assigning the first user to one of a plurality of data clusters included in a clustering model using the first compressed event data for the first user; and generating, for the first user, second compressed event data using a comparison between the first compressed event data for the first user and an average latent feature identification value for a latent feature included in the data cluster to which the first user has been assigned, wherein the second compressed event data associated with the first user is stored using a third quantity of storage, the third quantity of storage being less than the second quantity of storage.

2. The method of claim 1, wherein assigning the first user to one of the data clusters comprises:
identifying center points for each data cluster included in the clustering model;
generating an association strength for each latent feature included in the first compressed event data for the first user for each data cluster, the association strength indicating a degree of association between the first compressed event data for a user and respective data cluster center points; and
identifying the one of the data clusters as having the highest association strength for the first user from amongst the data clusters included in the clustering model.

3. The method of claim 2, wherein generating the association strength for the first user comprises comparing a latent feature identification value included in the first compressed event record for a latent feature for the first user to the center point.

4. The method of claim 2, wherein generating the second compressed event data further comprises:
generating a secondary association strength for each latent feature included in the first compressed event data for a user assigned to the data cluster, the secondary association strength indicating a secondary degree of association between the first compressed event data for the user assigned to the data cluster and the secondary center point of the secondary data cluster to which the user is not assigned, wherein the second compressed event data comprises an identifier for the secondary data cluster and the generated secondary association strengths.

5. The method of claim 2, further comprising:
accessing content data including a content identifier and an indication of a target data cluster of the data clusters;
identifying a plurality of users assigned to the target data cluster;
selecting a target set of users having second compressed event data including generated association strengths indicating a threshold degree of association to the center point of the target data cluster; and
generating an electronic communication to provide to the target set of user profiles, the electronic communication including content indicated by the content identifier.

6. The method of claim 1, further comprising:
training the latent feature identification model through probabilistic analysis of a plurality of historical event records to identify a target number of topics; and
training the clustering model using a desired compression level indicating a number of data clusters for the clustering model, wherein training the clustering model includes generating a center point for each data cluster using topically compressed historical event data.

7. The method of claim 1, wherein the latent feature identification model comprises a latent dirichlet allocation model.

8. A method of compressing transaction data, the method comprising:
receiving a plurality of transaction records each identifying a transaction by one of a plurality of users;
assigning a category to each of the plurality of transaction records;
generating first compressed transaction records using a latent feature identification model, wherein the latent feature identification model takes the transaction records for the one of the plurality of users and categories assigned thereto as an input, and provides association values for the one of the plurality of users for respective topics identified in the first compressed event data;
identifying a clustering compression model for the one of the plurality of users; and
generating second compressed transaction records using the first compressed transaction records and the clustering compression model.

9. The method of claim 8, wherein generating a first compressed transaction record for the one of the plurality of users comprises receiving association strengths for each topic identified by the latent feature identification model for a set of transactions for the one of the plurality of users.

10. The method of claim 8, further comprising:
receiving a compression configuration indicating a target number of features to identify for an end user; and
training a latent dirichlet allocation model to identify the target number of features using the received plurality of transaction records, wherein the latent feature identification model comprises the latent dirichlet allocation model.

11. The method of claim 8, wherein each data cluster included in the clustering compression model is associated with at least one latent feature identifiable by the latent feature identification model, and wherein generating the second compressed transaction records comprises:

assigning each user to one of the data clusters using the first compressed transaction records; and generating the second compressed transaction records for each user using a comparison between the first compressed transaction data for a user and the center point for the cluster to which the user is assigned.

12. The method of claim 11, where generating the second compressed transaction records further comprises:

calculating a secondary center point for a secondary data cluster using first compressed transaction data for each user assigned to the secondary data cluster; and generating a secondary association strength for each latent feature included in the first compressed transaction data for a user assigned to the data cluster, the secondary association strength indicating a secondary degree of association between the first compressed transaction data for the user assigned to the data cluster and the secondary center point of the secondary data cluster to which the user is not assigned, wherein the second compressed transaction data comprises an identifier for the secondary data cluster and the generated secondary association strengths.

13. The method of claim 8, further comprising training a clustering model using the desired compression level and at least a portion of the plurality of transaction records.

14. The method of claim 8, further comprising:

receiving, from a transaction terminal, a pending transaction record for a user included in the plurality of users, wherein the pending transaction record is not included in the plurality of transaction records;

retrieving a second compressed transaction record for the user using an identifier of the user included in the pending transaction record; and transmitting the second compressed transaction record to the transaction terminal.

15. The method of claim 14, further comprising:

selecting a content element for presentation to the user during or after the pending transaction using the second compressed transaction record; and providing the content element to a content delivery system configured to transmit the content element to the user.

16. A transaction data compression system comprising:

one or more computer processors configured to execute software instructions;

a non-transitory tangible storage device storing the software instructions executable by the one or more processors to at least:

access transaction data associated with a plurality of users;

for a plurality of transactions in the transaction data:
assign a transaction category based on one or more attributes of the transaction; and
assign a transaction category level for the transaction category based at least in part on on spend levels of individual users associated with the plurality of transactions; and generate, for each user, first compressed transaction data using the transaction categories assigned to the transaction records for a respective user and a latent feature identification model, wherein the latent feature identification model takes the event records for the first user and the event categories assigned thereto as an input, and provides association values for the first user for respective event topics identified by the first compressed event data, wherein the first compressed transaction data associated with the one of the respective users is stored using a second quantity of storage, the second quantity of storage being less than the first quantity of storage;

identify a clustering compression model for users included in the plurality of users;

assign each of the users to one of a plurality of data clusters included in the respective clustering compression model using respective first compressed transaction data for the user; and generate, for each user, second compressed transaction data using a comparison between the first compressed transaction data for a user and an average for the data cluster to which the user has been assigned, wherein the second compressed transaction data is stored using a third quantity of storage, the third quantity of storage being less than the second quantity of storage.

17. The transaction data compression system of claim 16, wherein the software instructions are further executable by the one or more processors to at least:

access content data including a content identifier and an indication of a target data cluster of the data clusters;

identify a plurality of users assigned to the target data cluster;

select a target set of users having second compressed transaction data including generated association strengths indicating a threshold degree of association to the center point of the target data cluster; and generate an electronic communication to provide to the target set of user profiles, the electronic communication including content indicated by the content identifier.

18. The transaction data compression system of claim 17, wherein the software instructions are further executable by the one or more processors to at least:

access the target set of users;

identify a target device for a user included in the target set of users; and provide the electronic communication to the target device.

19. The transaction data compression system of claim 16, further comprising a card reader including:

one or more computer processors configured to execute software instructions;

a non-transitory tangible storage device storing the software instructions executable by the one or more computer processors to cause the card reader to at least:

detect payment information for a transaction for a user;

receive compressed transaction data during the transaction for the user; and identify content stored by the card reader using a comparison between a content selection rule and the compressed transaction data, said content for presentation via the card reader; and a display configured to present the content to the user.

20. The transaction data compression system of claim 16, wherein the software instructions are further executable by the one or more processors to at least generate at least one of the latent feature identification model and a clustering model identifying the plurality of data clusters for the plurality of transaction records.

* * * * *